May 31, 1955 V. E. ROSENE 2,709,722
SERVICE OBSERVING ON TOLL CORDS AND TRUNKS
Filed Oct. 2, 1952 39 Sheets-Sheet 1

FIG. 1

| FIG. 2 | FIG. 3 | | | | |
|---|---|---|---|---|---|
| PULSE CONV. CCT. DC RECEIVING MF SENDING | | | | | |
| FIG. 4 | FIG. 5 | FIG. 6 | FIG. 7 | | |
| DC AND SET CCT. | MF KEY | CORD SER. OBS. TRUNK CCT. | | | |
| FIG. 10 | FIG. 11 | | | FIG. 22 | |
| CORD CCT. | CORD S.O. CCT. | FIG. 8 | FIG. 9 | 1ST TRK. (CORD) | |
| FIG. 12 | FIG. 13 | FIG. 14 | FIG. 15 | FIG. 23 | INCOMING TRK. DISTR CCT. |
| COMPLET'G TRUNK | REC. COM. S.O. CCT. | SPEED OF ANSWER S.O. TRUNK CCT. | | 2ND TRK. (SPEED OF ANSWER) | |
| | FIG. 16 | FIG. 17 | FIG. 18 | FIG. 24 | |
| | INTERTOLL INC. TRUNK | INTERTOLL S.O. TRUNK CCT. | PULSING CCT. | LAST TRK. (INTERTOLL) | |
| | FIG. 19 | | | FIG. 25 | FIG. 26 | FIG. 29 |
| | INTERTOLL S.O. CCT. | FIG. 20 | FIG. 21 | INTERMED. POSITION CCT. | | DIGIT RECORDING |
| | | | | FIG. 27 | FIG. 28 | FIG. 30 |

| FIG. 31 | FIG. 32 | FIG. 33 |
|---|---|---|
| 1ST POS. CCT. IDENT. CONT. | IDENT. CONT. | LAST POS. CCT. IDENT. CONT. |
| FIG. 34 POS. CONTROL 1ST | FIG. 35 POS. CONTROL INTERMED. | FIG. 36 POS. CONTROL LAST |
| FIG. 37 TELEPHONE CCT. | FIG. 38 IDENTIFICATION CCT. | FIG. 39 |

INVENTOR
V. E. ROSENE
BY
C. Mattice
ATTORNEY

INVENTOR
V. E. ROSENE
BY
C. Mathis
ATTORNEY

May 31, 1955 V. E. ROSENE 2,709,722
SERVICE OBSERVING ON TOLL CORDS AND TRUNKS
Filed Oct. 2, 1952 39 Sheets-Sheet 20

INVENTOR
V. E. ROSENE
BY
C. Mattice
ATTORNEY

INVENTOR
V. E. ROSENE
BY
C. Mathie
ATTORNEY

INVENTOR
V. E. ROSENE
BY C. Mathie
ATTORNEY

May 31, 1955  V. E. ROSENE  2,709,722
SERVICE OBSERVING ON TOLL CORDS AND TRUNKS
Filed Oct. 2, 1952  39 Sheets-Sheet 27

INVENTOR
V. E. ROSENE
BY
C. Mathie
ATTORNEY

May 31, 1955     V. E. ROSENE     2,709,722
SERVICE OBSERVING ON TOLL CORDS AND TRUNKS
Filed Oct. 2, 1952     39 Sheets-Sheet 39

INVENTOR
V. E. ROSENE
BY
C. Mattice
ATTORNEY

United States Patent Office 2,709,722
Patented May 31, 1955

2,709,722
SERVICE OBSERVING ON TOLL CORDS AND TRUNKS

Victor E. Rosene, Queens Village, N. Y., assignor to Bell Telephone Laboratories, Incorporated, New York, N. Y., a corporation of New York Application October 2, 1952, Serial No. 312,689

16 Claims. (Cl. 179—175.2)

This invention relates to telephone systems and has for its object to facilitate the observation of telephone service.

Service observing has long been used for determining the quality of service received by individual telephone subscribers. As the telephone service itself has progressed from exclusively manual to largely dial, the methods of observing have changed from those requiring observing operators at the local office to those for automatically extending lines to be observed to positions at some centralized point.

Similarly, since toll service has until recently been largely on a manual basis, service observing on toll operators has likewise been performed manually. With the increase in the size of toll offices and the use of automatic switching equipment in such offices, manual service observing has become increasingly difficult.

In accordance with the present invention, means is provided for observing on toll operator cord circuits, on trunks incoming to recording completing toll operator positions and on toll trunks incoming to dial switching systems with means whereby the observing positions located at a centralized office may observe on a large number of circuits located at a large number of offices.

Means is accordingly provided for observing on a plurality of classes of toll equipment. Service observing circuits and service observing trunks of classes corresponding to each such class of equipment are provided at the individual offices with service observing circuits capable of observing on all classes located at a central point. Distributing means is provided for automatically connecting any one service observing trunk with any one service observing position, with means under the control of the connecting means to modify the circuits at the service observing position in accordance with the class of service observing trunk to which it has been connected.

This distributing means is so arranged that only one position is prepared to observe on a particular class of call at a time and each position is able to restrict the number of classes of call on which it may observe.

Each service observing trunk includes at least two pairs of conductors, one of which is used for signaling between the observed and observing offices and the other of which is connected with the circuit being observed and is used both for signaling and for permitting the observing operator to listen to voice currents on the circuit being observed. The signaling circuit is normally closed, indications being transmitted thereover from the service observing position as to whether or not a position is available to observe on the corresponding class of circuit. If no operator is available, the service observing circuits attached to trunks of the corresponding class are disabled. If an operator is available, when a call reaches one of the circuits to be observed, a seizure signal is transmitted to the service observing office to cause the connection of the trunk with an operator's position. When such a connection has been made, the observing trunk conductors used for both signaling and listening which are normally opened, are completed at the service observing position to transmit a call-accepted signal to the office being observed and to lock the circuit being observed to the observing position. The call-accepted signal is returned on only one observing trunk and all other observing trunks over which observations were attempted are disconnected from the distributing means and prepared for observation by another service observing position.

Each service observing trunk circuit is associated with a large number of individual service observing connector circuits which are connected to the circuits to be observed by means of patching cords and jacks. This arrangement permits the connector circuits to be patched to a selected group of circuits for observation.

Under certain circumstances during periods of heavy traffic, it may be desirable to limit the number of circuits on which observations may be made and means is provided under the control of the service observing desk by means of signals transmitted over the observing trunk circuit to selectively disable predetermined groups of service observing connector circuits.

These and other features of the invention will be more clearly understood from a consideration of the following description in connection with the drawings in which:

Fig. 1 is a block diagram showing the manner in which

Figs. 2 and 3 show a converter circuit for converting digits from a direct-current pulsing code to a multi-frequency pulsing code;

Fig. 4 shows certain control relays for an operator's key-set;

Fig. 5 shows an operator's key-set and associated pulsing relays;

Figs. 6, 7, 8 and 9 show the outgoing end of the cord circuit service observing trunk;

Fig. 10 shows a toll operator's cord circuit;

Fig. 11 shows a service observing circuit for connection with the cord circuit of Fig. 10;

Fig. 12 shows a recording completing toll trunk circuit;

Fig. 13 shows a service observing circuit for connection with the recording completing trunk of Fig. 12;

Figs. 14 and 15 show a service observing trunk for use with the service observing circuit of Fig. 13;

Fig. 16 shows an incoming intertoll trunk circuit;

Fig. 17 shows a portion of the service observing trunk and the lock-out circuit associated with the service observing circuit of Fig. 19;

Fig. 18 shows a circuit for registering the identity of the circuit being observed;

Fig. 19 shows the service observing circuit for connection with the incoming intertoll trunk circuit of Fig. 16;

Fig. 20 shows the remainder of the service observing trunk of Fig. 17;

Fig. 21 shows pulse generating relays and steering relays for transmitting the identity of the circuit under observation to the service observing position;

Fig. 22 shows the distributing circuit for the service observing trunk of Figs. 6 to 9;

Fig. 23 shows the distributing circuit for the service observing trunk of Figs. 14 and 15;

Fig. 24 shows the distributing circuit for the service observing trunk of Figs. 17 and 20;

Figs. 25 to 30 and 32 show the equipment at an intermediate position of a service observing desk;

Figure 25:
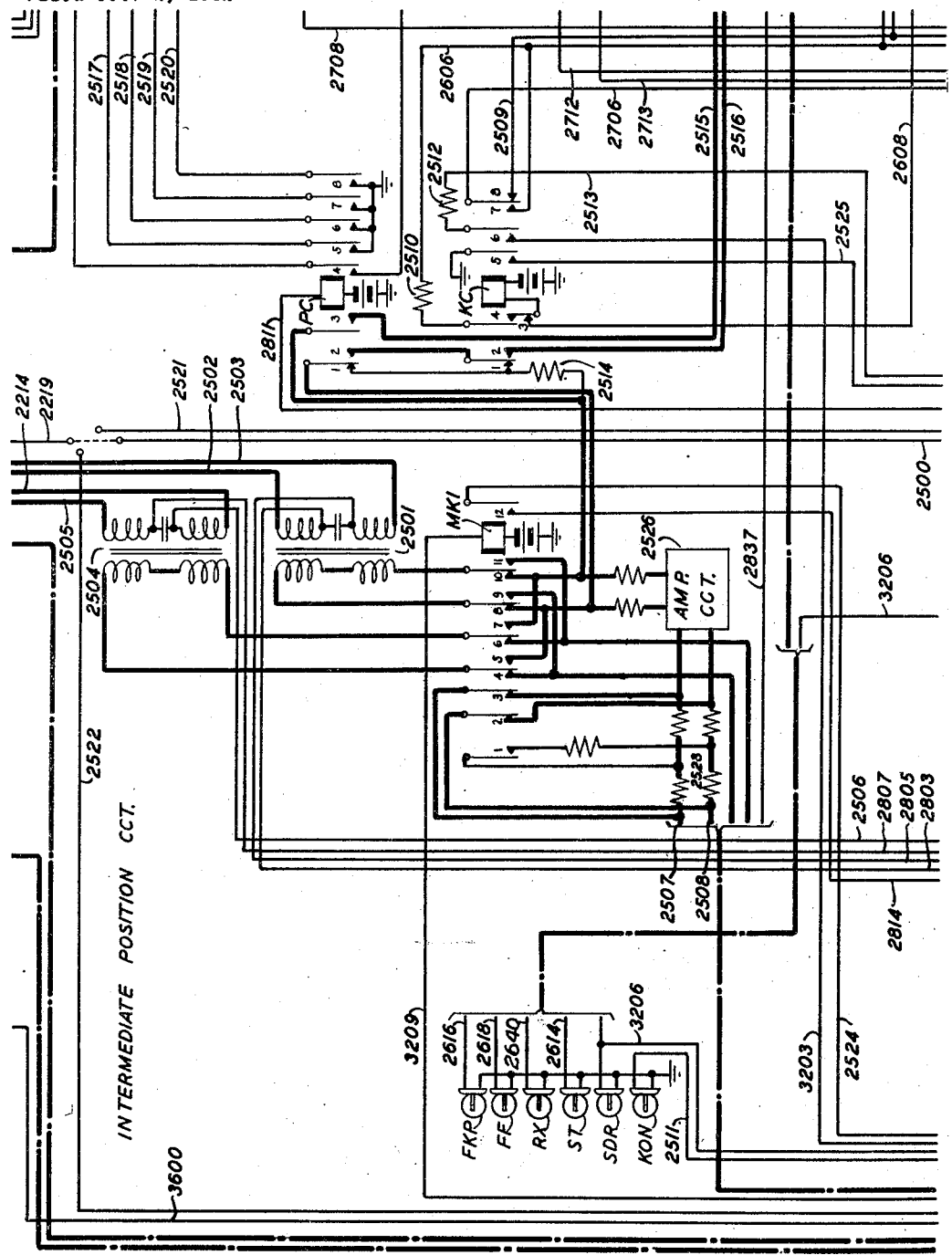
Figure 26:
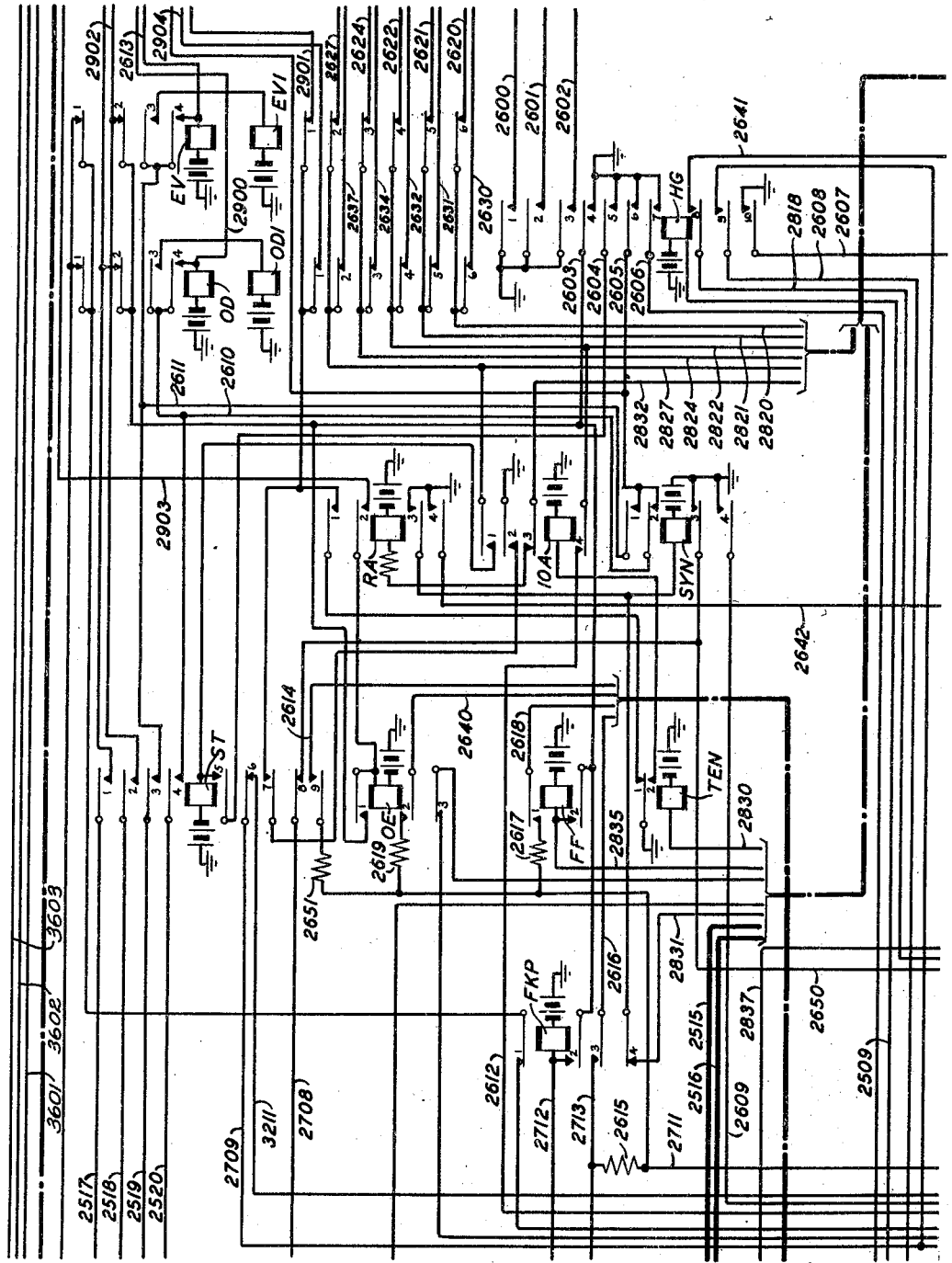
Figure 27:
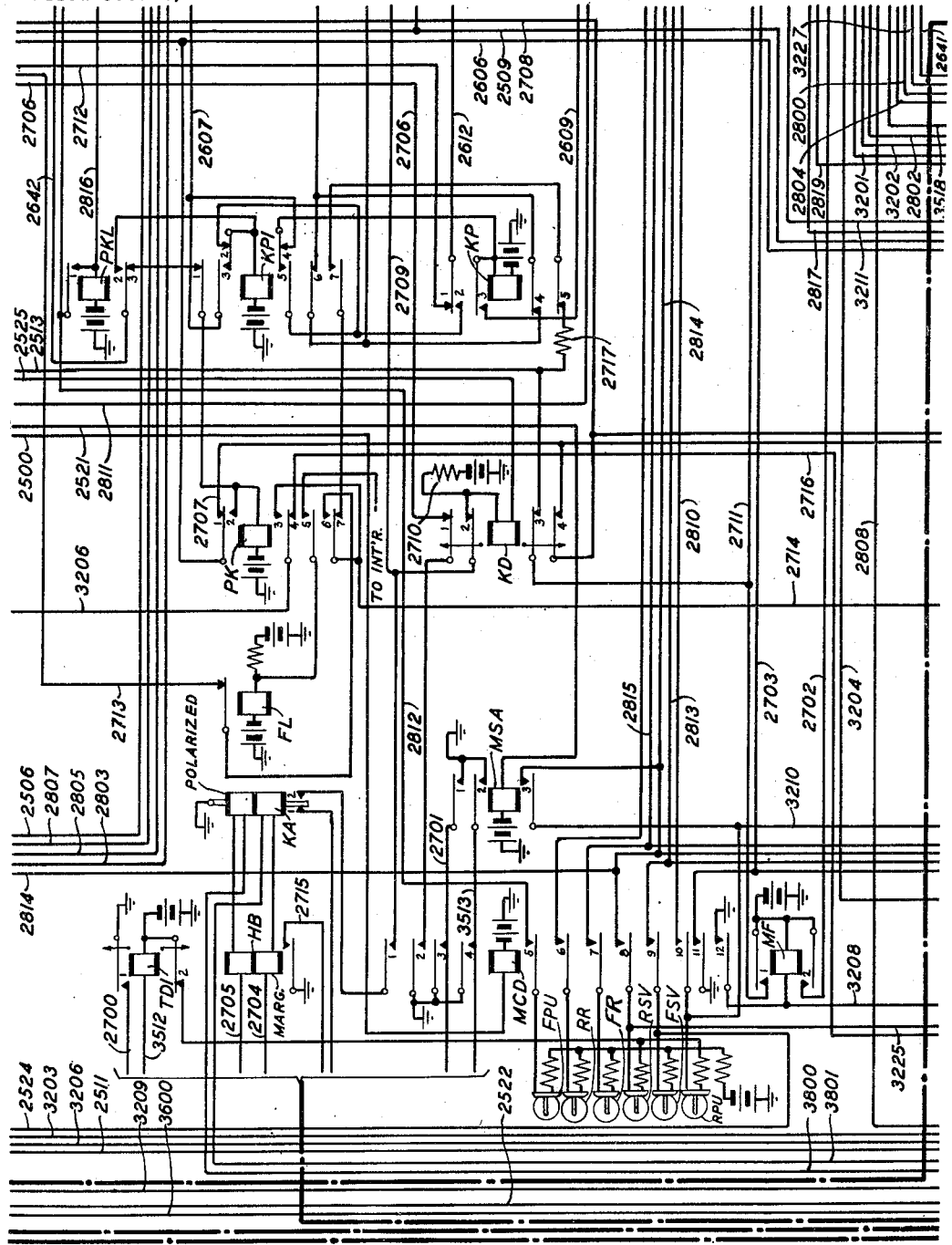
Figure 28:
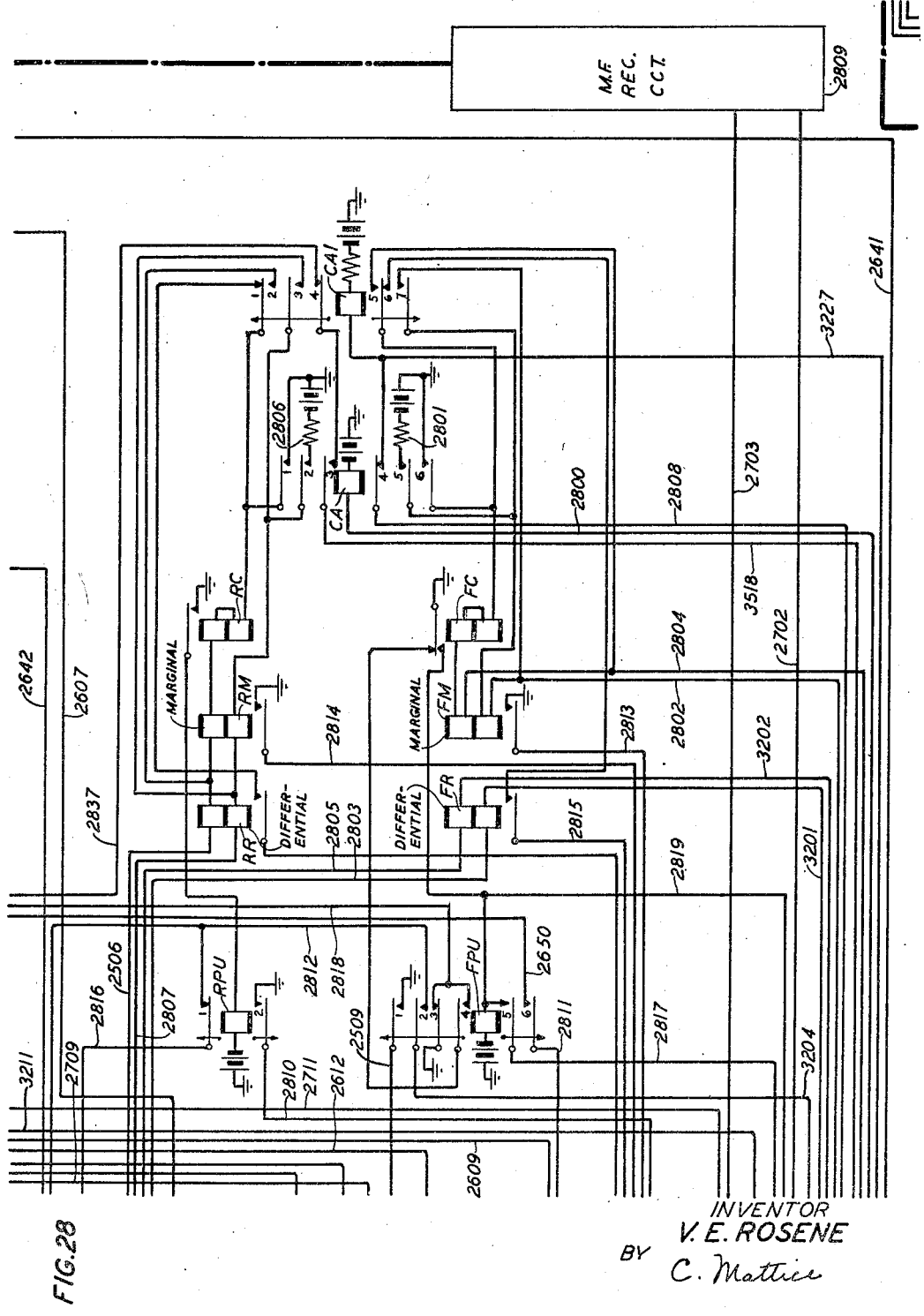
Figure 29:
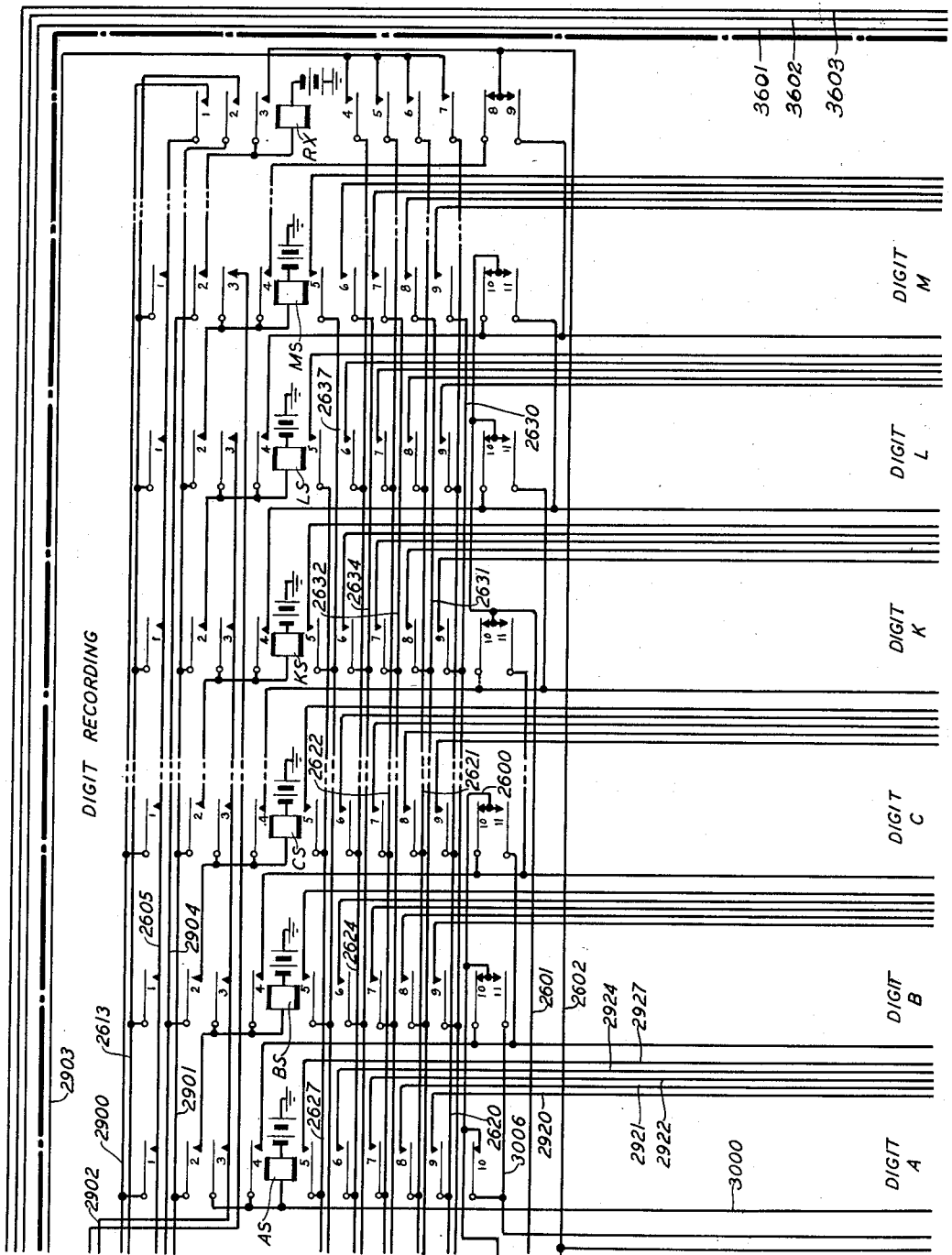
Figure 30:
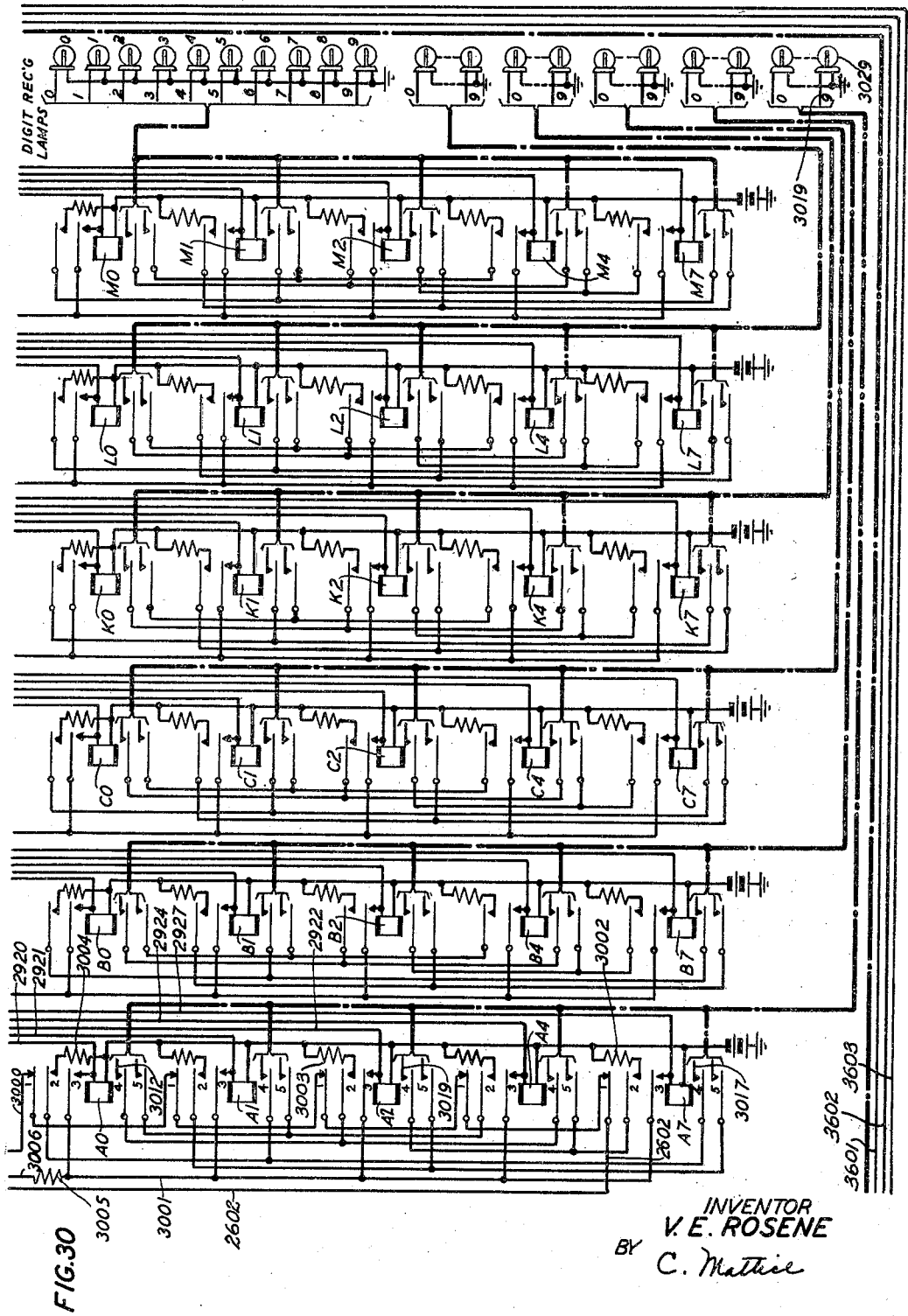
Figure 31:
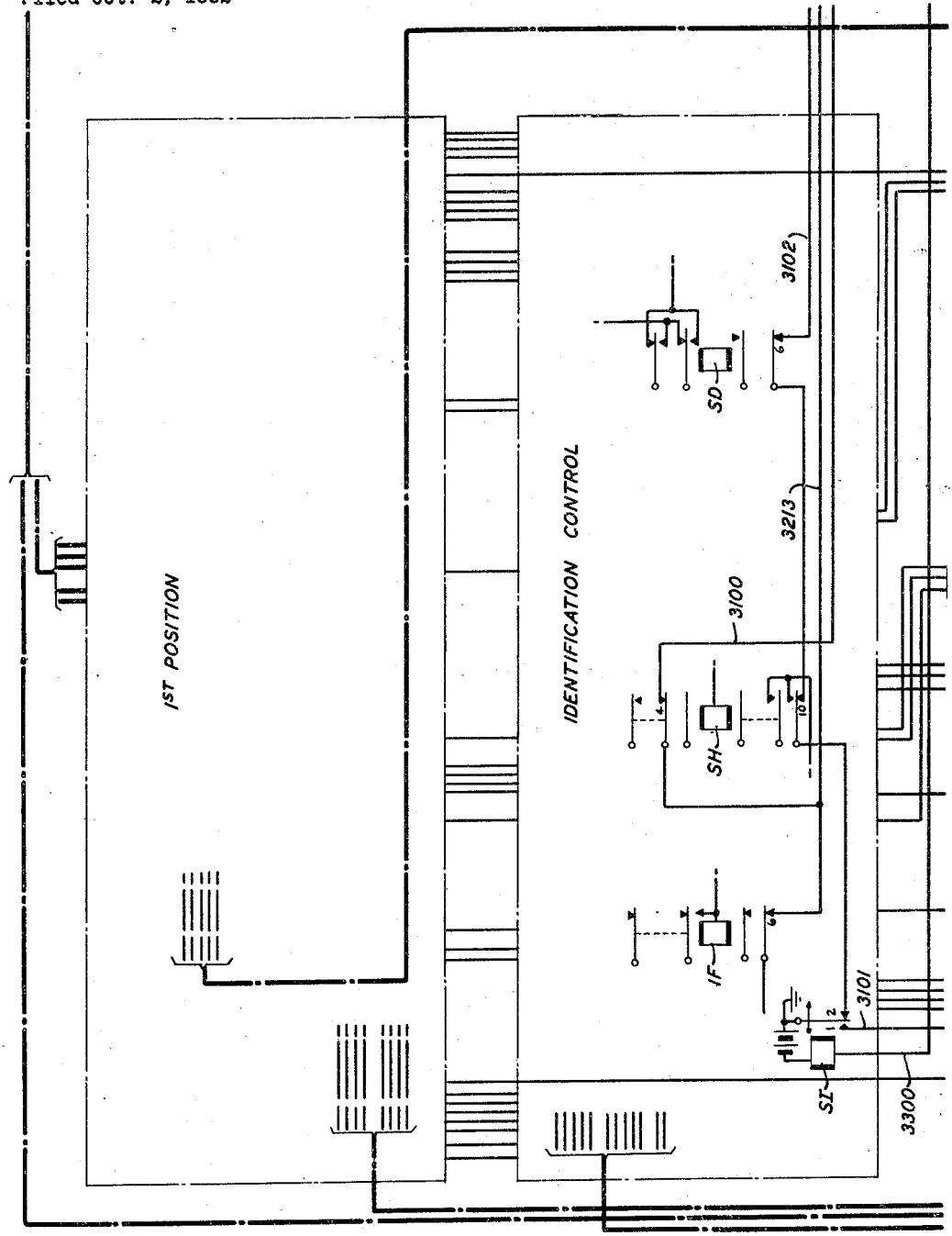
Figure 32:
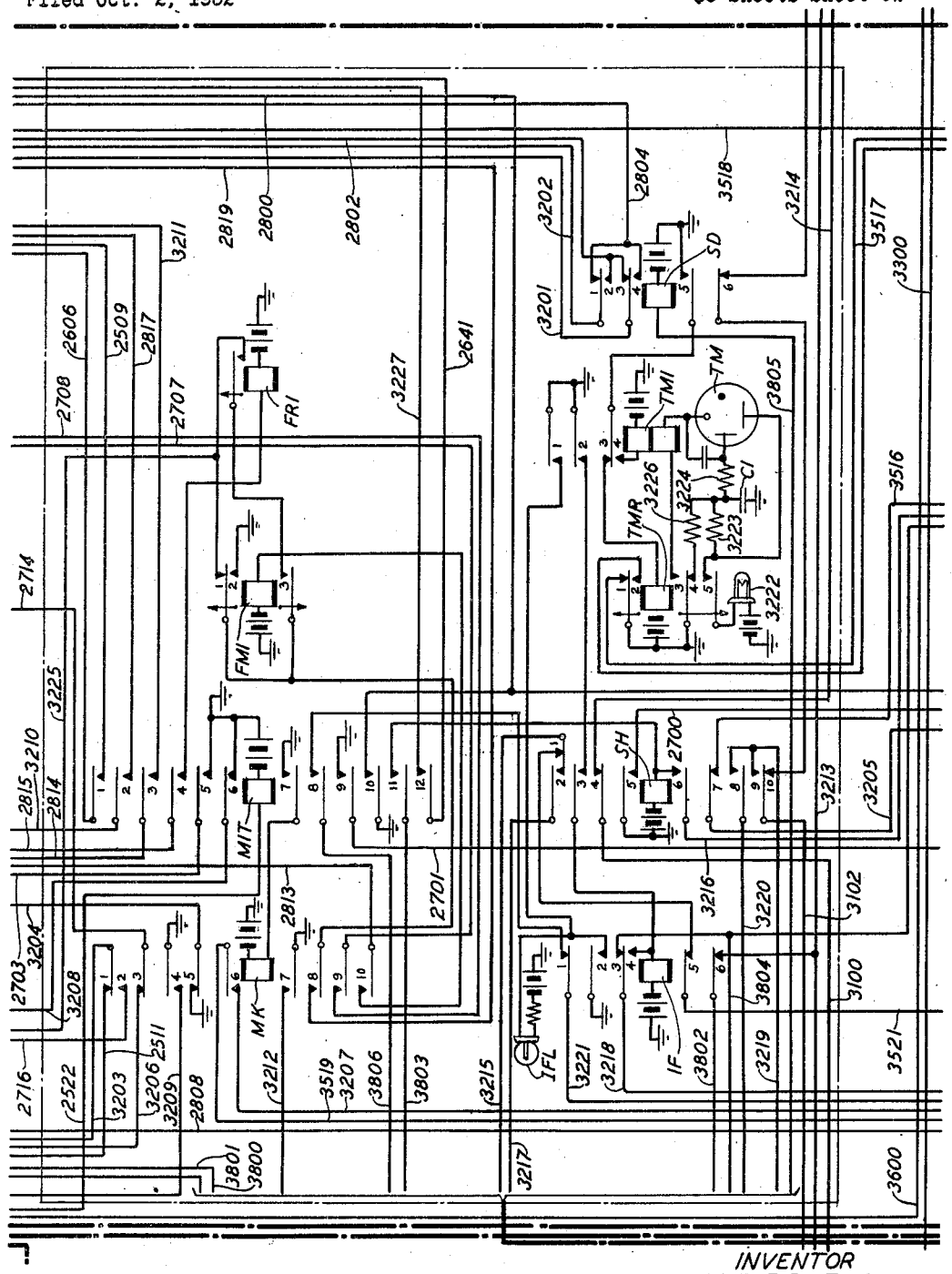
Figure 33:
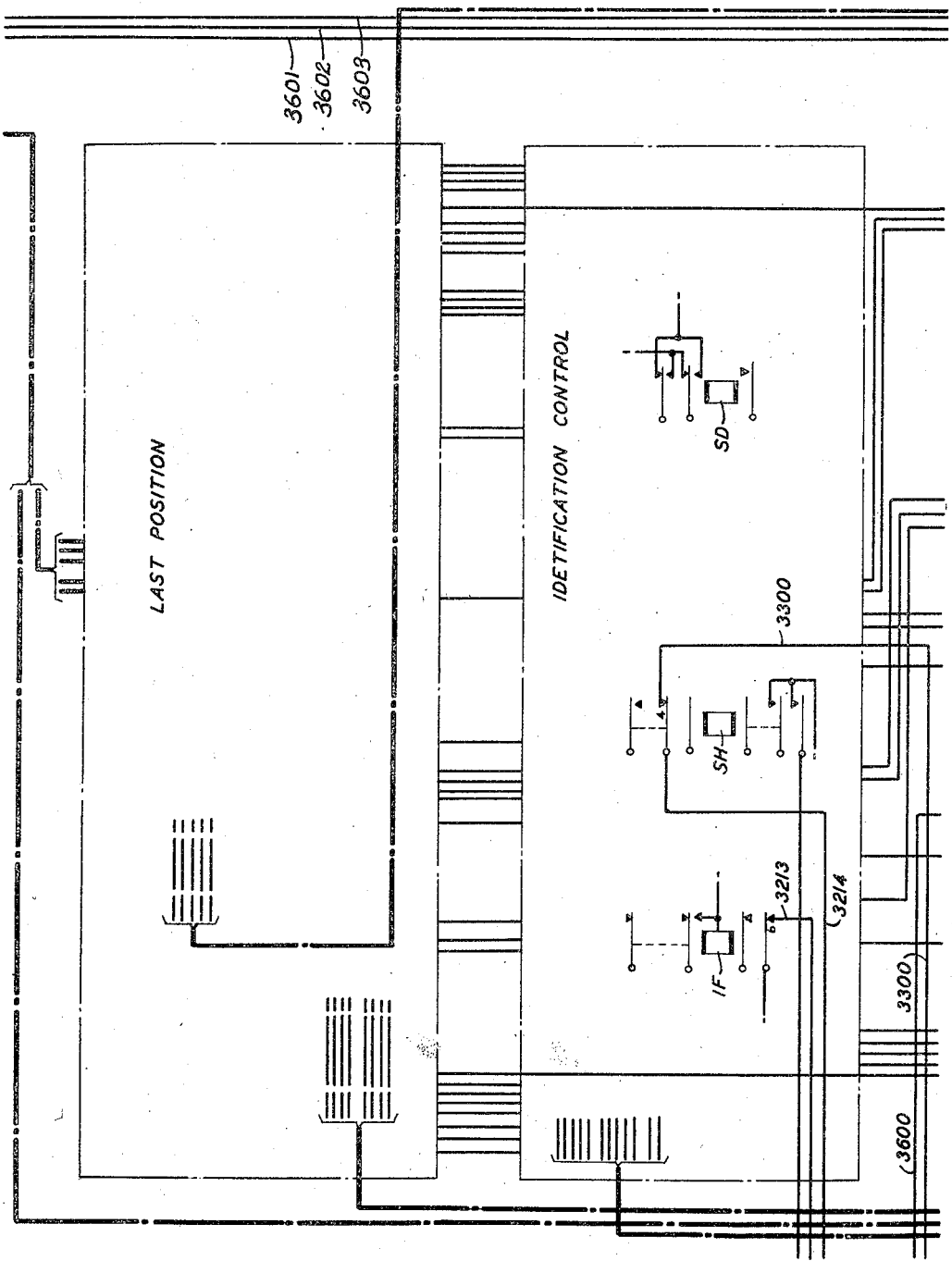
Figure 34:
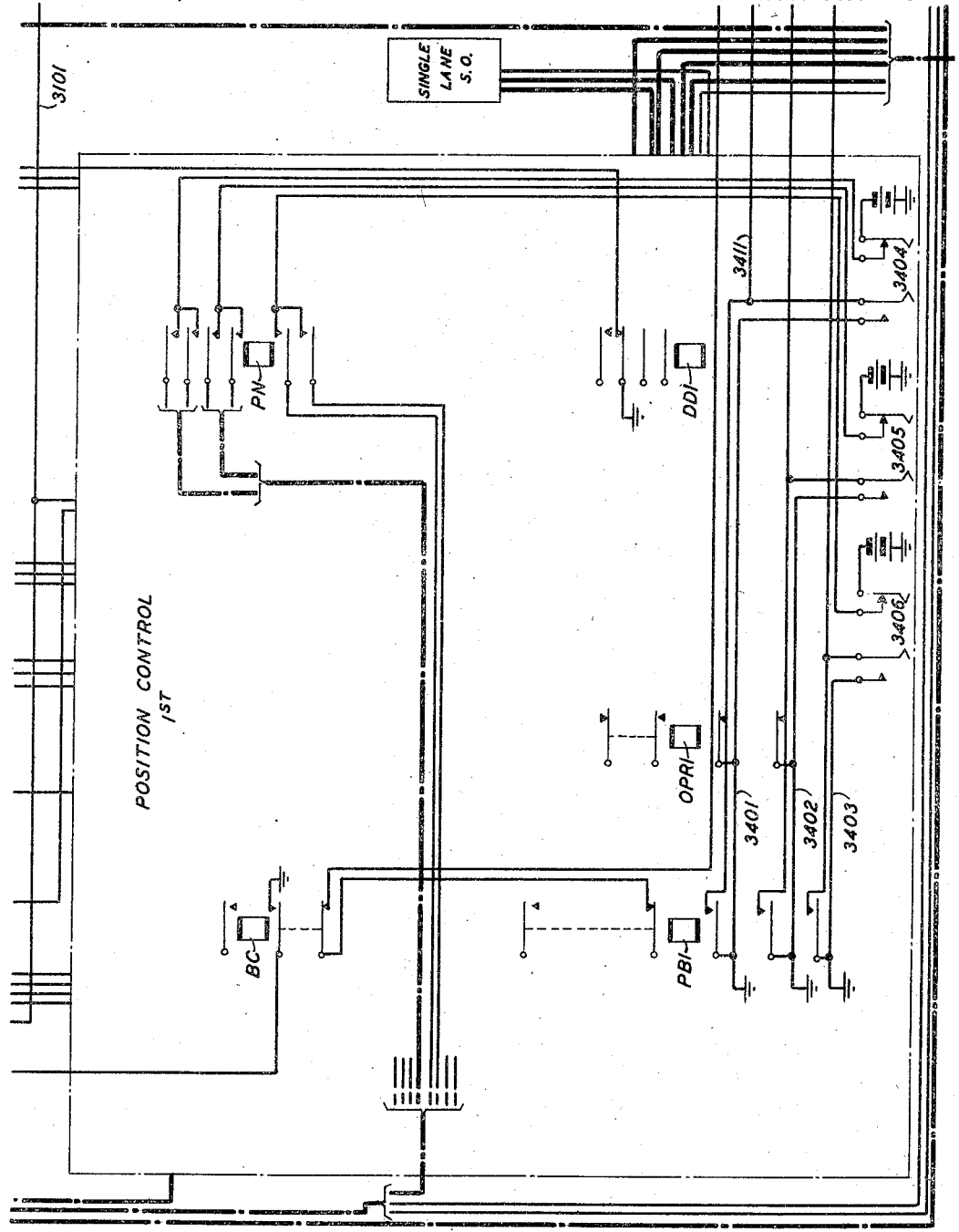
Figure 35:
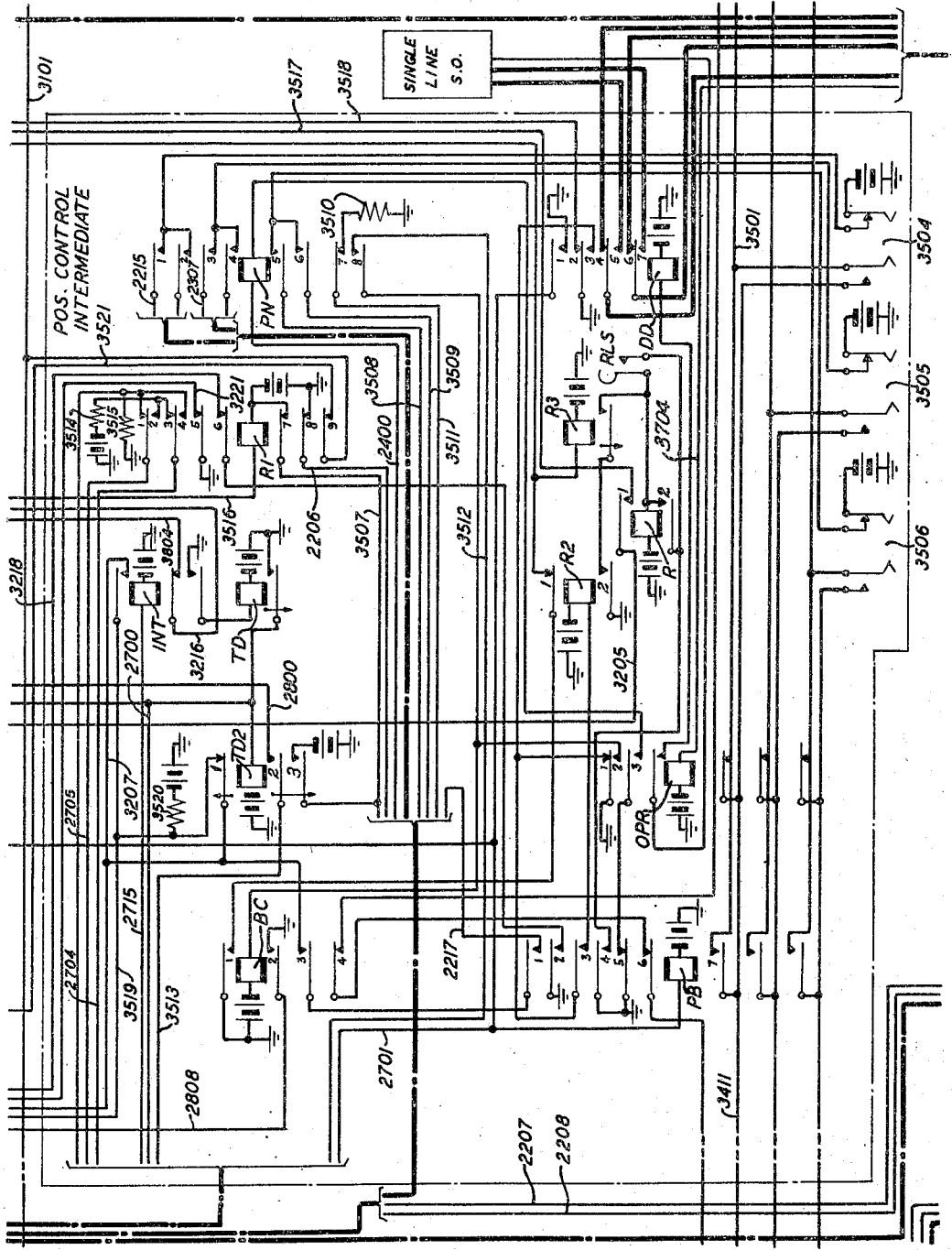
Figure 36:
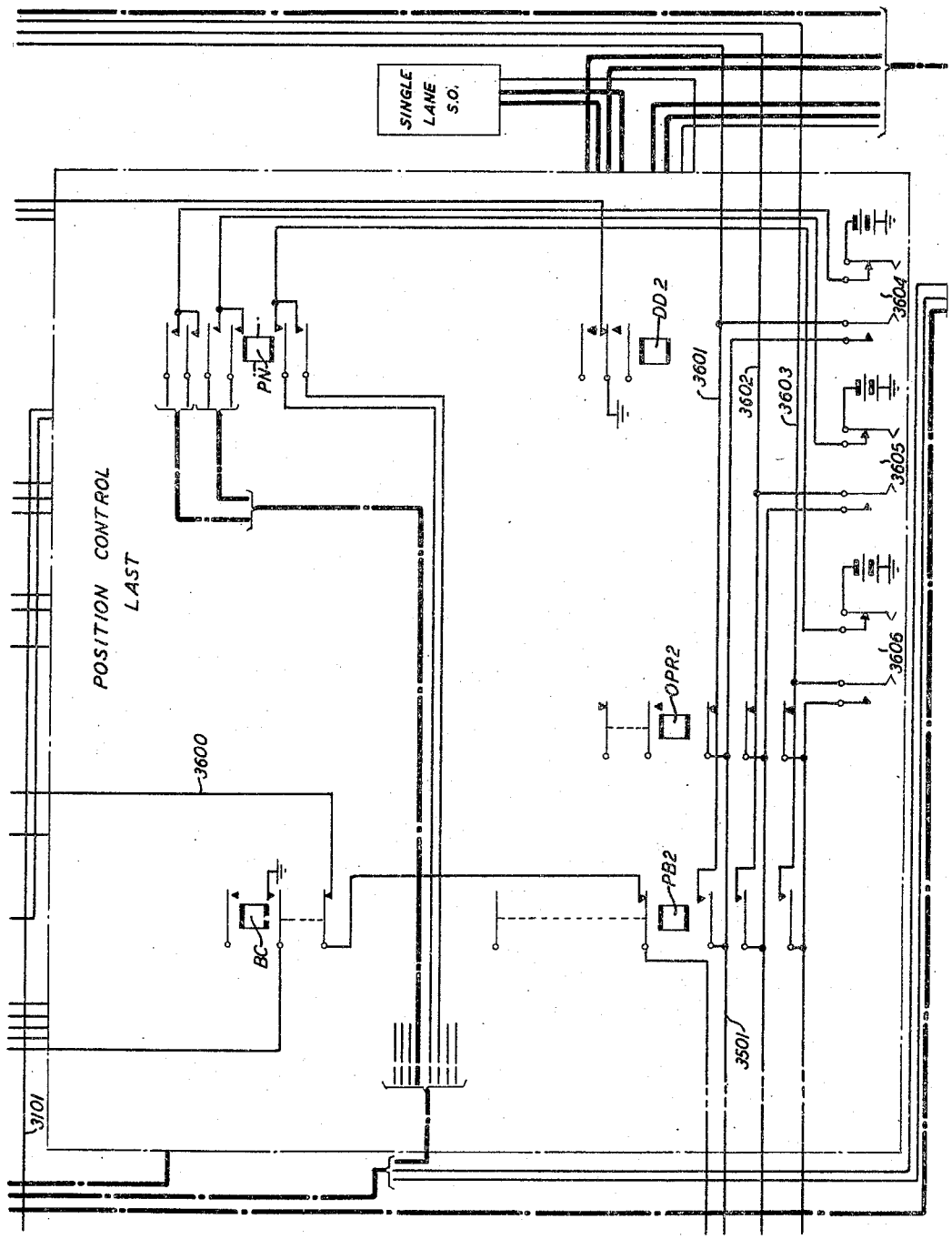
Figure 37:
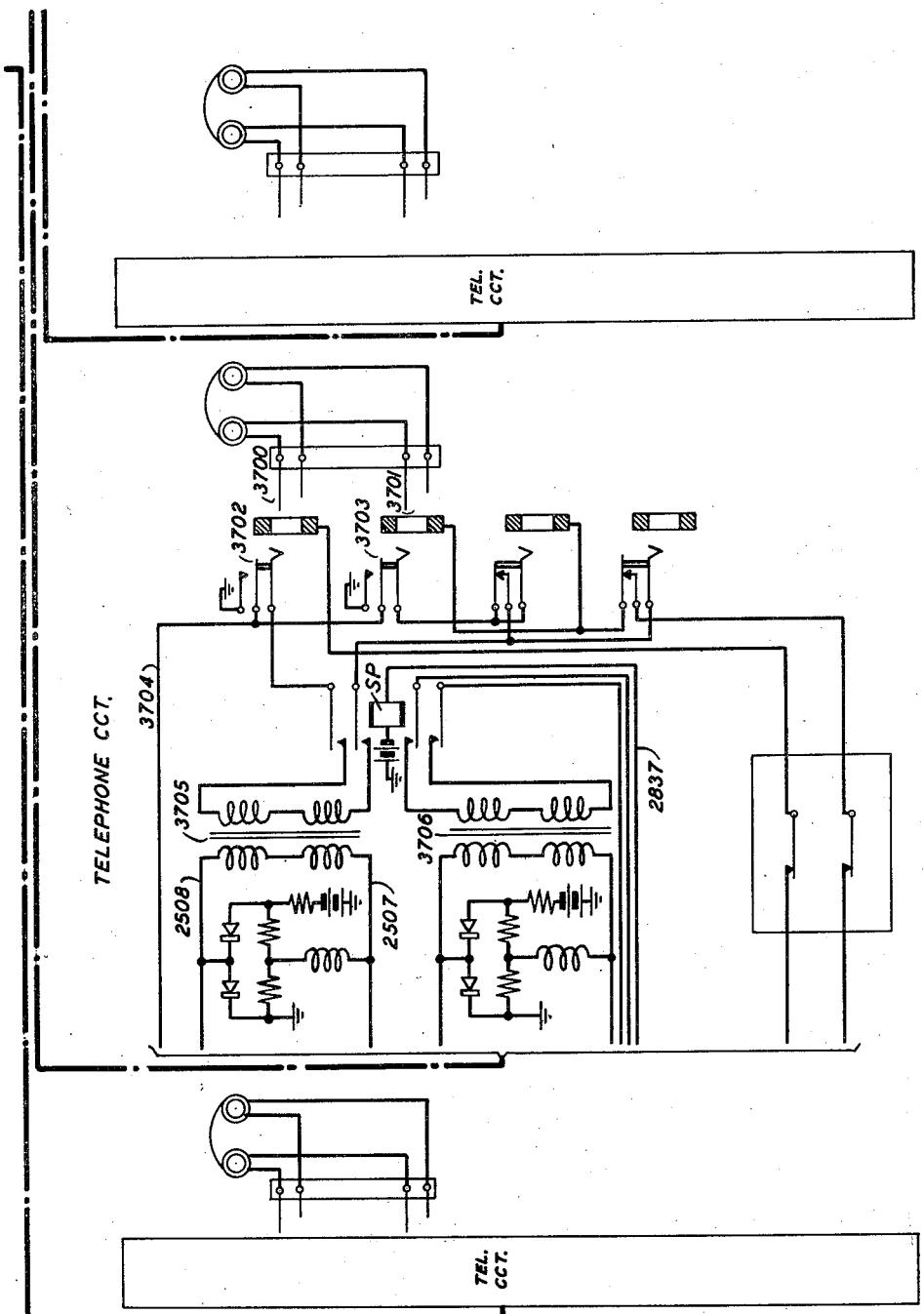
Figure 38:
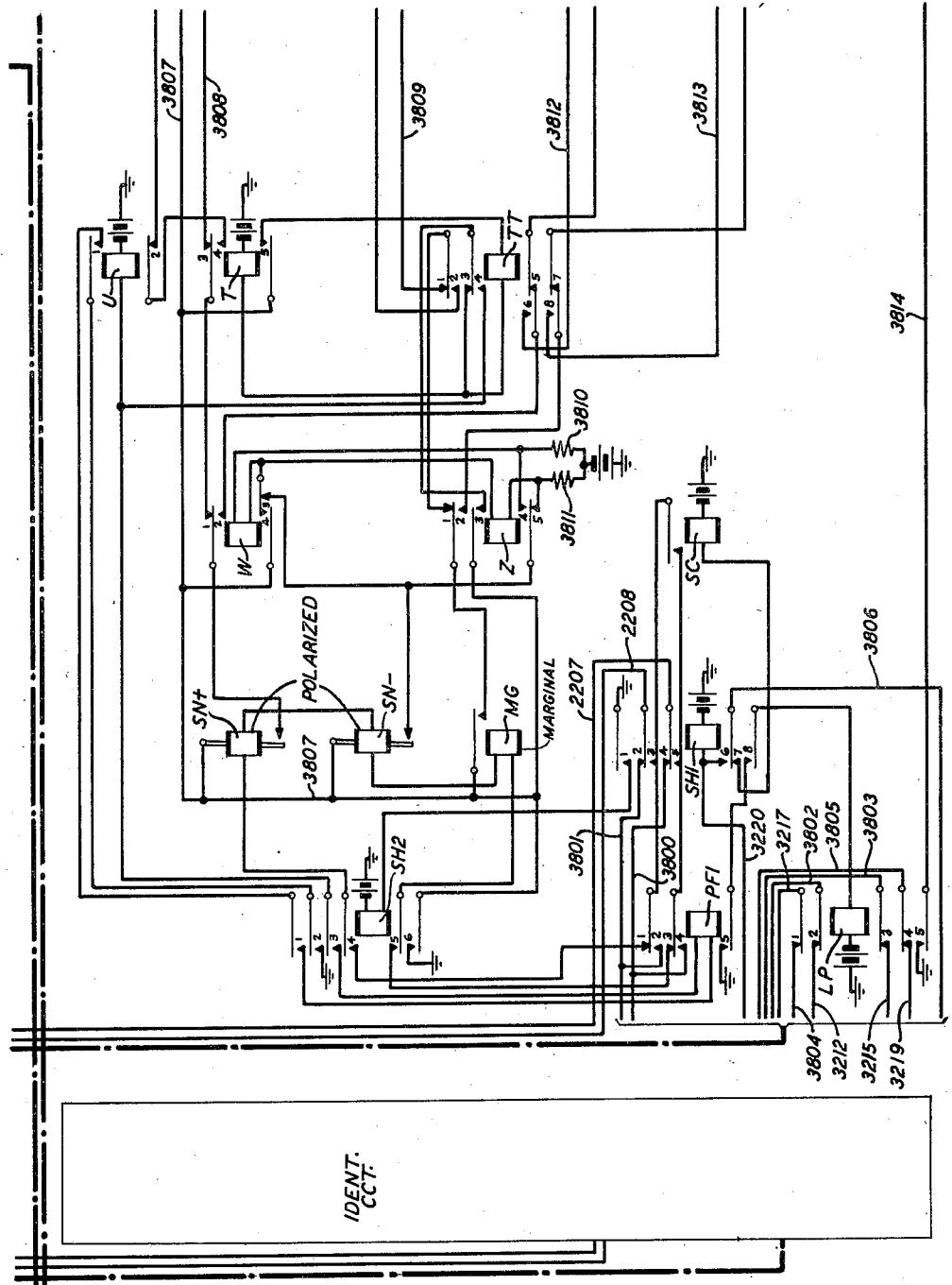
Figure 39:
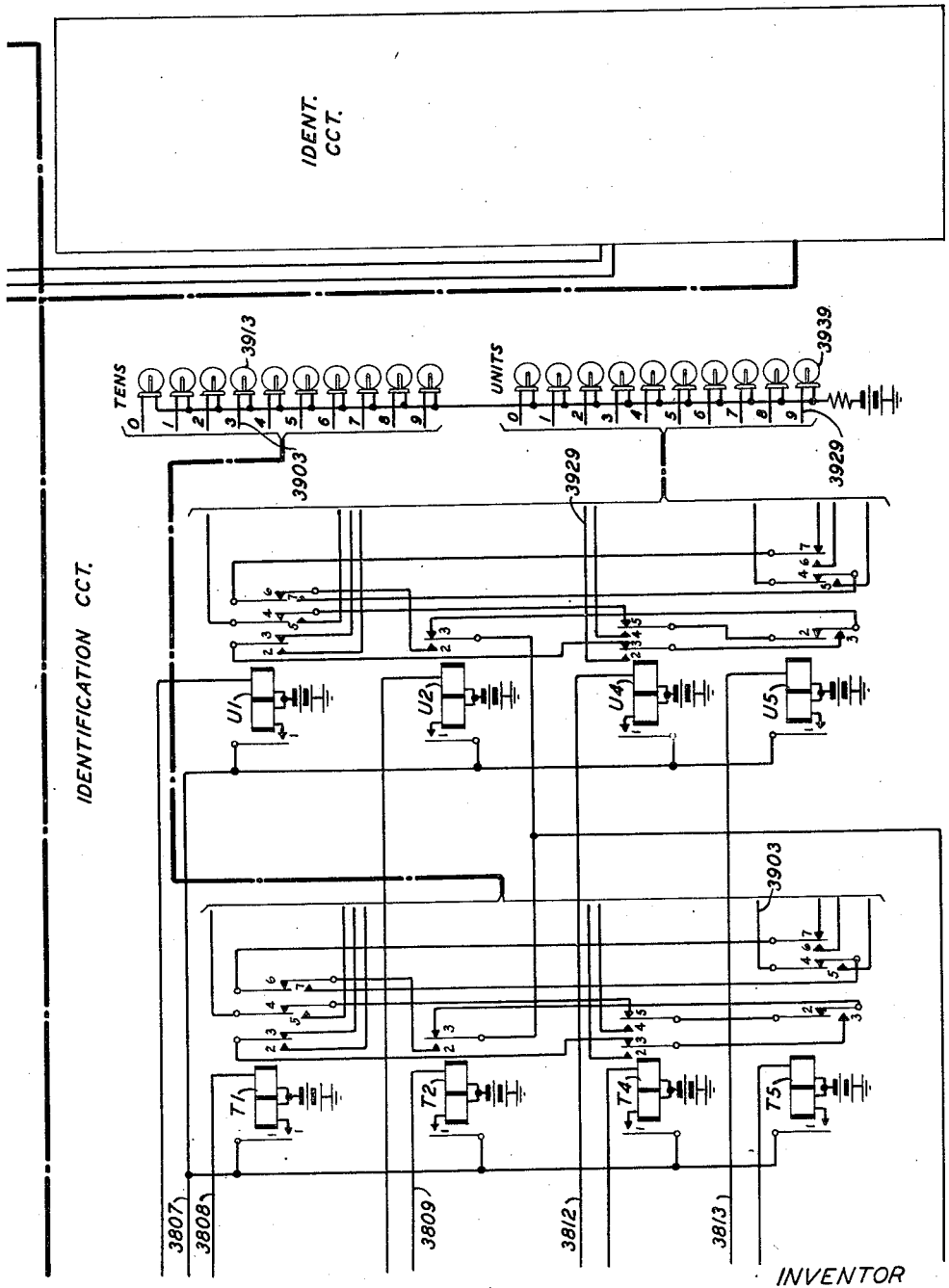

Fig. 25 showing the incoming repeating coils at one service observing position;

Fig. 26 showing control relays for registering a line designation;

Fig. 27 showing one of the interoffice signaling circuits and certain control relays;

Fig. 28 showing other interoffice signaling circuits;

Fig. 29 showing the steering relays for recording a line designation;

Fig. 30 showing the registers for registering a line designation;

Fig. 31 shows in schematic form the equipment at the first position of the service observing desk;

Fig. 32 showing the means for indicating the class of circuit being observed;

Fig. 33 shows in schematic form the equipment at the last position of the service observing desk;

Fig. 34 shows in schematic form the position control circuit for the first position;

Fig. 35 shows the details of the position control circuit of an intermediate position;

Fig. 36 shows in schematic form the position control circuit of the last position;

Fig. 37 shows the operator's telephone circuit;

Fig. 38 shows the pulse receiving circuit for recording the identity of the circuit under observation; and Fig. 39 shows the registers for recording the identity of the circuit under observation.

In general the relays of the disclosure have been given functional letter designations, such designations being followed by the number of the figure in which the relay appears, set off by parentheses. Other pieces of equipment, with a few exceptions, are given numerical designations.

Briefly the service observation desk is arranged to make complete observations on toll operators' cord circuits and on incoming intertoll trunks and to observe the speed of answer on recording completing trunks located at a number of offices. The circuits to be observed are connected by means of a plug, jack and cord arrangement to individual service observing connector circuits arranged in preference chains so that only one service observing connector circuit may be made effective at one time to seize a service observing trunk. If two circuits attempt to operate their service observing connector circuits at the same time, one will be preferred and the other locked out. Separate service observing trunks are provided for each class of observation. These trunks may include two or three pairs of conductors, one of which is only used for signaling between the trunk circuit and the operator's position, while the other one (or two) is used for observing on the connected circuit. At the service observing desk the service observing trunks are distributed to the available operators' positions indicating to the position the class of trunk which has been connected therewith. This class indication arranges the signal receiving circuits and the indicating circuits to make them responsive to the signals generated by the equipment under observation. Each position is provided with keys by which observation may be limited to certain classes of circuits. Each service observing trunk is also provided with keys by which the number of circuits to which it may be connected is reduced.

Figure 10:
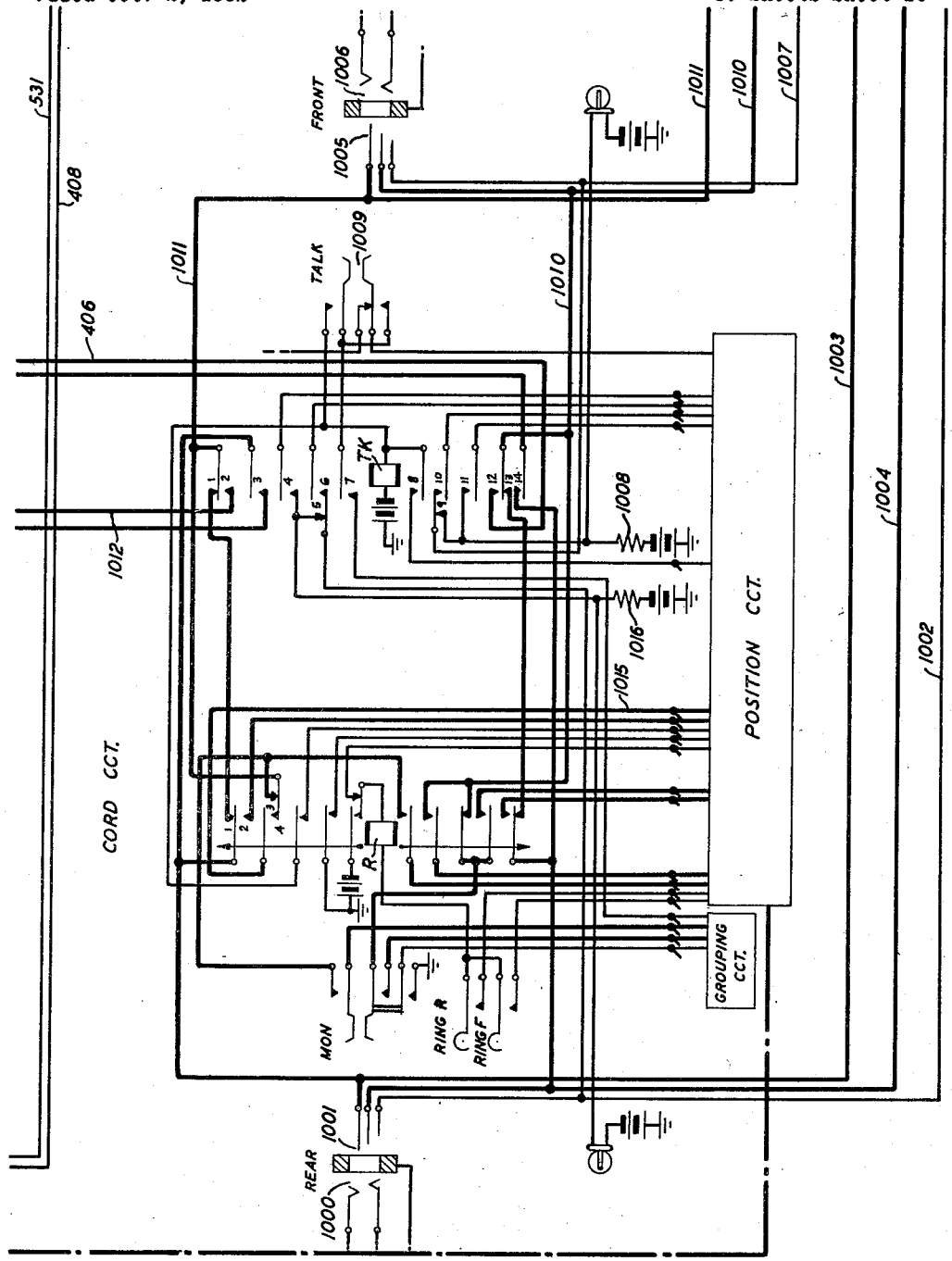
Figure 12:
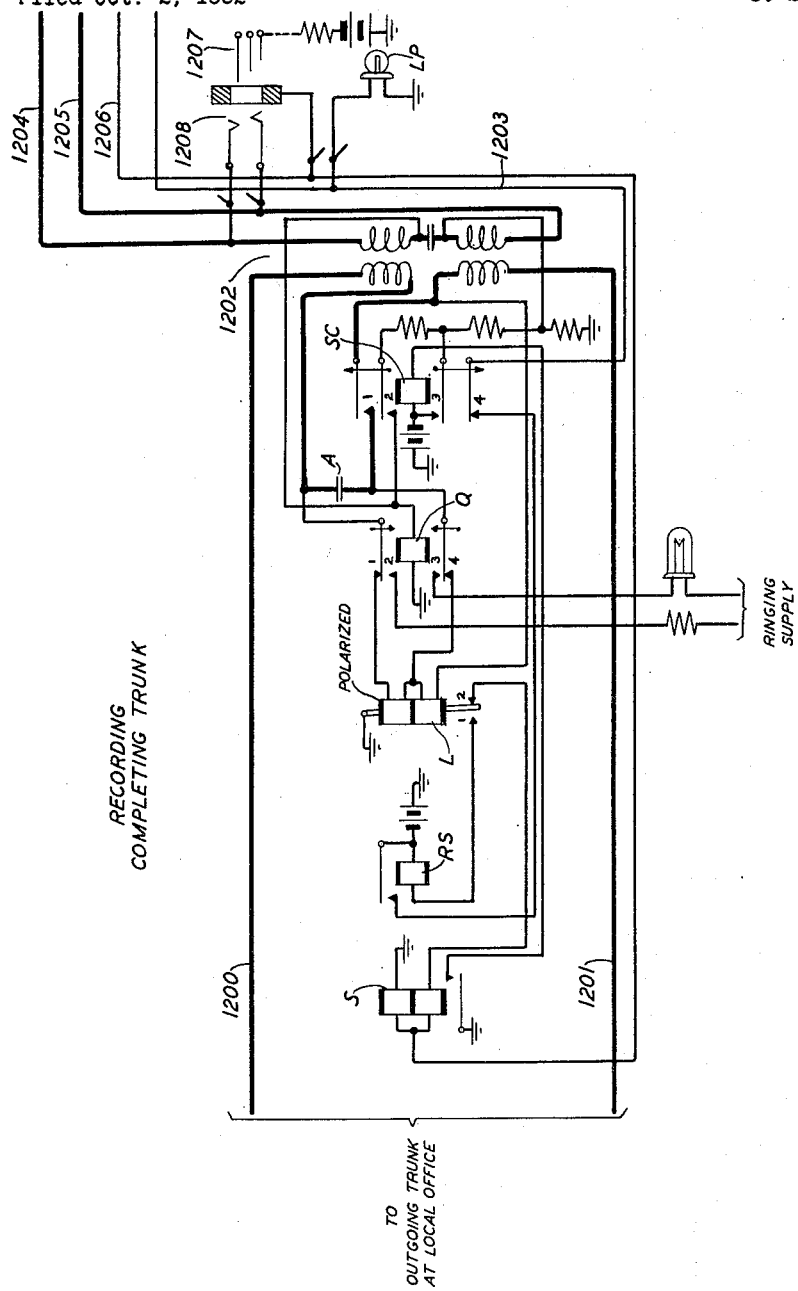
Figure 16:
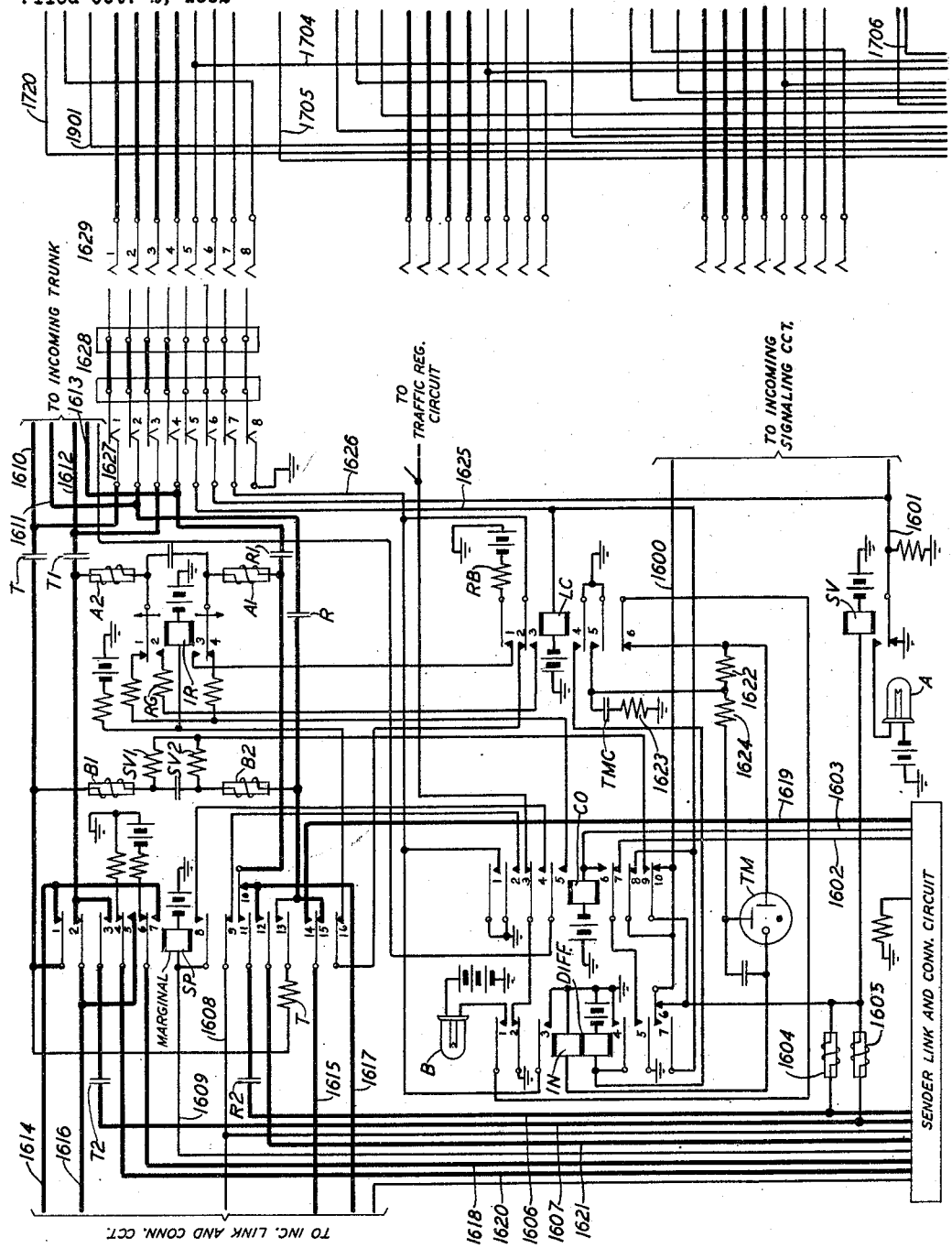

For the purpose of describing the invention a typical cord circuit, incoming intertoll trunk and recording completing trunk have been shown but it is to be understood that other circuits differing in details from those shown may also be observed. The cord circuit shown in Fig. 10 is similar to one disclosed in Patent 2,276,515 to L. F. Porter, January 18, 1944. The incoming intertoll trunk shown in Fig. 16 is similar to one disclosed in Patent 2,564,441 to McKim-Strickler, August 14, 1951. The recording completing trunk circuit shown in Fig. 12 is similar to one disclosed in the application of R. B. Buchanan, Serial No. 67,868, filed December 29, 1948, which issued as Patent No. 2,636,944 on April 28, 1953. Reference may be made to the above-identified patents for an understanding of the operation of the circuits in complete systems.

In describing the service observing operation, the observation of a call handled by a cord circuit will first be described in detail, and then the observation of a call on an incoming intertoll trunk and the observation of a call on a recording completing trunk will be described with an indication of the changes in operation of the service observing position to correspond with such calls.

*Preparing the service observing position for operation*

When an operator occupies the intermediate service observing position, she inserts the plugs 3700 and 3701 of her headset in the jacks 3702 and 3703 of the position, thereby closing the auxiliary jack contacts to ground conductor 3704, and operate position occupied relay OPR(35). With relay OPR(35) operated, a circuit is closed from ground over contact 2 of relay OPR(35) to battery through the winding of relay BC(35), operating the latter relay. Relay BC(35) at its contacts 2 connects ground to conductor 2808 completing a circuit over contact 4 of relay CA(28) to battery through the winding of relay CA1(28), operating the latter relay. When the position is busy, position busy relay PB(35) is operated as will be described hereinafter.

Figure 22:
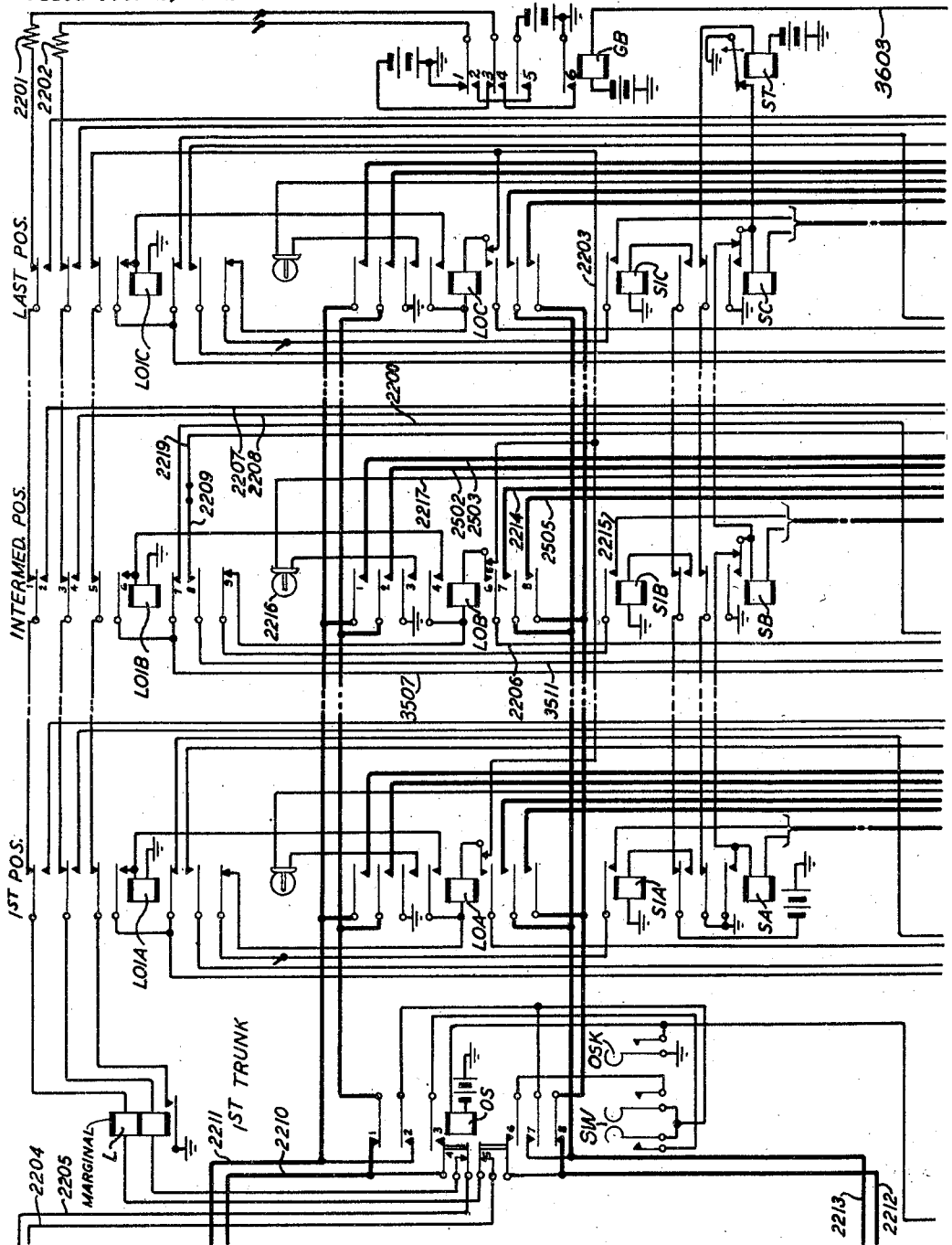
Figure 23:
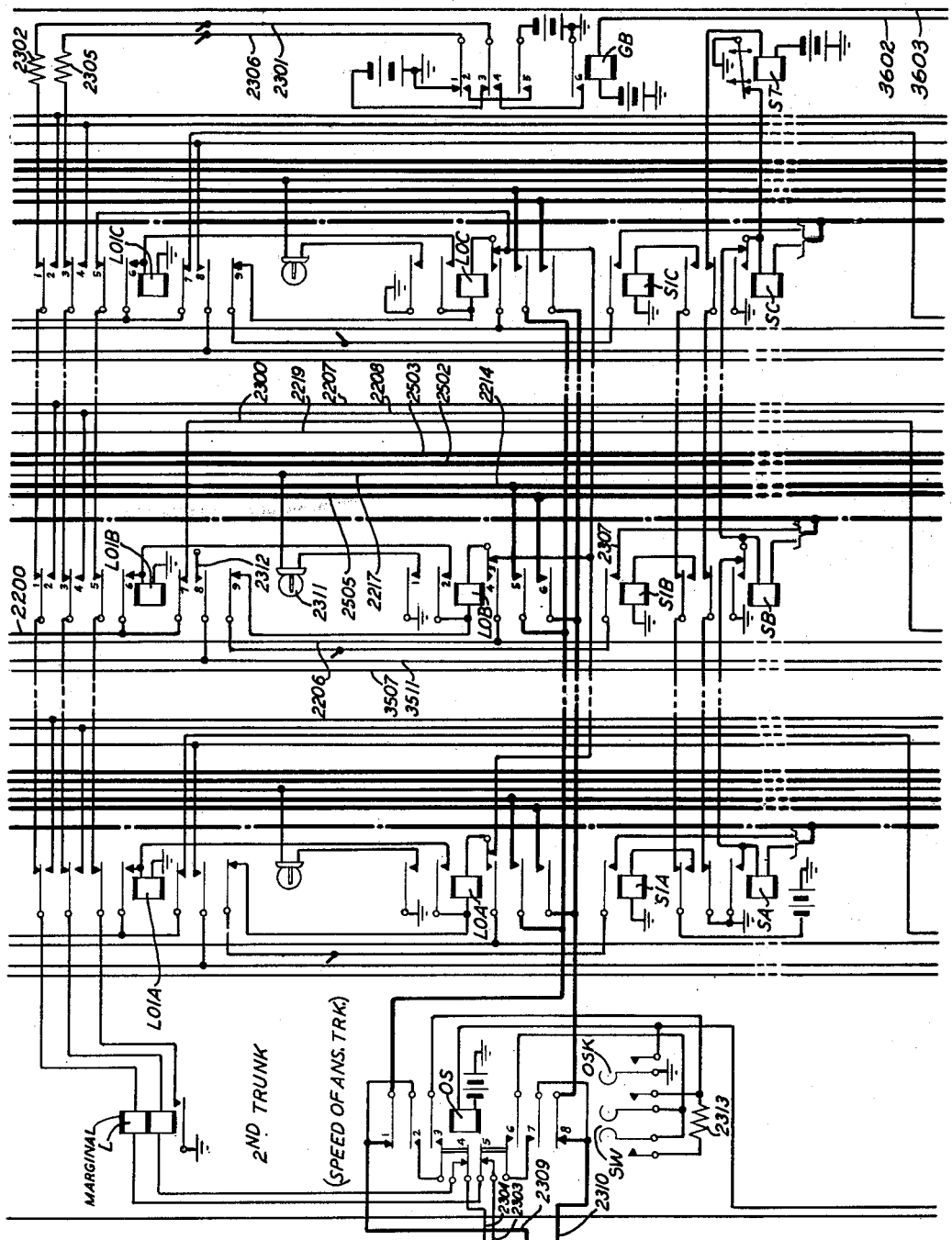
Figure 24:
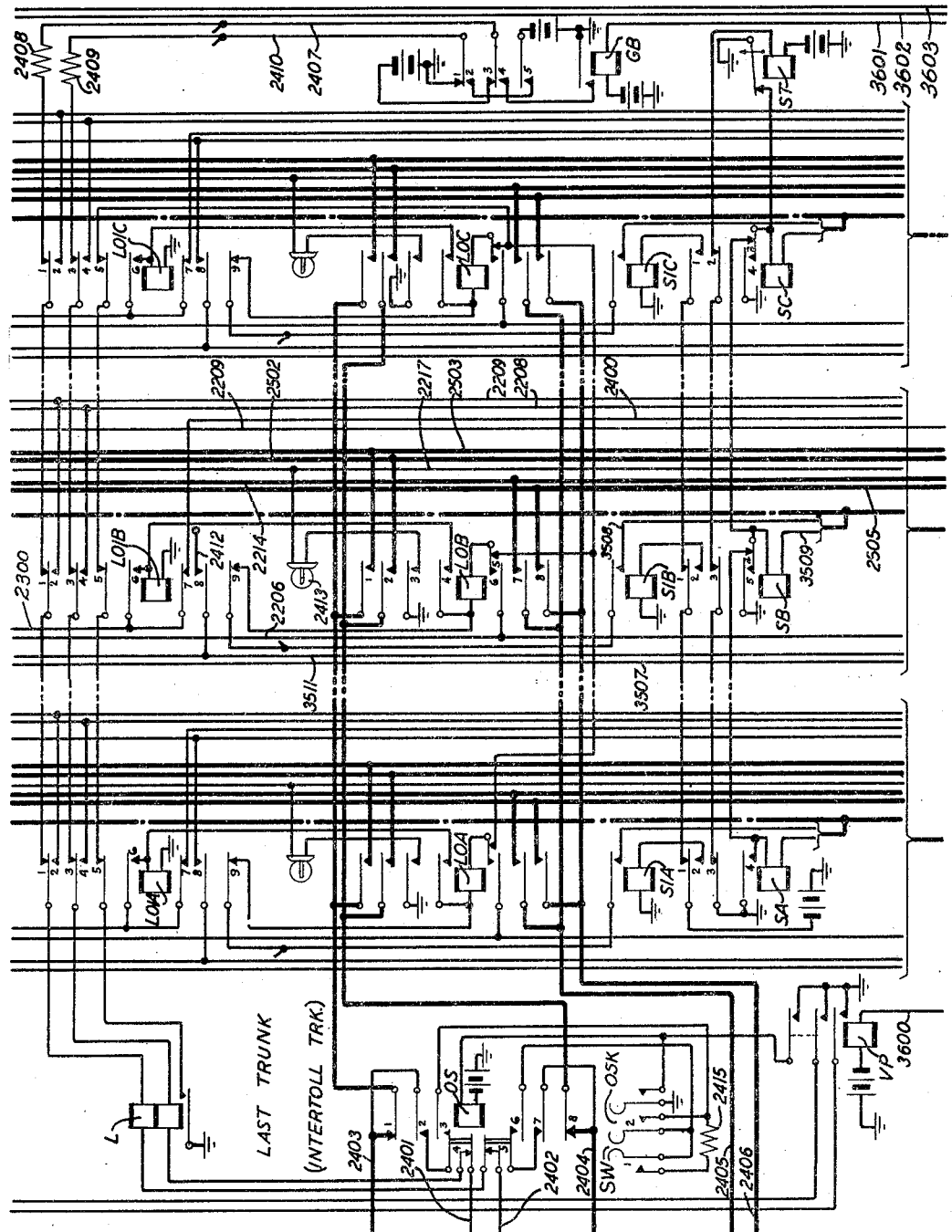

When none of the positions is occupied, a vacant position circuit is closed which extends from ground over the back contact 6 of relay PB(35) and contact 4 of relay BC(35) and over back contacts of similar relays in all other positions to conductor 3600, operating relay VP(24) to indicate to the distributing circuits of Figs. 22, 23 and 24 that no operator is available. Relay VP(24) operates the out-of-service relay such as relay OS(24) for each of the service observing trunks and these relays open the signaling circuits leading to the distributing circuits. If necessary, a plurality of relays such as relay VP(24) may be operated in cascade to provide sufficient contacts for operating all of the out-of-service relays. If any position is available none of the relays OS(24), etc. will be operated.

In addition, there is a group busy conductor for each class of circuit to be observed, which is controlled by the observing positions. At each position there is an incoming group busy conductor and an outgoing group busy conductor for each class of circuit to be observed, the outgoing conductor for one position becoming the incoming conductor for the next position. The two conductors for each class of circuit may be connected together if the position busy relay is operated, if the position occupied relay is released or if the class exclusion key is operated. At the first position, the incoming group busy conductors are connected to ground and at the last position the outgoing group busy conductors are connected to conductors 3601, 3602 and 3603, over which the group busy relays GB(22), GB(23) and GB(24) of the trunk distribution circuit are operated. To illustrate the operation of these group busy circuits assume that the first position (Fig. 34) is not occupied, the second position (Fig. 35) is busy and the third position (Fig. 36) is occupied but idle and has operated class exclusion key 3604. Therefore a circuit will be closed from ground on the incoming group busy conductor 3401 of the first position, over the closed back contact of the position occupied relay OPR(34) to the outgoing group busy conductor 3411. Conductor 3411 which is the incoming group busy conductor for the position of Fig. 35 is connected over contact 7 of the position busy relay PB(35) to the outgoing group busy conductor 3501. Conductor 3501 which is the incoming group busy conductor of the position of Fig. 36 is connected over the left closed contact of the class exclusion key 3604 to conductor 3601 operating group busy relay GB(24). Similar circuits are provided for the other classes. While only three positions have been shown, it will, of course, be understood that the number of positions to be provided will be governed by the number of offices to be observed and the traffic at such offices. Each position will have the same three means of connecting together their incoming group busy conductors and their outgoing group busy conductors and ground will reach conductors 3601, 3602 or 3603 only if one such means is closed at each position.

When a group busy relay such as relay GB(24) is operated, the connection of battery and ground is reversed to the signaling circuit of service observing trunks of the related class to transmit a group busy signal to the offices at which the service observing trunks originate. When relays GB(24), etc. are normal, battery and ground are transmitted in the normal direction to the trunk circuit to prepare it for connection with a circuit to be observed.

The service observing trunks are connected with the service observing positions by means of the distributing circuits of Figs. 22, 23 and 24 comprising pairs of relays such as relays LOA(24) and LO1A(24). As will appear hereinafter, each pair of relays forms a part of two coordinately arranged preference chain circuits, one chain individual to a trunk having a pair of relays for each operator position and the other chain individual to a position having a pair of relays for each trunk. The operation of one pair of relays connects the individual trunk with the individual operator position and renders the remaining relays in the two chains ineffective. The operator chains are so arranged that the cord service observing trunks have the preferred position, the recording completing service observing trunks have the next preference and the intertoll service observing trunks have the last preference, but by the use of the class exclusion keys above mentioned, certain positions may be reserved for the less preferred classes. With a plurality of positions available for a particular class of observation, the positions are allotted in rotation so that only one position is bidding for a call in one class at one time. When a position is occupied and idle and has not been connected with any service observing trunk, a circuit is closed for a position normal relay at that position. The circuit of the position normal relay PN(35) at the intermediate position may be traced from battery, contact 7 of relay R1(35), conductor 3507, contact 7 of relay LO1B(22), conductor 2200, contact 7 of relay LO1B(23), conductor 2300, contact 7 of relay LO1B(24), conductor 2400, winding of relay PN(35), contact 3 of relay OPR(35) to ground at contact 5 of relay PB(35). As above mentioned there is a relay like relay LO1B(24) associated with each trunk for each position. The circuit above traced for relay PN(35) extends over contacts 7 of the intermediate trunk relays.

With relay PN(35) operated, a circuit is further closed from ground over contact 2 of relay OPR(35), contact 8 of relay PN(35), conductor 3512 to battery through the winding of relay TD1(27). Relay TD1(27) operates and closes a circuit from ground over its contact 1, conductor 2700 to battery through the winding of relay TD2(35) operating the latter relay.

Relay PN(35) also closes circuits for marking the position available to each class of trunk on which the position is ready to observe. For example, battery is connected over the normally closed right contact of key 3506, over contact 6 of relay PN(35), conductor 3509 to the winding of position allotter relay SB(24). Relays SA(24), SB(24), SC(24) and the intermediate relays individual to other positions are arranged in a chain circuit. Similar circuits are closed for the position allotter relays of the other classes of trunks if the associated class exclusion keys are normal.

Whenever no position is waiting to observe on a particular class of service, for example on intertoll trunks, the corresponding relays SA(24), SB(24) and SC(24) will be released and a circuit will be closed from ground over contact 3 of relay SA(24), contact 3 of relay SB(24), contact 2 of relay SC(24) to battery through the winding of allotter start relay ST(24). Relay ST(24) operates and connects ground over its contact to the winding of relay SC(24) and over the normally closed contact 3 of relay SC(24) to the winding of relay SB(24) and over the normally closed contact 4 of relay SB(24) to the winding of relay SA(24) thereby preparing a circuit for operating any one of the relays SA(24), SB(24), SC(24), etc. When one of these positions becomes available, battery connected as above traced to conductor 3509 causes the operation of the associated relay, relay SB(24). Relay SB(24), when operated, locks over its contact 5 under the control of the position circuit and disconnects ground from the relays like relay SA(24) lower in the chain. Relay SB(24) also closes a circuit from battery over contact 1 of relay SA(24) and contacts 1 of the intermediate relays, contact 2 of relay SB(24) to ground through the winding of relay S1B(24). Relay S1B(24) operates and prepares circuits for relay LOB(24) and the similar relays associated with other trunks of this particular class.

If none of the keys 3504, 3505 and 3506 is operated, similar allotting circuits are closed for each class of service observing trunk. At the beginning of the observing period with all of the positions occupied and idle and equipped to observe on all three classes of trunks, the relay corresponding to relay SA(24), which is the preferred position, will be operated in all of the allotter circuits. As soon as relay SA(24) operates, the circuit of relay ST(24) is opened but higher positions in the chain can operate their relays like relays SB(24) and SC(24) since the locking circuit to ground for relay SA(24) extends back over the normal contacts of relays SB(24) and SC(24) to the windings of these relays. Similar circuits are closed in the other allotter circuits. However, only relay S1A(24) can operate since the circuit for relays S1B(24) and S1C(24) is opened at contact 1 of relay S1A(24).

For convenience in describing the service observing operations, it will be assumed that the intermediate position, which is shown in full, is the first position available and that relays S1B(22), S1B(23) and S1B(24) are operated.

*Cord circuit observing*

Figure 4:
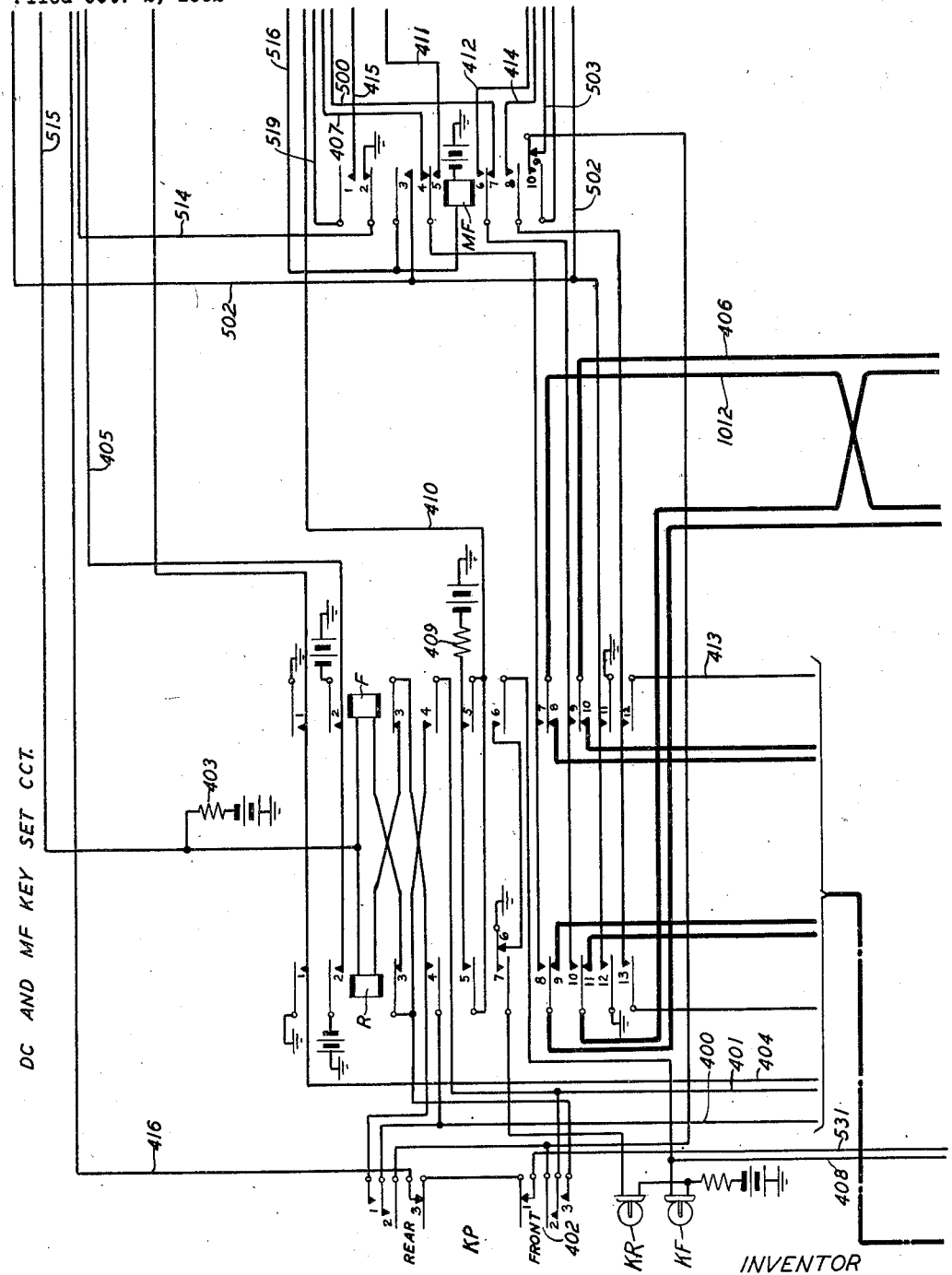
Figure 5:
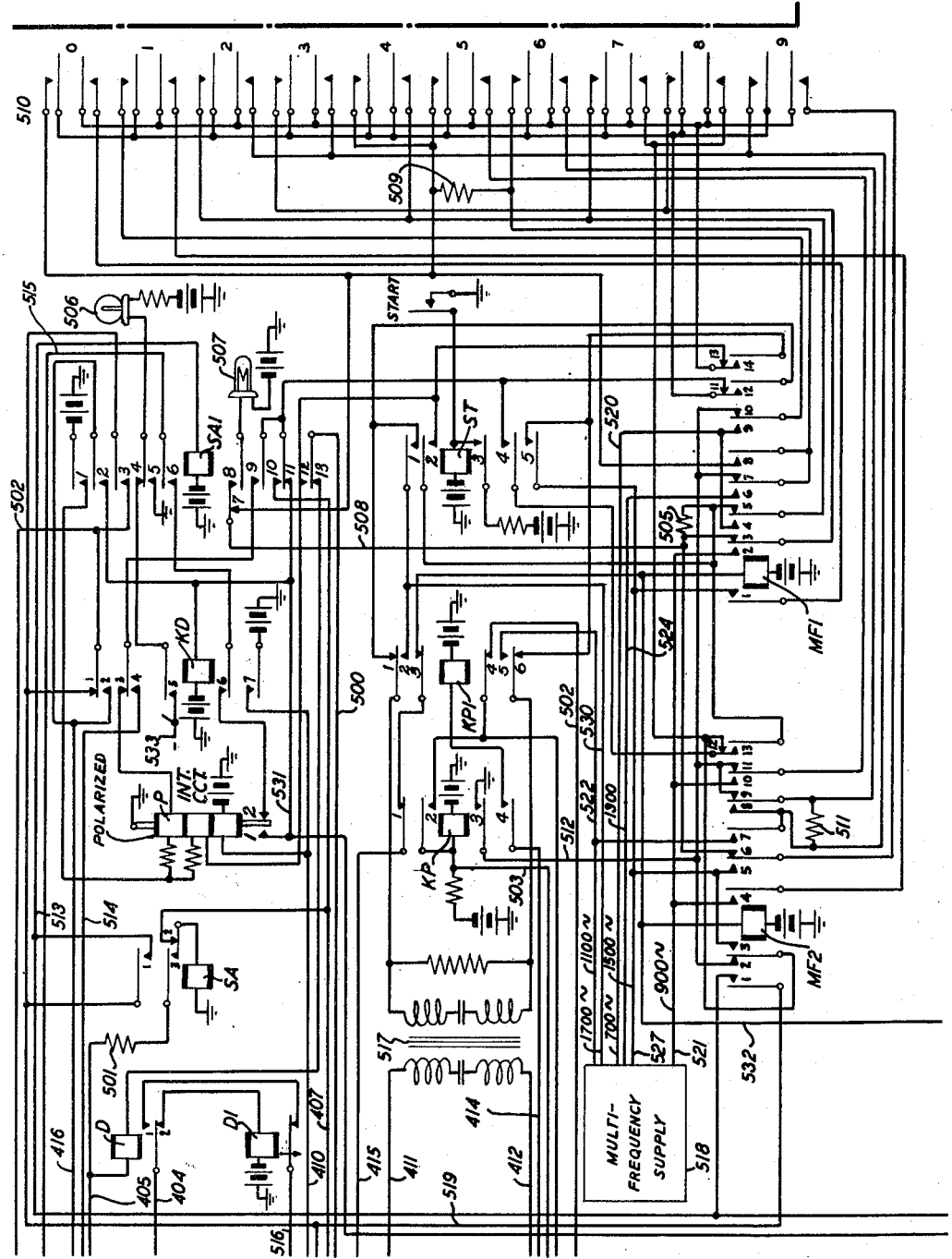
Figure 6:
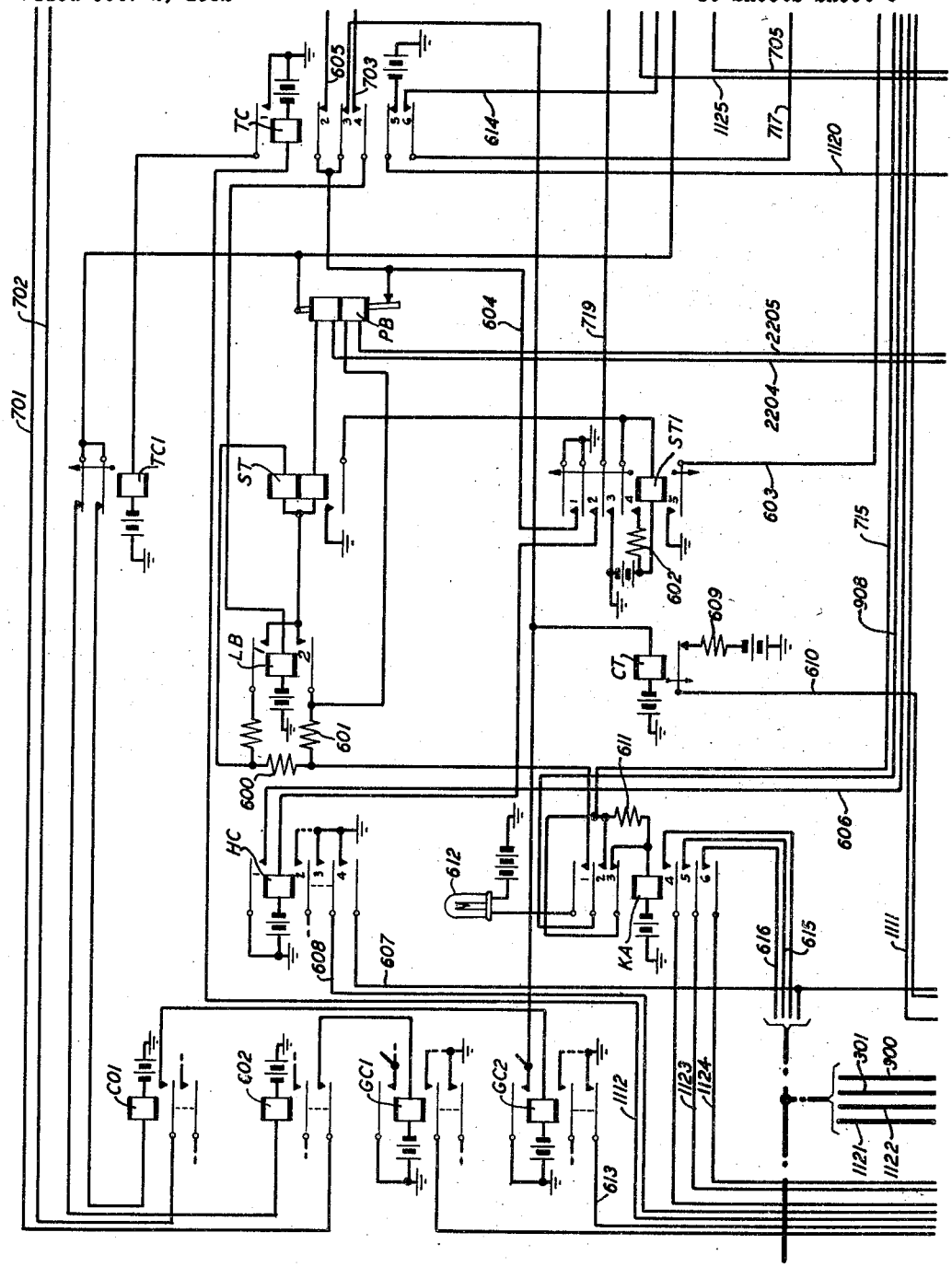
Figure 7:
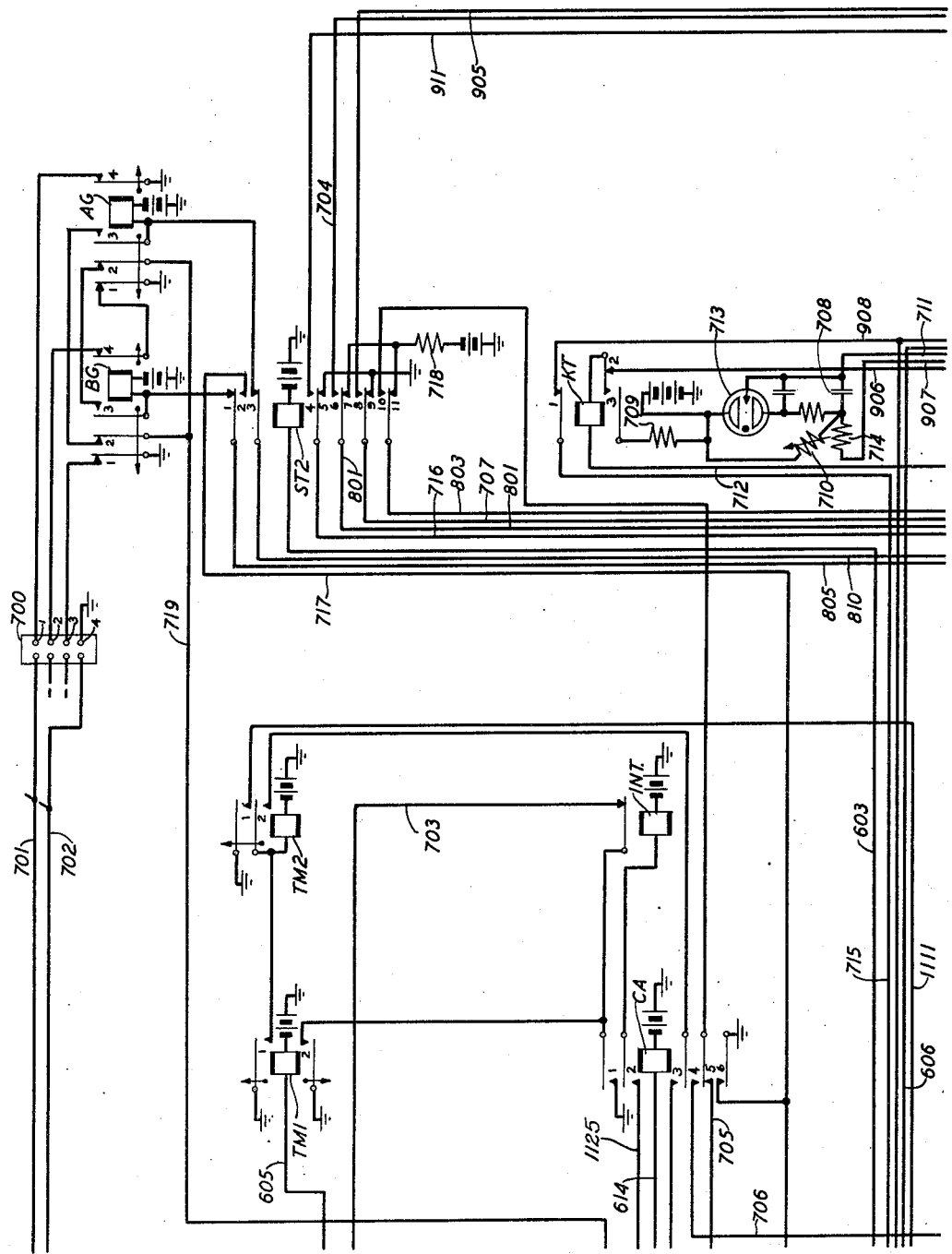
Figure 8:
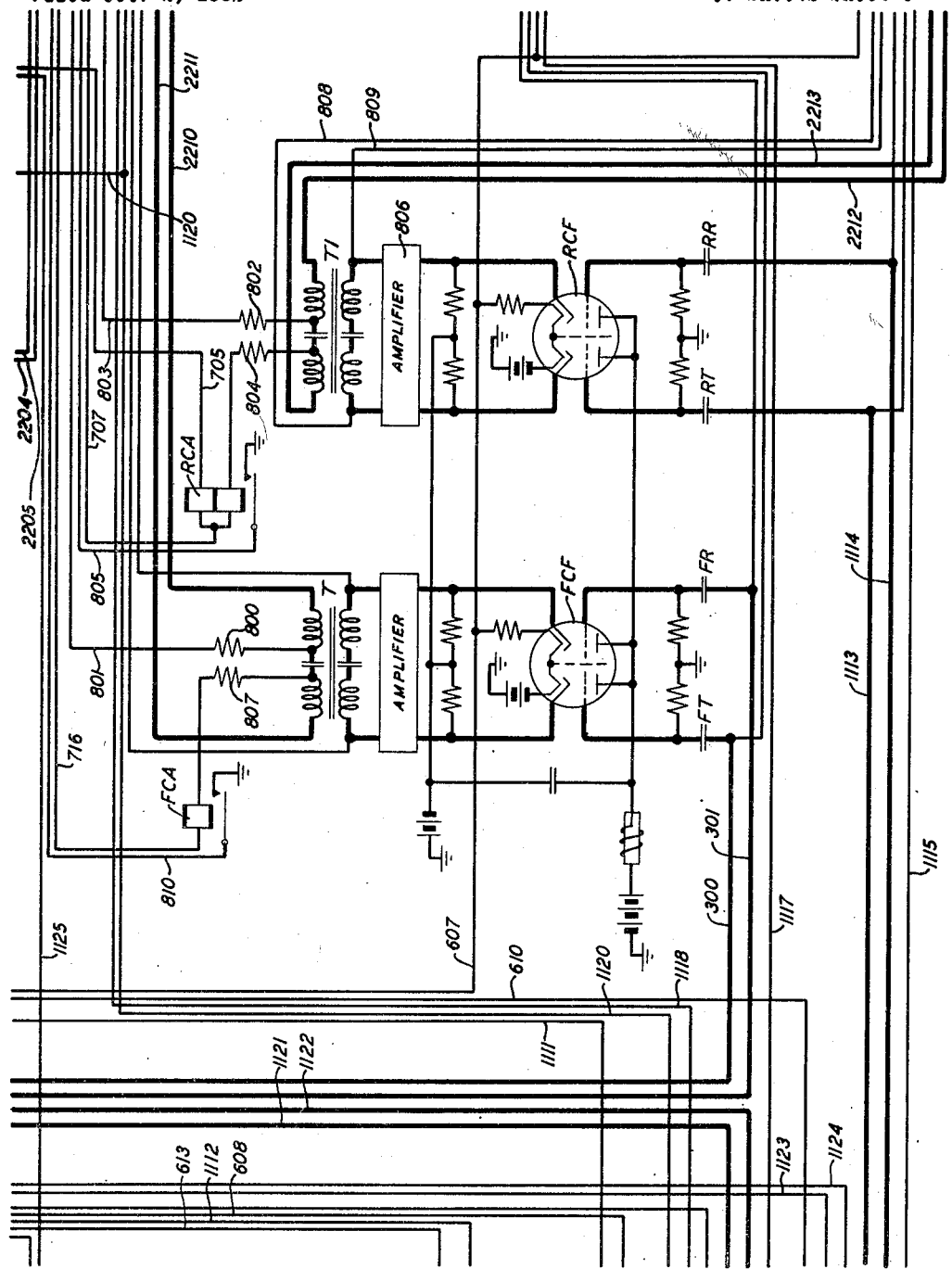
Figure 9:
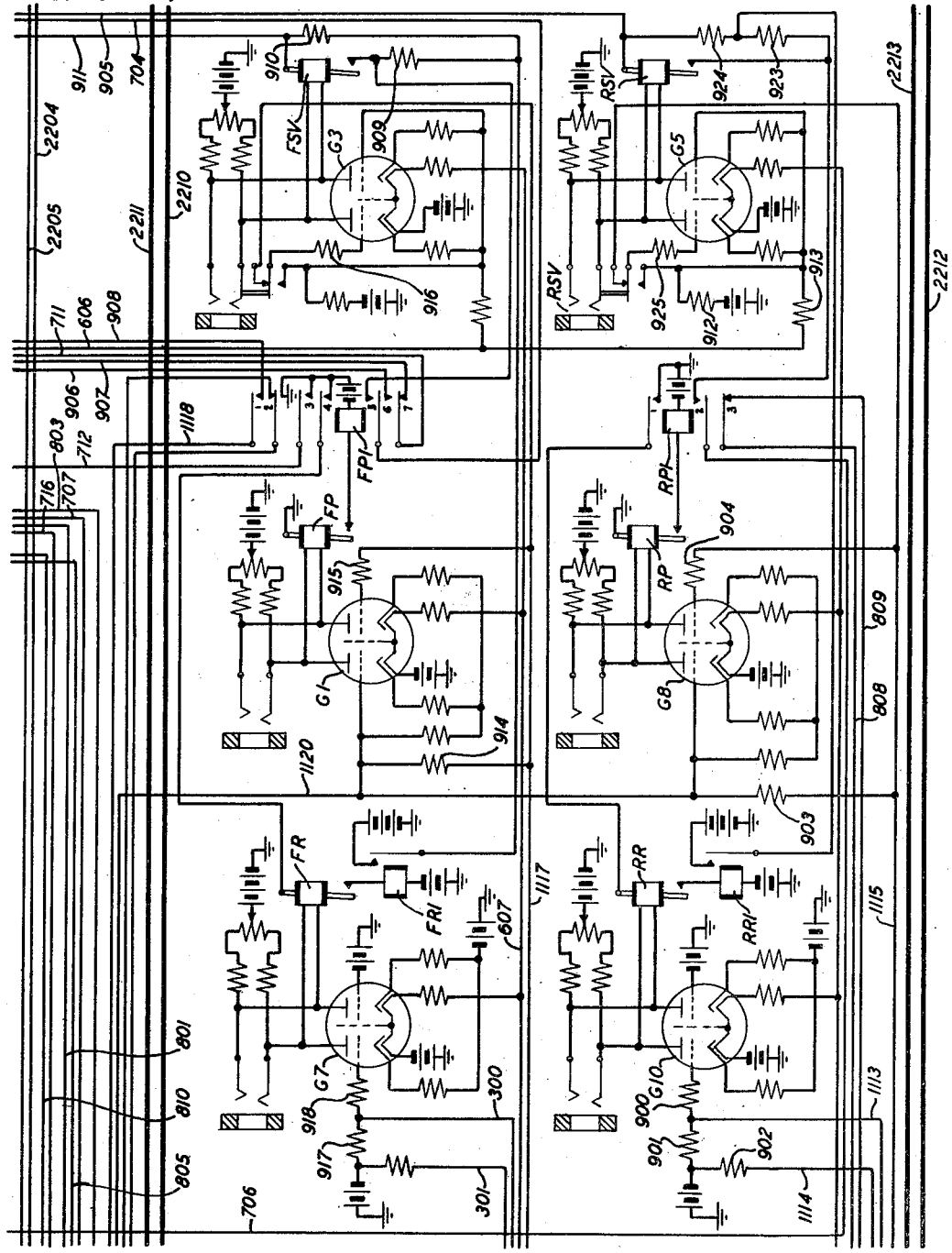

A typical toll operator's cord circuit is shown in Fig. 10. For service observing purposes, multiple taps on the conductors connected with the front and rear plugs 1001 and 1005 are connected with terminals on a terminal strip 1119 at a convenient location. Each position has a number of such cord circuits and a single key-set circuit. In certain offices the key-set circuit may include only means for generating direct-current code pulses, in other offices the key-set circuit may include only means for generating multifrequency code pulses, while still other offices may have key-sets arranged to generate both classes of pulses. The key-set circuit disclosed in Figs. 4 and 5 is one of the last class.

Figure 11:
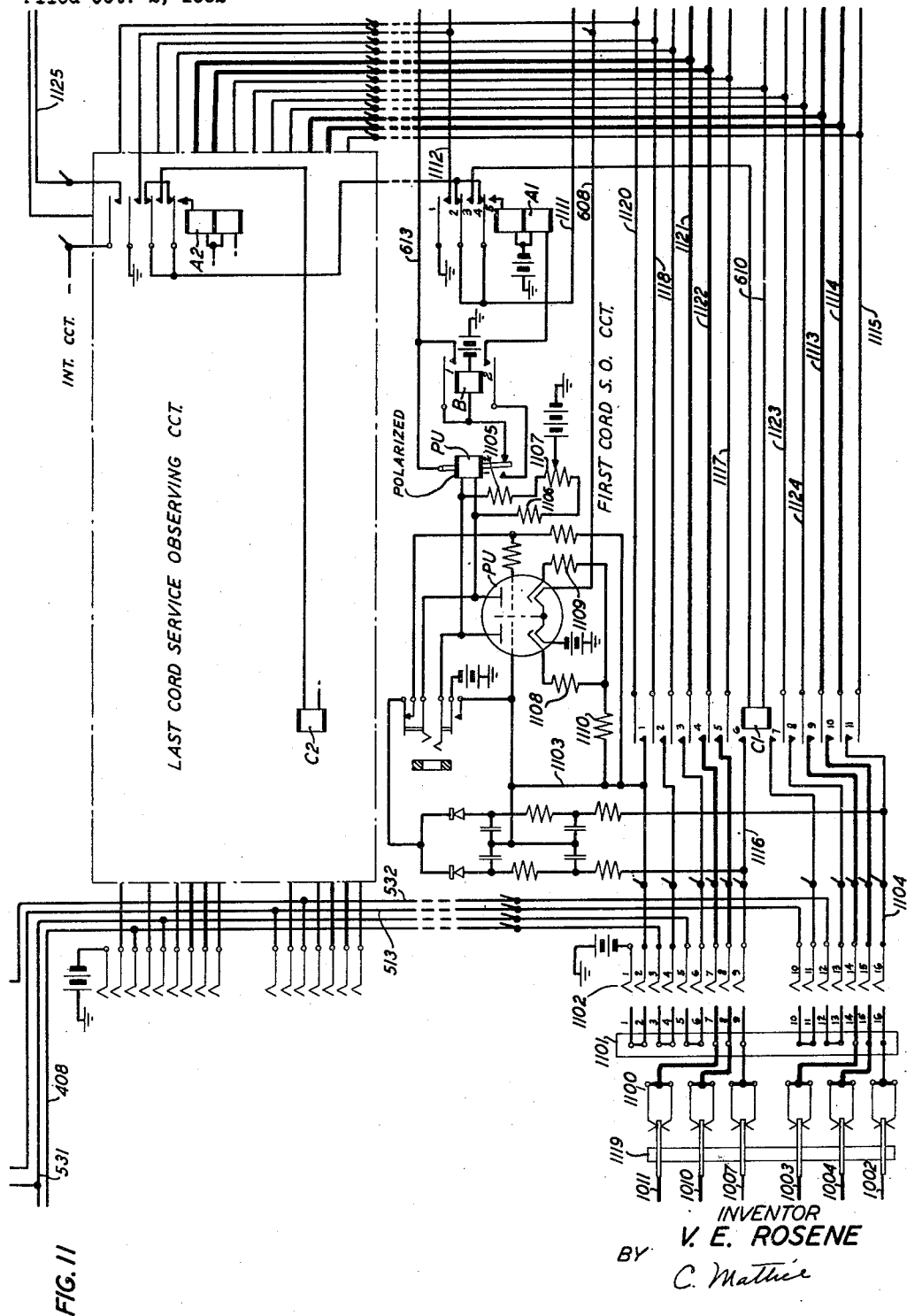

A plurality of service observing connector circuits such as the circuit shown in Fig. 11 will be provided for observing on cord circuits each of which is connected in multiple to a number of jacks associated with various operators' positions. For connecting an individual cord circuit with a service observing connector circuit, a patching cord is provided having clip springs for engaging the terminals of the service observing terminal strip 1119 and a multiple plug for engaging the jack of the service observing connector circuit. Included in the service observing circuit jack is a set of terminals connected with the key-set circuit of the position at which the jack appears and a corresponding set of terminals extending to the service observing connector circuit. The patching cord plug includes pairs of connected terminals which serve to extend the key-set circuit conductors to the corresponding service observing connector circuit conductors.

Assume that the service observing connector circuit of Fig. 11 has been connected with the cord circuit of Fig. 10 by means of patching cord 1100, the insertion of plug 1101 in jack 1102 closes a circuit from battery, over contacts 1 and 2 of the plug and jack to conductor 1103 to supply grid and cathode potentials to tube PU(11).

A plurality of service observing connector circuits as shown in Fig. 11 are connected in multiple to a cord circuit service observing trunk and these service observing connector circuits are inoperative unless there is a service observing operator available to observe on this class of call.

With a group busy relay GB(22) and the out-of-service relay OS(22) normal, the signaling circuit of the cord circuit service observing trunk may be traced from battery over contact 3 of relay GB(22) through resistance 2201, contacts 1 of relays LO1(22), LO1B(22), LO1A(22) and the similar contacts of the intermediate position relays, upper winding of relay L(22), contact 5 of relay OS(22), conductor 2204, upper winding of position busy relay PB(6), lower and upper windings of start relay ST(6), resistances 600 and 601, lower winding of relay PB(6), conductor 2205, contact 4 of relay OS(22), lower winding of relay L(22), contacts 3 of relays LO1A(22), LO1B(22), LO1C(22) and the corresponding contacts of the similar intermediate relays, resistance 2202 to ground over contact 1 of relay GB(22). Relay ST(6) operates in this circuit but the direction of current flow is such that polarized relay PB(6) does not operate and the intensity of the current flow is insufficient to operate relay L(22).

Figure 2:
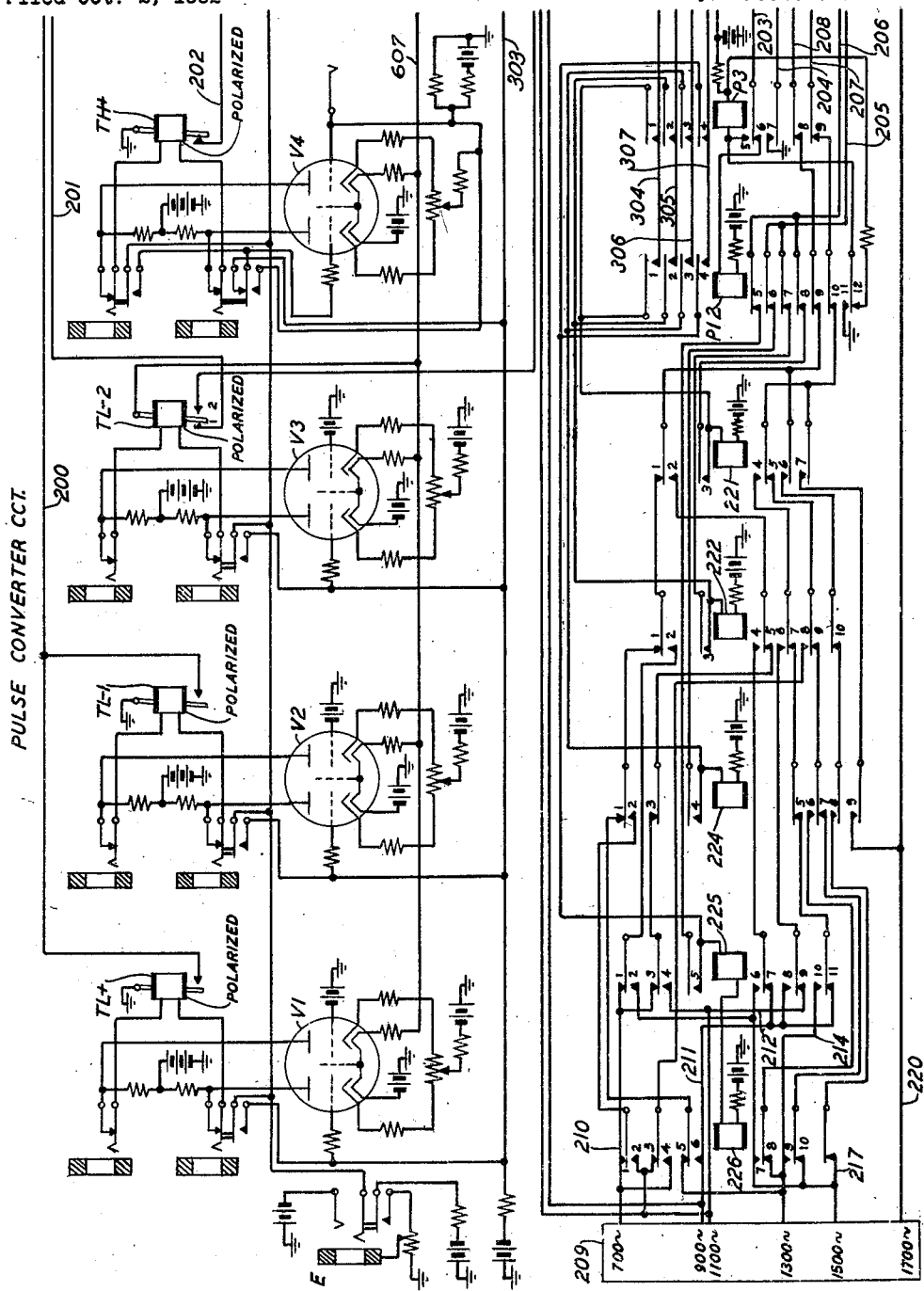
Figs. 2 to 39 are to be arranged.
Figure 3:
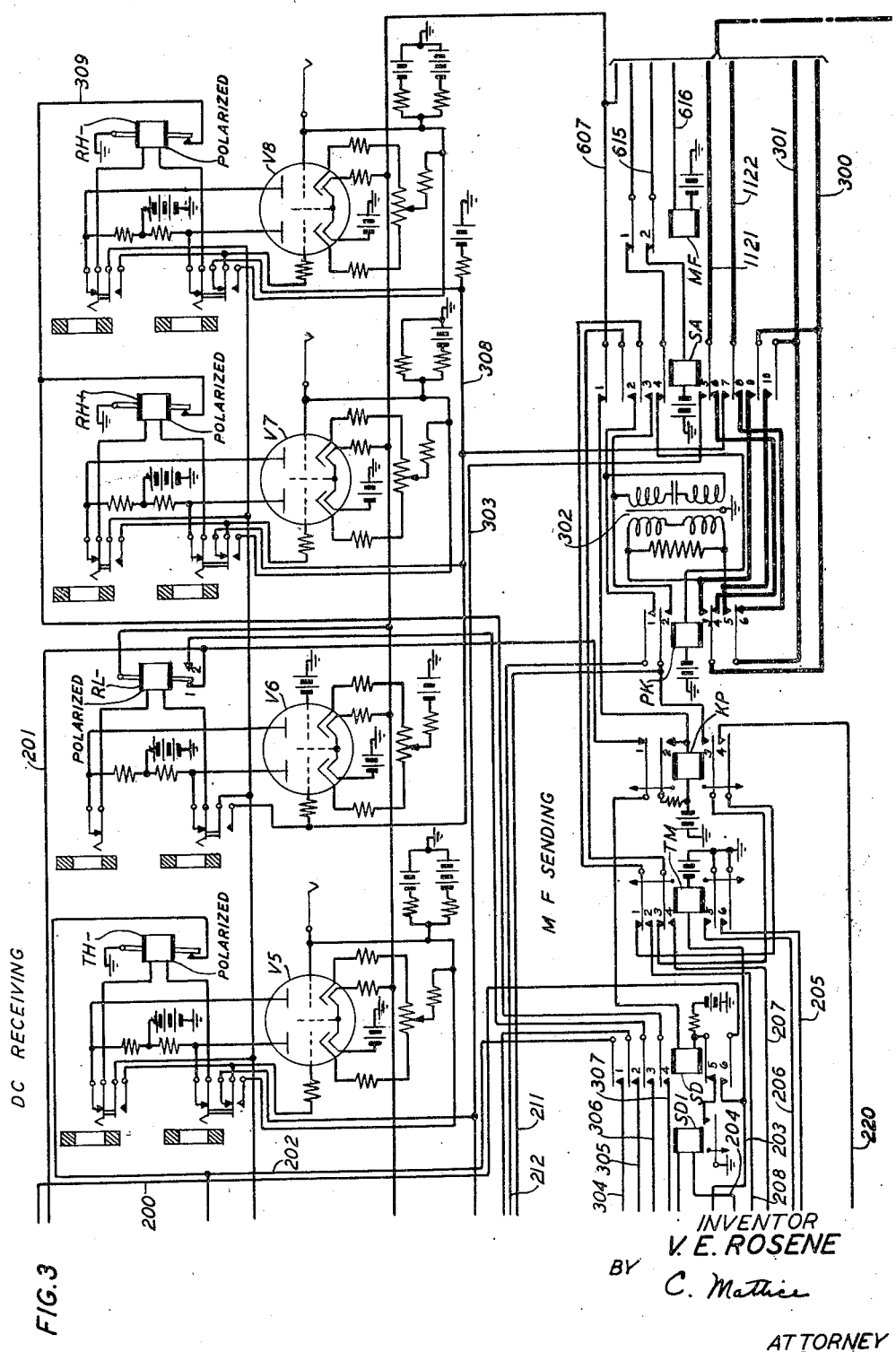

Relay ST(6), in operating, closes an obvious circuit for operating relay ST1(6). Relay ST1(6) at its contact 4 connects resistance 602 in parallel with its winding to render it slow to release. At its contact 5, relay ST1(6) connects ground over conductor 603 to battery through the winding of relay ST2(7). At its contact 2, relay ST1(6) closes an obvious circuit for operating relay HC(6). At its contact 1, relay ST1(6) connects ground to conductor 604 which extends over the normal contact of relay PB(6) and back contacts of relay TC1(6) to the windings of the relays CO1(6), CO2(6), etc. associated with the service observing connector circuits connected with this trunk circuit. Ground on conductor 604 also extends over contact 2 of relay TC(6) and conductor 605 to battery through the winding of relay TM1(7). In addition, ground on conductor 604 extends over contact 3 of relay TC(6) to battery through the winding of relay CT(6). Relay HC(6) connects ground over its contact 1 to conductor 606 to provide the proper potential to be supplied to the cathodes and secondary grids of tubes G3(9) and G5(9). At its contact 4, relay HC(6) connects ground to conductor 607 to complete heater circuits for the tubes of the trunk circuit and for the tubes of the pulse converter circuit of Figs. 2 and 3. At a plurality of contacts indicated by contacts 2 and 3, relay HC(6) connects ground to conductor 608 and a plurality of other conductors leading to the individual service observing connector circuits, the circuit over conductor 608 extending to the heater of tube PU(11). Relay TM1(7) closes an obvious circuit for operating relay TM2(7).

With relays CO1(6), CO2(6), etc. operated, circuits are closed for operating a plurality of relays such as relays GC1(6), GC2(6), etc. With circuit reduction relays AG(7) and BG(7) normal, ground is connected over cross-connecting rack 700 to a plurality of conductors such as conductors 701 and 702 which extend over contacts of the operated connector relays CO1(6), CO2(6), etc. to the windings of relays GC1(6), GC2(6), etc. These relays connect ground to the individual service observing connector circuits to prepare them for receiving an indication that the cord circuit with which they are associated has been requested by an idle position circuit to bid for a call. For example, relay GC2(6) connects ground over conductor 613 and the normally closed contact 2 of relay PU(11) to battery through the winding of relay B(11). Relay B(11) operates and locks over its contact 1 to ground on conductor 613 and prepares a circuit for operating relay A1(11). The service observing connector circuit is now ready for operation.

Assume now that a call comes in on a jack at the position at which the cord circuit of Fig. 10 is located, for example, jack 1000, and the operator uses the cord circuit under observation to answer the call. When plug 1001 is inserted in jack 1000, ground through a resistance, connected to the sleeve of jack 1000, is connected over the sleeve of plug 1001 to conductor 1002 in parallel with battery through resistance 1016 and through the patching cord 1100 to conductor 1104.

The plug-up detector of Fig. 11 comprises a twin triode PU(11) arranged in a Wheatstone bridge, in which two of the arms comprise the resistances 1105 and 1106, which are connected together through potentiometer 1107, the slider of which is connected to +130 volt battery. The other two arms include resistances 1108 and 1109 and the two sides of the twin triode PU(11). These arms are connected through resistance 1110 to −24 volt battery on conductor 1103. Relay PU(11) is connected across the diagonal of the bridge. The potentiometer 1107 permits adjusting the balance of the bridge, and normally the bridge is slightly unbalanced in a direction to cause relay PU(11) to hold its contact 2 closed. When ground is connected to conductor 1104 as above described, the grid of the right side of the twin triode PU(11) becomes less negative and an increased current flow occurs in the right half of the tube while the current flow through the left half remains relatively unchanged. This increased current flow through the right half of tube PU(11) increases the potential drop through resistance 1105 resulting in a current flow through the winding of relay PU(11) of sufficient magnitude and in a proper direction to cause the relay to close its contact 1. Relay PU(11) remains operated as long as plug 1001 remains in jack 1000. Since relay B(11) has been operated as above described, the closure of its contact 1 by relay PU(11) completes a circuit from battery through the lower winding of relay A1(11), contact 2 of relay B(11), contact 1 of relay PU(11) to ground on conductor 613. Relay A1(11) operates and, since it is shown as the first relay in a chain circuit, locks over its contact 5, conductor 1111 to ground at contact 1 of relay TM2(7). Relay A1(11) prepares a circuit for operating the connector relay C1(11).

It may be noted that if, at the time that the service observing desk is put into service resulting in the operation of relay GC2(6), the cord circuit of Fig. 10 were already in use in connection with a call, relay PU(11) would be held operated and relay B(11) could not operate. Therefore relay A1(11) cannot be operated by a "stale call," that is, one already in existence. The relays A1(11), A2(11), etc. of the various service observing connector circuits connected with one service observing trunk have their contacts arranged in a chain so that only one such relay can lock and can operate the associated connector relays C1(11), C2(11), etc.

As soon as relay A1(11) operates as above described, it connects ground over its contact 1 to conductor 1112, winding of relay TC(6) and battery. Relay TC(6) closes an obvious circuit for relay TC1(6) which operates and releases all of the relays CO1(6), CO2(6), etc. which in turn release relays GC1(6), GC2(6), etc. The release of relays GC1(6), GC2(6), etc. opens both the operating circuit and the locking circuit for relay B(11), as well as all of the similar circuits in other service observing connector circuits. With relay B(11) released, the operating circuit for relay A1(11) is opened as is the operating circuit for the similar relays in each of the other service observing connector circuits, causing any operated ones of such relays to release and preventing the subsequent operation of any such relays. With relay TC(6) operated and relay GC2(6) released, the circuit of relay CT(6) is opened and that relay releases. Relay CT(6) is only slightly slow to release to allow a sufficient time for all of the relays A2(11), etc. which have not been locked to release. When relay CT(6) closes its back contact a circuit is closed from battery through resistance 609, back contact of relay CT(6), conductor 610, winding of relay C1(11), contact 3 of relay A1(11), conductor 1111 to ground at contact 1 of relay TM2(7).

Relay C1(11) operates in this circuit and connects the observing conductors of the cord circuit and the key-set through to the service observing trunk. At its contact 1, relay C1(11) connects —24 volt battery from conductor 1103 to conductor 1120 to maintain the desired potential on the grid and cathode terminals of tubes G1 (9) and G8(9). This potential was previously supplied over the contact 5 of relay TC(6).

Relay TC(6) also opens the circuit of slow-to-release relay TM1(7) to initiate "stale call" timing, which will be described hereinafter, and closes a circuit from ground at contact 2 of relay TM1(7), back contact of relay INT(7), conductor 703, contact 4 of relay TC(6) to battery through the winding of relay LB(6). Relay LB(6) operates and connects the lower winding of relay ST(6) to the lower winding of relay PB(6) thereby shunting the upper winding of relay ST(6) and resistances 600 and 601.

The resistance of the signaling circuit is thereby decreased and permits marginal relay L(22) to operate as a seizure signal. Relay L(22) closes a circuit from ground over its contact, contact 5 of relay LO1A(22), contact 5 of relay LO1B(22), contact 5 of relay LO1C(22) and other similar contacts of the intermediate relays to conductor 2203 which extends in parallel to the normal contacts and windings of the lock-out relays LOA(22), LOB(22), LOC(22) and similar intermediate relays. Since allotter relay S1B(22) has been operated as previously described, the circuit over conductor 2203 through the winding of relay LOB(22) extends over contact 9 of relay LO1B(22), contact of relay S1B(22), conductor 2215, contact 1 of relay PN(35) to battery at the contact of key 3504.

Relay LOB(22) operates in this circuit and locks over its contact 6 and conductor 2206 to ground at contact 8 of relay R1(35). At its contact 4, relay LOB(22) extends battery to the winding of relay LO1B(22) operating relay LO1B(22) which locks over its contact 6, conductor 3507 to battery at contact 7 of relay R1(35). With relay LO1B(22) operated, the operating circuit of relay LOB(22) is opened but that relay is held operated in a circuit from ground on conductor 2206, contact 6, winding and contact 4 of relay LOB(22), contact 6 of relay LO1B(22) to battery on conductor 3507.

Relays LOB(22) and LO1B(22) in operating, close three circuits over the six wires of the interoffice trunk between the cord service observing trunk circuit at the originating office and the service observing desk, comprising a signaling circuit over conductors 2204 and 2205, a rear observing circuit over conductors 2212 and 2213 and a front observing circuit over conductors 2210 and 2211.

The signaling circuit previously traced to conductors 2204 and 2205 is now disconnected from the battery and ground supplied by relay GB(22) and is extended over contacts 2 and 4 of relay LO1B(22), conductors 2207 and 2208, contacts 4 and 2 of relay SH1(38), conductors 3800 and 3801, windings of polarized relay KA(27), windings of marginal relay HB(27), conductors 2704 and 2705 to battery and ground over contacts 3 and 1 of relay R1(35).

Relay HB(27) operates in this circuit connecting ground over its contact and conductor 2715 to battery through the winding of relay INT(35). Relay INT(35) operates, in turn operating relay TD(35) to close a holding circuit for relay TD2(35). As soon as relay LO1B(22) operates, it opens the circuit of relay PN(35) and relay PN(35) releases, opening the circuits of relays SB(22), SB(23) and SB(24) so that this position can no longer bid for a call. With relay PN(35) released, relay TD1(27) releases slowly, connecting battery to lamps RSV(27) and RPU(27) and opening the operating circuit of relay TD2(35). With relay PN(35) released and relay LO1B(22) operated, a circuit is closed from ground through resistance 3510, contact 7 of relay PN(35), conductor 3511, contact 8 of relay LO1B(22), conductor 2209 cross-connected by way of conductor 2219 to conductor 2500 and battery through the winding of relay MCD(27) to establish a class marking in the position circuit indicating that the call to be observed is of the cord circuit class.

Relay MCD(27) operates to close a circuit from ground over its contact 3, conductor 2701 to battery through the winding of relay PB(35). Relay PB(35) operates and closes a circuit from ground over contact 3 of relay LOB(22) through lamp 2216, conductor 2217, contact 1 of relay PB(35), contact 3 of relay BC(35), contact 1 of relay INT(35) to battery through resistance 3520. Lamp 2216 lights to identify the service observing trunk connected to the position.

Relay MCD(27) closes a circuit for operating callaccepted relay CA(28) which may be traced from battery through the winding of relay CA(28), conductor 2800, contact 2 of relay TD2(35), conductor 3513 to ground at contact 4 of relay MCD(27).

With relay CA(28) operated, a call-accepted signal is transmitted to the originating office by connecting battery and ground to the two observing circuits connecting the service observing position with the service observing trunk circuit at the originating office. One of these circuits, which has been called the front observing circuit, may be traced from battery through resistance 2801, contact 5 of relay CA(28), contact 7 of relay CA1(28), conductor 2802, contact 3 of relay SD(32), conductor 3201, lower winding of differential relay FR(28), conductor 2803, upper right winding of repeating coil 2501, conductor 2502, contact 2 of relay LOB(22), contact 1 of relay OS(22) to conductor 2210 of the interoffice trunk. Ground is connected over contact 6 of relay CA(28), contact 5 of relay CA1(28), conductor 2804, contact 1 of relay SD(32), conductor 3202, upper winding of relay FR(28), conductor 2805, lower right winding of repeating coil 2501, conductor 2503, contact 1 of relay LOB(22) to conductor 2211 of the interoffice trunk. This circuit is incomplete in the service observing trunk circuit at this time.

Battery is also connected to the second observing circuit, which has been called the rear observing circuit, through resistance 2806, contact 2 of relay CA(28), contact 3 of relay CA1(28), lower winding of differential relay RR(28), conductor 2807, upper right winding of repeating coil 2504, conductor 2505, contact 8 of relay LOB(22), contact 8 of relay OS(22), conductor 2212 of the interoffice trunk, upper right winding of repeating coil T1(8), resistance 802, conductor 803, contact 10 of relay ST2(7), contact 5 of relay CA(7), conductor 705, windings of relay RCA(8), resistance 804, upper left winding of repeating coil T1(8), interoffice trunk conductor 2213, contact 7 of relay LOB(22), conductor 2214, lower right winding of repeating coil 2504, conductor 2506, upper winding of relay RR(28), contact 2 of relay CA1(28), contact 1 of relay CA(28) to ground. Relay RCA(8) operates in this circuit but relay RR(28) cannot operate at this time. Relay RCA(8) closes a circuit from ground over its contact and conductor 805, contact 2 of relay ST2(7), conductor 717, contact 6 of relay TC(6), conductor 614 to battery through the winding of relay CA(7). Relay CA(7) operates as a callaccepted signal and closes a locking circuit for itself over its contact 6, under the control of relay TC(6). Relay CA(7) at its contact 1, connects a supplementary ground to the circuit of relay LB(6) to hold that relay operated after relay TM1(7) releases. In addition, it closes a locking circuit for relay TM2(7) which may be traced from battery through the winding of relay TM2(7), contact 2 of relay TM2(7), contact 3 of relay CA(7), contact of relay PB(6) to ground on conductor 604. With relay TM2(7) held operated, relay C1(11) is held operated and observation may proceed.

With relay C1(11) operated, the tip and ring contacts of the rear plug are connected for signaling purposes to tube G10(9). The tip of plug 1001 is connected over conductor 1003 and the plug and jack connection to contact 9 of relay C1(11) and thence over conductor 1113 to the left grid of tube G10(9) through resistance 900, while the ring contact of plug 1001 is connected over conductor 1004, the plug and jack connection, contact 10 of relay C1(11) and conductor 1114 to battery through resistance 902. Conductors 1113 and 1114 are connected together through resistance 901. Conductors 1113 and 1114 are also connected through condensers RT(8) and RR(8) to the grids of cathode-follower tube RCF(8), the output circuit of which is connected through amplifier 806 and repeating coil T1(8) to conductors 2212 and 2213 for transmitting voice frequency currents to the service observing position. The lower winding of repeating coil T1(8) is normally shunted over conductors 808 and 809 and contact 3 of relay RP1(9). The amplifier 806 may be omitted for those offices where the transmission of voice frequency current is adequate without being amplified.

Similarly the tip and ring conductors of the front plug 1005 are connected to tube G7(9) for signaling purposes and to cathode-follower tube FCF(8) for the transmission of voice frequency currents to the service observing position.

The circuits of tubes G7(9), G1(9), G3(9), G10(9), G8(9) and G5(9) are similar to those described for tube PU(11), that is, the two halves of each tube are included in the two legs of a Wheatstone bridge arrangement with a relay connected across the diagonals. Tubes G7(9), G1(9) and G3(9) are substantial duplicates of tubes G10(9), G8(9) and G5(9) except that they are associated with the front plug 1005 of the cord circuit instead of with the rear plug.

The cathodes of tube G10(9) are connected to −24 volt battery through equal resistances. The right grid of tube G10(9) is connected directly to −24 volt battery, while the left grid is connected to battery through resistances 900 and 901. Relay RR(9) is connected across the plates of tube G10(9). The cathodes of tube G8(9) are connected through individual resistances and a common resistance to −24 volt battery supplied over conductor 1120. The left grid of tube G8(9) is connected directly to battery on conductor 1120, while the right grid is connected to conductor 1120 through resistances 904 and 903. Relay RP(9) is connected between the plates of tube G8(9). The cathodes of tube G5(9) are connected through individual resistances to the mid-point of a potentiometer made up of resistances 912 and 913 which are connected between −24 volt battery and ground supplied over contact 1 of relay HC(6) and conductor 606. The right grid of tube G5(9) is also connected to the mid-point of this potentiometer, while the left grid is connected through resistances 925 and 903 to −24 volt battery on conductor 1120. Relay RSV(9) is connected between the plates of tube G5(9). With relay C1(11) operated, the sleeve conductor 1002 is extended over contact 11 of relay C1(11) and conductor 1115 to a point between resistance 903 and resistances 904 and 925. The value of the potential applied to conductor 1115 due to the insertion of plug 1001 in jack 1000 is such that the potential on the right grid of tube G8(9) becomes less negative while the potential on the left grid of tube G8(9) remains substantially unchanged. Therefore the current flow through the two halves of tube G8(9) is unbalanced, resulting in the operation of relay RP(9). Relay RP(9) in turn operates relay RP1(9). Relay RP1(9) removes the shunt across the lower winding of repeating coil T1(8). The wiring and circuit elements of tube G5(9) are such that it does not respond to the potential applied to conductor 1115 at this time.

At the service observing position the rear observing circuit, including conductors 2212 and 2213, is connected as previously traced to the right windings of repeating coil 2501. The left windings of repeating coil 2501 are connected over contacts 8 and 10 of relay MK1(25) through amplifier 2526, over contacts 3 and 2 of relay MK1(25), conductors 2507 and 2508 to the left windings of repeating coil 3705.

When relay CA(28) operates, as above described, it opens the circuit of relay CA1(28) and the latter relay releases slowly. When relay CA1(28) has closed its back contacts, a circuit is closed from ground over contact 2 of relay DD(35), conductor 3518, contact 3 of relay CA(28), contact 4 of relay CA1(28), conductor 2837 to battery through the winding of relay SP(37). Relay SP(37) operates in this circuit and connects the right windings of repeating coil 3705 to jacks 3702 and 3703 and thereby to the operator's headset. With the voice frequency circuit extended as above traced to the left winding of repeating coil 3705, the service observing operator may now listen to the instructions given to the cord circuit operator.

When relay CA1(28) releases, the rear observing circuit above traced through the windings of relay RR(28) now extends from the upper winding of relay RR(28) through the upper winding of marginal relay RM(28) and the two windings of relay RC(28) in series to ground at contact 1 of relay CA(28) and from the lower winding of relay RR(28) through the lower winding of relay RM(28) to resistance 2806 and battery over contact 2 of relay CA(28). The front observing circuit previously traced through the windings of relay FR(28) now extends from the upper winding of relay FR(28) over conductor 3202, contact 1 of relay SD(32), conductor 2804, upper winding of marginal relay FM(28) through the two windings of relay FC(28) in series to ground at contact 6 of relay CA(28) and from the lower winding of relay FR(28) over conductor 3201, contact 3 of relay SD(32), conductor 2802, lower winding of relay FM(28) through resistance 2801 to battery over contact 5 of relay CA(28).

Relay MCD(27), when operated as above described, closes at its contact 12 an obvious circuit for operating relay MF(27). At its contacts 5 to 10 it prepares circuits for the signal lamps FPU(27), RR(27), FR(27), RSV(27), FSV(27) and RPU(27). Relay MF(27) at its contact 2 connects battery to conductor 2702 and relay MCD(27) at its contact 11 connects ground to conductor 2703 leading to the multifrequency receiving circuit 2809 to place that circuit in condition to receive multifrequency code pulses.

Relay MCD(27) also closes a circuit from ground over its contact 2, contact 1 of relay KD(27), conductor 2706, contact 8 of relay KC(25), conductor 2509 to battery through the winding of relay HG(26). Relay HG(26) operates and prepares the digit register circuit for operation and supplies ground to conductors 2600 to 2607 for various purposes which will appear hereinafter. Ground on conductor 2602 completes a circuit over contacts 1 of relays A7(30), A4(30), A2(20), A1(30) and A0(30) of the first digit register, conductor 3000 to battery through the winding of steering relay AS(29). Relay AS(29) operates and locks over its contact 4 and contact 10 of relay BS(29) to ground on conductor 2600. Relay AS(29) closes a circuit from ground on conductor 2605, contact 1 of relay AS(29), conductor 2900 to battery through the winding of relay OD(26), operating the latter relay to prepare for storing the digits on the proper register. Relay OD(26) extends its operating ground over its contacts 4 and 3 to the winding of relay OD1(26). Relay OD1(26) operates and disconnects the output conductors 2820 and 2827 of receiving circuit 2809 from conductors 2630 to 2637 leading to the even steering relays and leaving them connected to conductors 2620 to 2627 over back contacts of relay EV1(26) to the contacts of the odd steering relays. In addition, ground on conductor 2607 completes a circuit over contact 4 of relay KP1(27) to battery through the winding of relay KP(27) operating the latter relay.

In the service observing trunk circuit the operation of relay CA(7) closes a circuit from conductor 803 over contact 10 of relay ST2(7), contact 4 of relay CA(7), conductor 706, contact 2 of relay RP1(9), resistances 923 and 924, conductor 905, contact 8 of relay ST2(7), conductor 707 to the lower winding of relay RCA(8). The circuit through the high resistance upper winding of relay RCA(8) is open at contact 5 of relay CA(7). The resistance now included in the rear observing circuit causes the operation of relay RC(28). Relay RC(28) in turn operates relay RPU(28) and the latter relay connects ground over its contact 2, conductor 2810, contact 10 of relay MCD(27) through lamp RPU(27) to battery at contact 2 of relay TD1(27) to light lamp RPU(27) as an indication that the rear cord has been plugged up.

The operator using the cord circuit of Fig. 10 having operated talk key 1009 to connect the cord with her position equipment has received the designation of the called subscriber, and now will insert the front plug 1005 of her cord circuit in the jack of an outgoing trunk such as jack 1006. The sleeve terminal of plug 1005 is connected over conductor 1007, through the plug, jack and cord arrangement to conductor 1116, contact 6 of relay C1(11), conductor 1117 to a point between resistance 914 which is connected to battery on conductor 1120 and resistances 915 and 916 connected to the grids of tubes G1(9) and G3(9). Before plug 1005 is inserted in jack 1006 with the talking key 1009 operated, resulting in the operation of relay TK(10), the sleeve of plug 1005 is connected to battery through the winding of a relay in the position circuit and the current through the two sides of tube G1(9) is approximately balanced, being slightly overbalanced in a direction to cause relay FP(9) to hold its contact open. When plug 1005 is inserted in jack 1006, ground on the sleeve of the trunk jack causes the potential on the right grid of tube G1(9) to become less negative unbalancing the tube in a direction to cause relay FP(9) to close its contact. Relay FP(9), in operating, operates relay FP1(9). Relay FP1(9) opens the shunt around the lower windings of repeating coil T(8) so that transmission may now take place over the front observing circuit. Relay FP1(9) closes a circuit for measuring a time interval during which the key-set of Fig. 5 should be attached to the cord circuit of Fig. 10. This circuit comprises a charging circuit for condenser 708 and may be traced from +130 volt battery through resistance 710, condenser 708, conductor 711, contact 6 of relay FP1(9), conductor 906, contact 2 and winding of relay KT(7), conductor 712 to ground at contact 3 of relay FP1(9). Condenser 708 is connected between the control anode and the cathode of gas-filled tube 713, the +130 volt battery being connected to the main anode of tube 713. When condenser 708 has received a sufficient charge it causes the control gap of tube 713 to break down followed by the main gap, completing the circuit for relay KT(7) which operates and locks over its contact 3 to the +130 volt battery through resistance 709. Relay KT(7) at its contact 2 opens the main discharge circuit of tube 713 thereby quenching the tube. It may be noted that relay FP1(9) at its contact 7 opens a shunt around condenser 708 extending over conductor 711, contact 7 of relay FP1(9), conductor 907 and resistance 714.

The purpose of this timing arrangement is to permit the various indications from the position key-set to become effective only if the key-set is attached within a predetermined interval after the front cord is plugged up, and thereby to prevent subsequent use of the key-set with another cord at the position from affecting an observation already in progress. Resistance 710 is adjustable to permit varying the time to be measured. If relay KT(7) operates it prevents the operation of relay KA(6) in response to a key-set-attached indication.

In addition, relay FP1(9) closes a circuit for conductor 2210 of the front observing circuit through the upper right winding of repeating coil T(8), resistance 800, conductor 801, contact 6 of relay ST2(7), conductor 704, contact 5 of relay FP1(9) through resistances 909 and 910, conductor 911, contact 4 of relay ST2(7), conductor 716, winding of relay FCA(8), resistance 807, upper left winding of repeating coil T(8) to conductor 2211 of the front observing circuit. This circuit extends as previously traced through the windings of relays FR(28), FM(28) and FC(28) to battery and ground at contacts 5 and 6 of relay CA(28). The closure of this circuit in the service observing trunk circuit causes the operation of relay FC(28) which closes an obvious circuit for relay FPU(28). Relay FPU(28) closes a circuit from ground over conductor 2606, contact 1 of relay PK(27), conductor 2707, contact 4 of relay KD(27), conductor 2708, contact 8 of relay ST(26), conductor 2650, contact 6 of relay FPU(28), conductor 2811 to battery through the winding of relay PC(25). At its contact 1 relay FPU(28) connects ground to conductor 2509 to hold relay HG(26) operated. At its contact 2 relay FPU(28) closes a circuit from ground over contact 5 of relay MK(32), conductor 3204, contact 2 of relay FPU(28), conductor 2812, contact 5 of relay MCD(27) to battery through lamp FPU(27) which lights to indicate that the front cord has been plugged up.

The key-set circuit shown in Figs. 4 and 5 is arranged to provide either direct-current code pulses or multifrequency code pulses as required. In trunk circuits leading to offices requiring direct-current code pulses, ground is normally connected to the ring conductor but is removed before the sender is ready to receive pulses. When the sender is ready to receive pulses, —24 volt battery is connected to both tip and ring conductors. In trunks leading to offices requiring multifrequency code pulses ground is not disconnected from the ring conductor. The operation of talking key 1009 causes certain relays in the position circuit to operate and connect ground to conductors 400 and 401. Ground is also connected to conductor 404, closing a circuit over contact 2 of relay D(5) to battery through the winding of relay D1(5) causing relay D1(5) to operate so that its core may become saturated before its operating circuit is opened, while testing for ground on the ring conductor. The operator wishing to pulse-out over the front cord will operate the front KP key 402, completing a circuit from ground on conductor 401 over contacts 2 and 3 of key 402, contact 3 of relay R(4), winding of relay F(4) to battery through resistance 403. Relay F(4) operates and closes a circuit from ground over contact 6 of relay R(4), contact 6 of relay F(4) to battery through lamp KF(4) which lights to indicate that the key-set is associated with the front plug. With relay F(4) operated, a test is made for ground on the ring conductor of the outgoing trunk. This circuit may be traced from —24 volt battery over contact 2 of relay F(4), conductor 405, winding of relay D(5), contact 13 of relay SA1(5), conductor 500, contact 7 of relay MF(4), contact 9 of relay F(4), conductor 406, contact 12 of relay TK(10), conductor 1010 to the ring contacts of plug 1005 and jack 1006 and the ring conductor of the outgoing trunk. Relay D(5) will operate in this circuit and open the circuit of relay D1(5) but, assuming that direct-current code pulses are required, ground will be removed from the ring conductor before relay D1(5), which is slow to release, has time to close its back contact. As soon as ground is removed from the ring conductor, relay D(5) releases and recloses the holding circuit for relay D1(5). An auxiliary holding circuit for relay D1(5) is provided by ground connected to conductor 404 over contact 1 of relay F(4).

When a sender has been attached at the distant office and is ready to receive pulses, −24 volt battery is connected to both the tip and ring conductors. The substitution of battery for ground on the ring conductor causes relay D(5) to remain released and keep the holding circuit for relay D1(5) closed as above described. Battery on the tip conductor completes a circuit over conductor 1011, contact 2 of relay TK(10), conductor 1012, contact 7 of relay F(4), contact 4 of relay MF(4), conductor 407, contact 2 and winding of relay SA(5) to ground. Relay SA(5) operates in this circuit and locks over its contact 3 through resistance 501 and conductor 405 to battery on contact 2 of relay F(4). Relay SA(5) closes a circuit from battery through the winding of relay SA1(5), conductor 513, contact 1 of SA(5), contact 1 of relay KD(5), conductor 502 to ground at contact 11 of relay F(4) operating relay SA1(5). With relay SA1(5) operated, the tip conductor, which has been previously traced to conductor 407, is connected over contact 10 of relay SA1(5) and contact 11 of relay MF1(5) to the key-set 510. In addition, the ring conductor, which has been previously traced to conductor 500, is disconnected from the winding of relay D(5) and connected over contact 12 of relay SA1(5) and contact 13 of relay MF1(5) to key-set 510. When the operator operates the front key 402, operating relay F(4), the ground which lighted lamp KF(4) is extended over conductor 408, contacts 3 and 4 of plug 1101 and jack 1102, contact 2 of relay C1(11), conductor 1118, contact 1 of relay FP1(9), conductor 908, contact 1 of relay KT(7), conductor 715, contact 3 and winding of relay KA(6) to battery. Relay KA(6) operates and closes a locking circuit for itself through resistance 611, contact 2 of relay KA(6) to ground on conductor 903. Relay KA(6) transmits a key-set-attached signal to the service observing position and prepares a plurality of circuits connecting the key-set circuit of Fig. 5 with the pulse converter circuit of Figs. 2 and 3.

The key-set-attached signal is produced by connecting +130 volt battery through resistance lamp 612, over contact 1 of relay KA(6), through resistance 601 to the lower winding of relay PB(6) and over contact 2 of relay LB(6) and through the lower winding of relay ST(6), to the upper winding of relay PB(6) and thence over the signaling circuit as previously traced to the windings of relays KA(27) and HB(27). The key-set-attached signal is in the correct direction to cause the operation of relay KA(27) which closes a circuit from ground over its contact 2, contact 1 of relay MCD(27), conductor 2709, contact 9 of relay HG(26), conductor 2608, contact 3 and winding of relay KC(25) to battery. Relay KC(25) operates in this circuit and locks over its contact 4 through resistance 2510 to ground on conductor 2606. Relay KA(27) also connects ground over contact 2 of relay KD(27) to battery through resistance 2710 in shunt with the winding of relay KD(27) to prevent the latter relay from operating when its circuit to ground is closed by the operation of relay KC(25) at its contact 5.

Relay KC(25) closes a circuit from ground through lamp KON(25), conductor 2511, contact 1 of relay MK(32), conductor 3203, contact 6 of relay KC(25), resistance 2512, conductor 2513, contact 3 of relay KD(27), conductor 2711 to battery over contact 1 of relay MF(27). Lamp KON(25) lights to indicate to the observing operator that the key-set has been attached. Relay KC(25) also disconnects resistance 2514 from across the left winding of repeating coil 2501 and connects that winding over contacts 8 and 10 of relay MK1(25), contacts 2 and 3 of relay PC(25) and contact 2 of relay KC(25), conductors 2515 and 2516 to the multifrequency receiving circuit 2809.

The cord circuit operator now proceeds to write up the designation of the wanted subscriber on her position key-set. The number of digits keyed will differ in accordance with the destination of the call but may have a maximum of fourteen digits. If less than fourteen digits are keyed the start key should be operated following the last digit to indicate that the designation has been completed. To illustrate the operation of the converter circuit it will be assumed that the designation code has a first digit 9 and contains less than fourteen digits so that the start key will be operated.

When conductor 401 was grounded, as previously described, a circuit was closed from battery through the winding of relay KP(5), conductor 503, contact 9 of relay MF(4), contact 2 of the front key 402 to ground on conductor 401. Relay KP(5) operates and locks in a circuit extending from battery through the winding of relay KP(5) and over its contact 2, contact 4 of relay KP1(5), conductor 502 to ground at contact 11 of relay F(4). When relay F(4) operates, it closes a circuit from −48 volt battery through resistance 409, contact 5 of relay F(4), conductor 410, lower winding of relay P(5) to −24 volt battery to bias relay P(5) in a direction to hold its contact 2 closed.

Relay SA1(5) when operated, as above described, connects −24 volt battery over its contact 1 to the upper and middle windings of relay P(5). The upper winding of relay P(5) is connected over contact 3 of relay KD(5), contact 9 of relay SA1(5), contact 11 of relay MF1(5) to tip contacts of key-set 510 and over contacts 9 and 10 of relay SA1(5), conductor 407, contact 4 of relay MF(4), contact 7 of relay F(4) to conductor 1012 and thence as previously traced to the tip conductor of the outgoing trunk. The middle winding of relay P(5) is connected over contact 13 of relay MF1(4) to the ring contacts of the key-set 510 and over contact 12 of relay SA1(5), conductor 500, contact 7 of relay MF(4), contact 9 of relay F(4) to conductor 406 and thence as previously traced to the ring conductor of the outgoing trunk. At its contact 5, relay SA1(5) closes an obvious circuit for lighting lamp 506 to indicate that the sender has been attached. At its contact 8, relay SA1(5) connects −48 volt battery through resistance lamp 507 to conductor 508. Conductor 508 is connected over contact 6 of relay MF2(5) to the bottom contact of key 9 and over contact 3 of relay MF1(5) to the top contacts of keys 8 and 3 to supply heavy (low resistance) negative battery to these keys. Conductor 508 is also connected through resistance 505 and over contact 5 of relay MF1(5) to the top contacts of keys 7 and 2 and to the bottom contact of key 4 to supply light (high resistance) battery to these keys. Ground is supplied over contact 3 of relay KP(5) to conductor 512 which is connected over contact 2 of relay MF2(5) to the lower contacts of keys 7 and 8, over contact 9 of relay MF2(5) to the lower contact of key 6, over contact 11 of relay MF2(5) to the lower contact of key 5, over contact 7 of relay MF1(5) to the upper contact of key 6 and over contact 10 of relay MF1(5) to the upper contact of key 1 thereby preparing for the transmission of heavy ground pulses (positive pulses). Conductor 512 is also connected over contact 7 of relay MF1(5) and through resistance 509 to the upper contacts of keys 0, 4 and 5 and over contact 9 of relay MF2(5) through resistance 511 to the upper contact of key 9 and the lower contacts of keys 2 and 3 to prepare for the transmission of light ground pulses. When the key-set is to be used for direct-current code pulsing with relays MF1(5) and MF2(5) normal, the lower contacts of keys 0 and 1 are attached to neither battery nor ground.

The tip and ring conductors 1011 and 1010 of the front plug 1005 are normally connected through the patching cord, contacts 4 and 5 of relay C1(11), conductors 1121 and 1122, contacts 6 and 8 of relay SA(3), contacts 4 and 6 of relay PK(3), conductors 300 and 301 to tube G7(9) and through condensers FT(8) and FR(8) to tube FCF(8). At the same time that relay SA1(5) was operated, a circuit was closed from ground at contact 11 of relay F(4), conductor 502, contact 1 of relay KD(5), contact 1 of relay SA(5), conductor 513, contacts 10 and 11 of jack 1102 and plug 1101, contact 7 of relay C1(11), conductor 1123, contact 5 of relay KA(6), conductor 615, contact 2 of relay MF(3) to battery through the winding of relay SA(3) operating relay SA(3). With relay SA(3) operated, conductor 1122 is connected over contact 7 of relay SA(3) and conductor 308 to the grids of tubes V6(3), V7(3) and V8(3), while conductor 1121 is connected over contact 5 of relay SA(3) and conductor 303 to the grids of tubes V1(2), V2(2), V3(2), V4(2) and V5(3). Conductors 300 and 301 are connected over contacts 9 and 10 of relay SA(3) to the left windings of repeating coil 302. The right windings of repeating coil 302 are connected over contacts 2 and 3 of relay SA(3) to the top armatures of relay TM(3) and thence, as will be described hereinafter, under the control of the code relays to the multifrequency source 209.

Each of the vacuum tubes V1(2) to V8(3) is a double diode used in a differential type of direct-current amplifier circuit. As previously stated, the tip conductor of the cord plug 1005 is connected over conductor 303 to the left-hand control grids of tubes V1(2) to V5(3), the connection of tubes V1(2) to V4(3) being through a resistance of approximately .4 megohm, while the connection to tube V5(3) is through a resistance of approximately 1 megohm. Conductor 303 is also connected through a resistance of 24,000 ohms to −24 volt battery. The right-hand grids of tubes V1(2), V2(2) and V3(2) are connected directly to −24 volt battery. The corresponding grid of tube V4(3) is connected to a potential derived from a voltage divider connecting −24 volt battery and ground and tube V5(3) is connected to a potential derived from a voltage divider connecting −24 volt battery and −48 volt battery. Similarly conductor 308, which is connected to the ring conductor of plug 1005, is connected to the left-hand grids of tubes V6(3) and V7(3) through a resistance of approximately .4 megohm and to the left-hand grid of tube V8(3) through a resistance of approximately 1 megohm and to −24 volt battery through a resistance of 24,000 ohms. The right-hand grid of tube V6(3) is connected directly to −24 volt battery. The right-hand grid of tube V7(3) is connected to a potential derived from a voltage divider connecting −24 volt battery and ground and the right-hand grid of tube V8(3) is connected to a potential derived from a voltage divider connecting −24 volt battery and −48 volt battery. In each case the two cathodes of the tubes are connected in parallel through suitable individual resistances to the two parts of a potentiometer the slider of which is connected to the same potential as the right-hand grid of the associated tube. The plates of the tubes are connected through balanced resistances to +130 volt battery. A relay is connected between the two plates of each tube.

With the potentiometers properly adjusted, the current flow in the various plate circuits is such that relays TL+(2), TL−1(2), TL−2(2) and RL−(3) normally hold their armatures in the left position so that the contacts of relays TL+(2) and TL−1(2) hold their single contacts open while relays TL−2(2) and RL−(3) close their contacts 1. Relays TH+(2), TH−(2), RH+(3) and RH−(3) on the other hand hold their armatures in the right-hand position so that all of these relays hold their contacts open.

When a direct-current pulse appears on the left-hand grid of any tube the two plate and cathode impedances are changed causing a change in a current flow through the associated relay which, if it is of the required magnitude and polarity, will cause the relay to operate or release. When a pulse causes the left-hand grid to be made positive relative to the normal −24 volt battery the internal impedance of the left-hand side of the tube is reduced causing an increase in plate current through that side of the tube lowering the plate potential and causing current to flow from the right-hand plate to the left-hand plate through the relay winding. Conversely if the incoming pulse causes the left-hand grid to be made negative with respect to −24 volt battery, current flows in the opposite direction through the relay.

Tubes V1(2) and V2(2) are similarly adjusted but polarized relay TL+(2) associated with tube V1(2) is so connected as to respond to the changes induced by any positive pulse while the polarized relay TL−1(2) is so connected as to respond to the changes induced by any negative pulse. The function of relays TL+(2) and TL−1(2) is to indicate the presence of any digit, all digits having a pulse of some sort on the tip conductor. Tube V3(2) and relay TL−2(2) are duplicates of tube V2(2) and relay TL−1(2) and serve to control the register relays. Tubes V6(3), V7(3) and V8(3) and the associated relays perform the same functions with respect to the ring conductor that tubes V2(2), V4(2) and V5(3) perform with respect to the tip conductor. Tubes V4(2), V5(3), V7(3) and V8(3) respond to heavy pulses. Tubes V4(2) and V7(3) respond to positive pulses, while tubes V5(3) and V8(3) respond to negative pulses. For each of tubes V4(2), V5(3), V7(3) and V8(3) the associated relay is normally operated, that is, holds its left-hand contact open. When a pulse is received the unbalance of the tube circuit causes the associated relay to release.

When relay HC(6) operated, as previously described, connecting ground to conductor 607 to complete the heater circuits for the tubes V1(2) to V8(3), a circuit was closed from ground on conductor 607 over contact 1 of relay SA(3) to battery through the winding of relay KP(3). Relay KP(3) operates to close a shunt around its winding to make it slow to release, opening the circuit of relay SD(3). When relay SA(3) operates, as previously described, it opens the circuit of relay KP(3) and during the release time of that relay the right winding of repeating coil 302 is connected over contacts 2 and 3 of relay SA(3), contacts 1 and 3 of relay TM(3), contacts 3 and 4 of relay KP(3) to conductors 212 and 220 to transmit a preliminary or KP signal to the service observing position. As soon as relay KP(3) releases, the KP signal is terminated and a circuit is closed from ground on conductor 607 in parallel over the normally closed contacts of relays TL−2(2) and RL−(3) to conductor 201, contact 1 of relay KP(3) to battery through the winding of relay SD(3), operating the latter relay.

Therefore when the operator operates key 9 for the first digit of the designation to be sent out, heavy battery is connected to the lower contact of key 9 and over that contact as above traced to the ring contact of the cord and to conductor 308. Tubes V6(3) and V8(3) respond to this pulse, in turn operating relay RL−(3) and causing relay RH−(3) to release. At the same time, ground through resistance 511 is connected as previously traced over the upper contact of key 9 to the tip contact of the cord and to conductor 303. Tube V1(2) responds to this pulse, in turn operating relay TL+(2). Relay TL+(2) closes its contact, and connects ground over conductor 200, contact 6 of relay SD(3) to battery through the winding of relay TM(3) and over conductor 203 and contact 6 of relay P3(2) to battery through the winding of relay P12(2) which operates. Relay RL—(3) at its contact 1, opens the circuit of relay SD(3) but that relay is held operated over contact 1 of relay TL−2(2). When relay P12(2) operates, relay RL—(3) closes a circuit from ground on conductor 607, over contact 2 of relay RL—(3), contact 3 of relay SD(3), conductor 306, contact 3 of relay P12(2) to battery through the winding of relay 224 which operates. Relay RH—(3) in releasing closes its contact, connecting ground to conductor 309 and over contact 4 of relay SD(3), conductor 307, contact 4 of relay P12(2), windings of relays 225 and 226 to battery operating relays 225 and 226.

Relay P12(2) at its contact 11 closes an obvious circuit for relay P3(2). Relay P3(2) operates and locks over its contact 5, conductor 203, contact 6 of relay SD(3), conductor 200 to ground at the contact of relay TL+(2). At its contact 6, relay P3(2) opens the operating circuit of relay P12(2) and at its contact 7 connects ground to conductor 204 completing an operating circuit for relay SD1(3). At its contacts 1 to 4, relay P3(2) closes substitute circuits for relays 221 to 226 under the control of the pulse receiving relays so that relays 224, 225 and 226 remain operated after relay P12(2) releases. As soon as relay P12(2) releases, relays 224, 225 and 226 lock under the control of relay TM(3), the locking circuit for relay 224 extending from battery through its winding and over its contact 4, contact 6 of relay P12(2), conductor 205 to ground on contact 6 of relay TM(3), while the locking circuit for relays 225 and 226 extends from battery through the windings of relays 226 and 225, contact 5 of relay 225, contact 5 of relay P12(2), conductor 206 to ground at contact 5 of relay TM(3).

When the operator releases key 9, the direct-current pulse ends and tubes V1(2), V6(3) and V8(3) return to their normal conditions. Relays TL+(2) and RL—(3) release and relay RH—(3) reoperates. The release of relay TL+(2) opens the circuit of relay TM(3) and the locking circuit for relay P3(2). Relay P3(2) releases immediately but relay TM(3) is slow to release. During the release time of relay TM(3) the register relays 224, 225 and 226 are held operated and two circuits are closed for transmitting the multifrequency code for the digit 9 to the service observing position. These circuits may be traced from the 1500-cycle source connected to conductor 217, contact 7 of relay 226, contact 6 of relay 224, contact 9 of relay 222, contact 5 of relay 221, contact 10 of relay P12(2), contact 9 of relay P3(2), conductor 207, contact 4 of relay TM(3), contact 2 of relay SA(3) to the right winding of repeating coil 302 and from the 1100-cycle source connected to conductor 212, contact 2 of relay 226, contact 2 of relay 224, contact 1 of relay 222, contact 1 of relay 221, contact 9 of relay P12(12), contact 8 of relay P3(2), conductor 208, contact 2 of relay TM(3), contact 3 of relay SA(3) to the right winding of repeating coil 302. If the interdigital time is sufficient, the length of the multifrequency pulse is measured by the release time of relay TM(3). If, however, the next key is operated before relay TM(3) releases, the operation of relay P12(3), in response to the next digit, opens the above-traced circuits terminating the multifrequency pulses.

Following is a table showing the relationship between the digits, the D. C. code pulses, the response of the tubes and associated relays, the register relays operated and the multifrequency code pulses sent out to the service observing desk:

| Digit | Conductor | Class of D. C. Voltage to Sender | D. C. Receiving Circuit | | MF Sending Circuit | |
|---|---|---|---|---|---|---|
| | | | Receiving Relays Actuated Off-Normal | by Vacuum Tubes | Register Relays Operated | MF Tones on Conductors 300 and 301, C. P. S. |
| 0 | 1121 | Light+ | TL+(2) | V1(2) | | 1,300 |
| | 1122 | None | None | | | 1,500 |
| 1 | 1121 | Heavy+ | TL+(2), TH+(2). | V1(2), V4(2). | 221 | 700 |
| | 1122 | None | None | | | 900 |
| 2 | 1121 | Light− | TL−1(2), TL−2(2). | V2(2), V3(2). | 222 | 700 |
| | 1122 | Light+ | None | | | 1,100 |
| 3 | 1121 | Heavy− | TL−1(2), TL−2(2), TH−(3). | V2(2), V3(2), V5(3). | 221, 222 | 900 |
| | 1122 | Light+ | None | | | 1,100 |
| 4 | 1121 | do | TL+(2) | V1(2) | 224 | 700 |
| | 1122 | Light− | RL−(3) | V6(3) | | 1,300 |
| 5 | 1121 | Light+ | TL+(2) | V1(2) | | 900 |
| | 1122 | Heavy+ | RH+(3) | V7(3) | 225, 226 | 1,300 |
| 6 | 1121 | do | TL+(2), TH+(2). | V1(2), V4(2). | 221 | 1,100 |
| | 1122 | do | RH+(3) | V7(3) | 225, 226 | 1,300 |
| 7 | 1121 | Light− | TL−1(2), TL−2(2). | V2(2), V3(2). | 222 | 1,500 |
| | 1122 | Heavy+ | RH+(3) | V7(3) | 225, 226 | 700 |
| 8 | 1121 | Heavy− | TL−1(2), TL−2(2), TH−(3). | V2(2), V3(2), V5(3). | 221, 222 | 1,500 |
| | 1122 | Heavy+ | RH+(3) | V7(3) | 225, 226 | 900 |
| 9 | 1121 | Light+ | TL+(2) | V1(2) | | 1,100 |
| | 1122 | Heavy− | RL−(3), RH−(3). | V6(3), V8(3). | 224, 225, 226. | 1,500 |
| ST | 1121 | Heavy+ | TL+(2), TH+(2). | V1(2), V4(2). | 221 | 1,500 |
| | 1122 | Light− | RL−(3) | V6(3) | 224 | 1,700 |

In the key-set circuit, the operation of the numerical keys also connects the combinations of light and heavy battery and ground pulses indicated in the above table to the windings of relay P(5) but the combinations are such that relay P(5) does not operate in response thereto. After completing the keying of the numerical designation the operator operates the start key of Fig. 5 closing an obvious circuit for operating relay ST(5). With relay ST(5) operated, the tip of plug 1005 is connected as above traced to conductor 407 and thence over contact 10 of relay SA1(5), contact 4 of relay ST(5), contacts 12 and 2 of relay MF2(5) to ground at contact 3 of relay KP(5). The ring of plug 1005 is connected as previously traced to conductor 500 and thence over contact 12 of relay SA1(5), contact 2 of relay ST(5), resistance 505, contact 8 of relay SA1(5) to −48 volt battery through resistance lamp 507, thereby transmitting a start signal to the distant sender as an indication that no more digits will be keyed. When the sender receiving the direct-current pulses recognizes the start pulse, it connects −48 volt battery to both the tip and ring conductors of the trunk. This −48 volt battery is extended to the pulse conversion circuit in the same manner as the pulses from the key-set, resulting in the operation of relays TL−2(2) and RL—(3). With both of these relays operated, ground is removed from conductor 201 opening the circuit of relay SD(3) which immediately releases, disconnecting the register relays from the code relays and thereby preventing a false registration in response to the sender disconnect signal.

Each time that relay P3(2) operates in response to the registration of a digit it operates relay SD1(3) as previously described. With relay SD(3) held operated, relay SD1(3) is ineffective but as soon as relay SD(3) is released, in response to the sender disconnect signal, ground is connected over the contact of relay SD1(3), contact 5 of relay SD(3) to battery in shunt of the winding of relay SD(3). Relay SD1(3) is held operated until relay P3(2) is released in response to the release of relay TM(3) so that the last pulse transmitted to the service observing circuit is of full length. Relay SD1(3) is slow to release and therefore measures an additional interval before removing the shunt from relay SD(3) and permitting that relay to be reoperated.

When, as above described, the sender, in response to the start signal, connects —48 volt battery to both the tip and ring conductors of the trunk, this battery is also extended to the windings of relay P(5). Relay P(5) operates in response to this signal and closes at its contact 1 an obvious circuit for operating relay KD(5). Relay KD(5) closes a locking circuit for itself which may be traced from battery through the winding of relay KD(5), contact 2 of relay SA1(5), contact 2 of relay KD(5) to ground on conductor 502. At its contact 7, relay KD(5) reconnects battery in shunt with the biasing winding of relay P(5) so that the relay will now remain operated with only one winding energized. At its contact 3, relay KD(5) disconnects the upper winding of relay P(5) from the tip of plug 1005 and at its contact 4 connects the tip of plug 1005 over conductor 514 to ground at contact 2 of relay MF(4). The sender responds to the connection of ground to the tip conductor by removing the —48 volt battery from the tip and ring conductors whereupon relay P(5) releases, closing a circuit from ground over contact 2 of relay P(5), contact 6 of relay KD(5), contact 6 of relay SA1(5), conductor 515 to battery through resistance 403, in shunt with the winding of relay F(4) causing relay F(4) to release, disconnect the key-set from the cord circuit and extinguish lamp KF(4).

The left winding of repeating coil 302 is connected as previously traced to the multifrequency receiving circuit 2809 at the service observing position. In this circuit the reception of the various frequencies causes the grounding of certain output conductors as indicated by the following table:

| Digit | Frequencies (cycles) | Conductors Grounded |
|---|---|---|
| 0 | 1,300 / 1,500 | 2824 / 2827 |
| 1 | 700 / 900 | 2820 / 2821 |
| 2 | 700 / 1,100 / 900 | 2820 / 2822 / 2821 |
| 3 | 1,100 / 700 | 2822 / 2820 |
| 4 | 1,300 / 900 | 2824 / 2821 |
| 5 | 1,300 / 1,100 | 2824 / 2822 |
| 6 | 1,300 / 700 | 2824 / 2820 |
| 7 | 1,500 / 900 | 2827 / 2821 |
| 8 | 1,500 / 1,100 | 2827 / 2822 |
| 9 | 1,500 / 1,100 | 2827 / 2822 |
| KP | 1,100 / 1,700 | 2822 / 2830 |
| ST | 1,500 / 1,700 | 2827 / 2830 |

In addition, as each pulse is received, ground is connected to conductor 2831 and, if the pulse is made up of two frequencies, ground is connected to conductor 2832.

As above described the first pulse transmitted is a KP signal. As shown in the above table this signal causes the grounding of conductors 2822 and 2830. Ground on conductor 2831 completes a circuit over contact 4 of relay FKP(26) to battery through the winding of relay SYN(26). Relay SYN(26) operates and connects ground to conductors 2650, 2609, 2610 and 2611 providing holding circuits for relays OD(26), OD1(26), KP(7) and PC(25). Ground on conductor 2832 normally completes a circuit over contact 3 of relay 10A(26) to battery through the winding of relay RA(26). However, ground on conductor 2830 operates relay TEN(26) which in turn operates relay 10A(26) so that the circuit of relay RA(26) is opened before that relay can operate. With relay 10A(26) operated, ground on conductor 2822 completes a circuit over contact 4 of relay 10A(26), conductor 2612, contact 2 of relay KP(27), contact 2 and winding of relay KP1(27) to battery. Relay KP1(27) operates in this circuit and locks over its contact 3 to ground on conductor 2607. Ground on conductor 2822 also completes a circuit over contact 4 of relay EV1(26), conductor 2622, contact 7 of relay AS(29), conductor 2922 to battery through the winding of relay A2(30) but, as soon as the KP signal is removed, this relay releases as well as relays TEN(26), 10A(26) and SYN(26).

With relay KP1(27) operated, the operating circuit of relay KP(27) is opened and, when relay SYN(26) releases, the holding circuit of relay KP(27) and is also opened and that relay releases.

With relay KP1(27) operated and relay KP(27) released, a circuit is closed from battery over contact 1 of relay MF(27), conductor 2711, contact 3 of relay KD(27), resistance 2717, contact 5 of relay KP(27), contact 7 of relay KP1(27), contact 7 of relay PK(27), conductor 2714, contact 3 of relay MK(32), conductor 3206 to ground through lamp SDR(25), lighting that lamp to indicate that a sender has been attached.

The multifrequency pulse representing the first digit of the keyed designation comprises currents of 1100 cycles and 1500 cycles as above described. These frequencies are received by the multifrequency receiving circuit 2809 which responds thereto to connect ground to conductors 2822 and 2827. Conductor 2822 extends over contact 4 of relay EV1(26), conductor 2622, contact 7 of relay AS(29), conductor 2922, winding of relay A2(30) to battery. Conductor 2827 extends over contact 2 of relay EV1(26), conductor 2627, contact 5 of relay AS(29), conductor 2927 to battery through the winding of relay A7(30). Relays A2(30) and A7(30) operate in this circuit. With relays A2(30) and A7(30) operated, a circuit is closed from battery through resistance 3002, contact 2 of relay A7(30), contact 4 of relay A2(30), conductor 3019 through lamp 3029 to ground lighting lamp 3029 to indicate to the service observing operator that the first digit keyed was the digit 9. At the same time relays RA(26) and SYN(26) are operated as above described. With relay RA(26) operated, a circuit is closed from battery through the winding of relay BS(29), contact 2 of relay AS(29), conductor 2901, contact 1 of relay EV1(26), contact 1 of relay RA(26) to ground at contact 1 of relay TEN(26). Relay BS(29) operates in this circuit and locks over its contact 4 and contact 10 of relay CS(29) to ground on conductor 2600. With relay BS(29) operated a locking circuit is closed for relays A2(30) and A7(30) over conductor 3001, resistance 3005, conductor 3006, contact 11 of relay BS(29) to ground on conductor 2600. Relay BS(29) opens one locking circuit for relay AS(29) but that relay is held operated at this time over its contact 3, conductor 2902, contact 2 of relay EV(26) to ground on conductor 2603.

As soon as relay BS(29) operates, a circuit is closed from battery through the winding of relay EV(26), conductor 2613, contact 1 of relay BS(29) to ground on conductor 2605. Relay EV(26) extends its operating ground over its contacts 4 and 3 to the winding of relay EV1(26) operating the latter relay. The operation of relay EV(26) opens the holding circuit for relay AS(29) and that relay releases. The release of relay AS(29) opens the operating circuit for relays OD(26) and OD1(26) but these relays are held operated under the control of relay SYN(26). With both relays OD1(26) and EV1(26) operated, the output conductors of the multifrequency receiving circuit 2809 are disconnected from the register relays of Fig. 30. The release of relay AS(26) closes a supplementary connection between conductors 3006 and 2600 to hold the register relays A2(30) and A7(30) operated.

When the digit pulse ends, relays SYN(26) and RA(26) release, in turn releasing relays OD(26) and OD1(26).

In response to the next digit pulse, the grounded code conductors are extended over contacts of relay OD1(26) and contacts of relay BS(29) to relays B0(30) to B7(30). As described for the first digit, relays SYN(26) and RA(26) operate, relay RA(26) closing a circuit from battery through the winding of relay CS(29), contact 2 of relay BS(29), conductor 2904, contact 1 of relay OD1(26) contact 1 of relay RA(26) to ground at the contact 1 of relay TEN(26). With relay CS(29) operated, two operated register relays B0(30) to B7(30) are locked and light the corresponding lamp. With relay CS(29) operated, relay OD(26) is operated followed by relay OD1(26). With relays OD(26) and CS(29) operated relay BS(29) is released, followed by the release of relays EV(26) and EV1(26) when relay SYN(26) releases. The circuit is now ready to receive the third digit pulse and the remaining digits are received and registered and the associated lamps lighted in a similar manner.

When the start key at the cord operator's position is operated as previously described a pulse made up of the frequencies 1700 cycles and 1500 cycles is received. As described for the KP pulse the reception of the 1700-cycle frequency causes the operation of relay TEN(26) followed by relay 10A(26) which prevents the operation of relay RA(26) and thereby prevents the operation of any additional steering relays. The 1500-cycle frequency causes the connection of ground to conductor 2827 to complete a circuit over contact 1 of relay 10A(26) to battery through the winding of relay ST(26). Relay ST(26) operates in this circuit and locks over its contact 5 to ground on conductor 2604. With relay ST(26) operated, ground is connected over contacts 5 to 8 of relay PC(25), conductors 2517 to 2520, contacts 1 to 4 of relay ST(26) to the locking circuits of the steering relays and of relays OD(26) and EV(26) so that the operated steering relays and the operated one of the relays OD(26) and EV(26) are held operated. Relay ST(26) closes a circuit from battery over contact 1 of relay MF(27), conductor 2711, resistance 2651, contact 9 of relay ST(26), conductor 2614 to ground through lamp ST(25) lighting that lamp as an indication that the designation has been completed by the transmission of the start signal. Relay ST(26) also opens the operating circuit of relay PC(25) causing that relay to release. Relay PC(25) restores the register control relays to normal, connects resistance 2514 across the left winding of repeating coil 2501 and disconnects that winding from the multifrequency receiving circuit 2809.

When relay F(4) releases as above described the circuit of relay KA(6) is opened and that relay releases, disconnecting +130 volt battery from the signaling circuit and thereby releasing relay KA(27). The release of relay KA(27) removes the shunt from the winding of relay KD(27) and the latter relay operates. Relay KD(27), in operating, opens the circuit of lamp KON(25) to indicate that the key-set has been disconnected.

Having observed the response of the cord operator and checked that the correct designation has been keyed, the service observing operator will now usually release her position to make it available to serve other calls. For this purpose she will operate key RLS(35). The operation of key RLS(35) closes a circuit from ground at contact 4 of relay PB(35), contact of key RLS(35) to battery through the winding of relay R(35). Relay R(35) operates and locks over its contact 2 to ground at contact 4 of relay PB(35). Relay R(35) will also be operated if the operator vacates her position without operating key RLS(35). In the latter case the removal of the headset releases relay OPR(35) which closes a circuit from ground over its contact 1, contact 3 of relay PB(35) to battery through the winding of relay R2(35). When relay BC(35) operated, as previously described, a circuit was closed from ground over contact 1 of relay BC(35), contact 1 of relay R2(35) to battery through the winding of relay R3(35) operating the latter relay. Therefore, when relay R2(35) operates, it closes a circuit from ground over its contact 2 and the contact of relay R3(35) to battery through the winding of relay R(35).

Relay R(35), when operated, closes a circuit from battery through the winding of relay R1(35), conductor 3516, contact 7 of relay SH(32), conductor 3205, contact 1 of relay R(35), conductor 3517 to ground at contact 1 of relay TMR(32). Relay R2(35) also opens the circuit of relay R3(35) causing that relay to release slowly and open the operating circuit for relay R(35).

Relay R1(35) disconnects battery and ground from conductors 3507 and 2206 thereby permitting relay LOB(22) to release. Battery is maintained on conductor 3507 over contact 3 of relay TD2(35) so that relay LO1B(22) is held operated. The release of relay LOB(22) opens the rear and front observing circuits but the signaling circuit is maintained by relay LO1B(22). Relay R1(35) also reverses the connection of battery and ground to the signaling circuit.

The opening of the front and rear observing circuits permits relays RC(28), FC(28), RPU(28) and FPU(28) to release, extinguishing lamps RPU(27) and FPU(27). The release of relay FPU(28) opens the circuit of relay HG(26) and that relay releases, in turn releasing relays KC(25), KD(27), KP1(27) and ST(26) as well as the digit register relays, the latter relays extinguishing their associated lamps.

The reversal of the connection of battery and ground to the signaling circuit causes the operation of polarized relay PB(6). Relay ST(6) releases momentarily but immediately reoperates and relay ST1(6) is slow to release so that it will remain operated. With relay PB(6) operated the locking circuit for relay TM2(7) is opened and that relay releases after an interval determined by its slow-to-release character. The release of relay TM2(7) disconnects ground from conductor 1111 causing relay A1(11) to release, in turn releasing relay C1(11) and disconnecting the service observing circuit and trunk from the cord circuit. The disconnection of the cord circuit causes relays RP(9) and FP(9) to release, in turn releasing relays RP1(9) and FP1(9). The release of relay A1(11) releases relay TC(6) which in turn releases relays CA(7), LB(6) and TC1(6). With relay TC(6) released, the operating circuits of relays TM1(7) and CT(6) are reclosed and these relays reoperate. With relay LB(6) released, the resistances 601 and 600 and the high resistance upper winding of relay ST(6) are again included in the signaling circuit thereby causing relay HB(27) to release.

Relay HB(27) in releasing releases relay INT(35) which in turn releases relays TD(35) and TD2(35). With relay TD2(35) released, relay LO1B(22) releases extinguishing lamp 2216 and releases relay MCD(27) to remove the class mark. The position circuit is now ready to bid for another call. Relay LO1B(22) disconnects the signaling circuit from relays HB(27) and KA(27) and reconnects with battery and ground in the original direction at contacts of the group busy relay GB(22). The restoration of the battery and ground connection permits relay PB(6) to release and, when relay TC1(6) is released, to reoperate relays CO1(6) and CO2(6) to prepare the service observing circuit for a new call.

At the service observing position for a normal call using direct-current code pulses, trunk lamp 2216 is lighted to indicate an incoming call followed by rear plug-up lamp RPU(27). The service observing operator may then hear the wanted number passed to the toll operator after which front plug-up lamp FPU(27) lights followed by lamps KON(27), SDR(27) and the digit lamps of Fig. 30. Assuming a start signal is sent, lamp ST(27) lights after which lamps KON(27) and SDR(27) are extinguished. Lamps FSV(27), RSV(27), FR(27) and RR(27) may or may not be lighted. For a normal call using multifrequency code pulses lamp FSV(27) should light before any digit lamps light. The digit lamps and lamp ST(27), if lighted, remain lighted until the operator releases.

Multifrequency trunk

In the foregoing description it was assumed that the outgoing trunk was one requiring direct-current code pulses. If the designation received by the cord operator is one of an office requiring multifrequency code pulses and the operator plugs into the jack of a trunk leading to such office, that trunk holds ground connected to the ring conductor as previously mentioned so that relay D(5) remains operated. Therefore, when relay D1(5) finally releases, a circuit is closed from ground at contact 1 of relay F(4), conductor 404, contact 1 of relay D(5) contact of relay D1(5), conductor 516 to battery through the winding of relay MF(4). Relay MF(4) operates and locks over its contact 3 to ground at contact 11 of relay F(4). With relay MF(4) operated, the tip of plug 1005 is connected over conductor 1011, contact 3 of relay TK(10), conductor 1012, contact 7 of relay F(4), contact 5 of relay MF(4), conductor 411 to the left winding of repeating coil 517, while the ring of plug 1005 is connected over conductor 1010, contact 12 of relay TK(10), conductor 406, contact 9 of relay F(4), contact 6 of relay MF(4), conductor 412 to the other side of the left winding of repeating coil 517. Relay MF(4) at contact 7 also opens the circuit of relay D(5) causing that relay to release.

When the sender is attached at the distant office, the resistance connected to the sleeve of the trunk jack is reduced and certain relays in the position circuit operate, connecting ground to conductor 413 completing a circuit over contact 12 of relay F(4), contact 8 of relay MF(4), conductor 414, contact 4 of relay KP(5) to battery through the winding of relay KP1(5) which operates. With relay KP1(5) operated the right winding of coil 517 is connected over contacts 2 and 5 of relay KP1(5) to conductors 530 and 522 which are connected to sources of 1700-cycle and 1100-cycle current, respectively, in the multifrequency supply circuit 518 which may be the same circuit as source 209. These currents constitute the preliminary or KP signal to the distant sender.

With relay MF(4) operated, relay SA(5) cannot operate and therefore relays SA1(5) and SA(3) are not operated at this time. The front service observing circuit therefore extends as previously traced to conductors 1121 and 1122 which are connected over contacts 6 and 8 of relay SA(3) and contacts 4 and 6 of relay PK(3) to conductors 300 and 301 and thence to the service observing position. Relay KP1(5) opens the locking circuit of relay KP(5) and that relay releases slowly and, in turn, releases relay KP1(5) to terminate the KP signal. With relays KP(5) and KP1(5) released, a circuit is closed from ground at contact 11 of relay F(4), conductor 502, contact 1 of relay KD(5), conductor 519, contact 1 of relay MF(4), conductor 415, contact 1 of relay KP(5), contact 3 of relay KP1(5), conductor 532 to battery through the windings of relays MF1(5) and MF2(5) in parallel and from conductor 532 over contacts 12 and 13 of jack 1102 and plug 1101, contact 8 of relay C1(11), conductor 1124, contact 6 of relay KA(6), conductor 616 to battery through the winding of relay MF(3). Relays MF1(5), MF2(5) and relay MF(3) operate in this circuit. Relay MF(3) disconnects the windings of relays SA(3) and PK(3) from the key-set circuit to prevent their operation during multifrequency pulsing. With relays MF1(5) and MF2(5) operated and relay KP1(5) released the right winding of repeating coil 517 is connected over contacts 1 and 6 of relay KP1(5) and contacts 12 and 14 of relay MF1(5) to one side of each contact of key-set 510. The other sides of these contacts are connected, according to the multifrequency code, over contacts of relays MF1(5) and MF2(5) to the various frequencies as supplied by source 518. Therefore as each key is operated the proper frequencies are transmitted, both to the trunk and to the service observing position. Relay ST(5), which may be operated to indicate the termination of the designation as previously described, connects the right winding of repeating coil 517 over its contacts 1 and 5 to conductors 530 and 527 thereby causing the transmission of a pulse of 1700-cycle and 1500-cycle current.

With relay MF2(5) operated, a circuit is closed from battery through the winding of relay SA1(5), conductor 513, contact 1 of relay MF2(5), conductor 519, contact 1 of relay KD(5), conductor 502 to ground at contact 11 of relay F(4) operating relay SA1(5). It will be noted that at the time relay SA1(5) is operated, relay MF(3) has already been operated so that relay SA(3) cannot operate in response to the operation of relay SA1(5). Relay SA1(5) connects battery to the windings of relay P(5) as before. When relay ST(5) operates it closes a circuit from battery through resistance lamp 507, contact 8 of relay SA1(5) to resistance 505 and thence over contact 13 of relay MF2(5), contact 4 of relay ST(5), contact 9 of relay SA1(5), contact 3 of relay KD(5) to the upper winding of relay P(5). A second circuit extends as above traced from battery to resistance 505 and thence over contact 2 of relay ST(5) to the middle winding of relay P(5). Relay SA(5) is connected in parallel with the upper winding of relay P(5) and therefore relay P(5) does not receive sufficient current to operate until relay SA(5) has operated and opened the parallel connection. When relay P(5) operates, it closes an obvious circuit for relay KD(5) which operates and locks. When key ST(5) is released, relay ST(5) releases, terminating the start signal and opening the circuits of relay P(5). Relay P(5) releases and shunts down relay F(4) to disconnect the key-set from the cord as previously described.

Supervisory signals

As was previously described, the sleeve of plug 1001 was connected to the left grid of tube G5(9) while the sleeve of plug 1005 was connected to the left grid of tube G3(9). These tubes constitute high impedance monitoring devices for detecting supervisory signals on the front cord and rear cord sleeve circuits. Referring first to tube G3(9), the potential applied to the right grid of this tube is such that when plug 1005 is not plugged in or if it is plugged into a trunk circuit jack having a high resistance, indicating an off-hook condition, the voltage appearing on the left grid of tube G3(9) unbalances the tube in a direction to cause relay FSV(9) to hold its contact open. When the resistance in the sleeve circuit of the trunk is reduced to give an on-hook indication, as for example, when the sender was attached in the case of the multifrequency trunk as previously described, the tube circuit is unbalanced in the opposite direction and relay FSV(9) closes its contact. With relay FSV(9) operated, a shunt is closed around resistances 909 and 910 which are included in the front supervisory circuit thereby increasing the current flow in this circuit and causing marginal relay FM(28) to operate. Relay FM(28) connects ground over conductor 2813 and contact 9 of relay MCD(27) to battery through lamp FSV(27) causing that lamp to light as a front supervisory signal. If the service observing position and service observing trunk are not previously disconnected from the cord circuit, the reply by the called subscriber causes a return of the trunk circuit to the off-hook condition thereby releasing relays FSV(9) and FM(28) and extinguishing lamp FSV(27).

Since the incoming trunk is normally in the off-hook condition at the time that the cord circuit is connected therewith relay RSV(9) usually operates only in response to the abandonment of a call. If relay RSV(9) does operate, it closes a shunt around resistances 923 and 924 which are included in the rear supervisory circuit causing marginal relay RM(28) to operate and ground conductor 2814 to light lamp RSV(27).

Whenever the toll operator operates a ringing key, for example, key RING F(10), to signal the called subscriber, relay R(10) is operated, to extend the tip and ring conductors of the cord circuit to the position circuit where certain relays are operated to connect −48 volt battery to conductor 1015 and over contact 4 of relay R(10) to conductor 1011 and the tip of plug 1005. Conductor 1011 is extended as previously traced to resistance 918 and the grid of tube G7(9). The negative potential on conductor 1011 unbalances tube G7(9) so that relay FR(9) operates, in turn operating relay FR1(9). Relay FR1(9) at its contact connects +130 volt battery to the front observing circuit at a point between resistances 909 and 910 and thence in simplex to the service observing position where differential relay FR(28) is operated. Relay FR(28) closes a circuit from ground over contact 6 of relay CA(28), contact 6 of relay CA1(28), contact of relay FR(28), conductor 2815, contact 7 of relay MCD(27) to battery through lamp FR(27) which lights. When the ringing key is released tube G7(9) restores, and relays FR1(9) and FR(28) release, extinguishing lamp FR(27).

Tube G10(9) and relays RR(9), RR1(9) and RR(28) function in a similar manner to light lamp RR(27) if the operator, for any reason, rings-out over the rear plug.

In certain offices the switchboard positions may be arranged in two separate lines and for such offices the service observing circuits associated with one line will be like that shown in detail in Fig. 11. For the second line of switchboards the A relay is provided with an additional armature which is connected to conductor 1125 and its contact to an interrupter circuit as shown by relay A2(11). Conductor 1125 extends over contact 2 of relay CA(7) to the winding of relay INT(7). Therefore when relay CA(7) operates, relay INT(7) is operated intermittently, in turn opening and closing the circuit of relay LB(6). Relay LB(6) therefore intermittently opens and closes the shunt around the upper winding of relay ST(6) and resistances 600 and 601 causing relays HB(27) and INT(35) to operate and release and lamp 2216 to flash. When relay INT(35) operates it closes an obvious circuit for relay TD(35) which operates and holds relay TD2(35) operated to place the circuit of lamp 2216 under the control of relay INT(35).

*Irregularities*

There are a number of irregularities which may occur during the setting up of a designation. Due to circuit difficulties a false second KP signal may be sent out or a pulse of more than two frequencies may be sent out. The operator may also make an error in keying a number or may receive a reorder signal requiring that the front cord be removed from a jack; she may start to operate her key-set before receiving an indication that a sender has been attached; she may key more than a maximum complement of digits. In case a false second KP signal is received, ground will be connected by the multifrequency receiving circuit 2809 to conductors 2831, 2832, 2822 and 2830 as for the original KP signal thereby operating relays SYN(26), TEN(26) and 10A(26) as previously described. Relay 10A(26) prevents the operation of relay RA(26) so that no steering relay can be operated. Since the first KP signal caused the operation of relay KP1(27) and the release of relay KP(27), ground on conductor 2822 completes a circuit over contact 4 of relay 10A(26), conductor 2612, contact 1 of relay KP(27), conductor 2712 to battery through the winding of relay FKP(26). Relay FKP(26) operates in this circuit and locks over its contact 2 to ground on conductor 2603. At its contact 4 relay FKP(26) opens the operating circuit of relay SYN(26) preventing the operation of that relay. At its contact 1 relay FKP(26) opens a circuit which disables the multifrequency receiving circuit causing it to release and release relays TEN(26) and 10A(26) and preventing its operation in response to additional digits. Relay FKP(26) also closes a circuit from battery at contact 1 of relay MF(27), conductor 2711 through resistance 2615, contact 3 of relay FKP(26), conductor 2616 through lamp FKP(25) to ground. Lamp FKP(25) lights to indicate to the service observing operator that a false KP signal has been received.

If one of the pulses received by the multifrequency receiving circuit 2809 contains three or more frequencies, three of the output conductors 2820 to 2827 will be grounded, three relays of the corresponding register will be operated and the steering circuit will advance in the regular way. For example, assume that relays A0(30), A2(30) and A7(30) are operated. Under this condition a circuit will be closed from battery through resistance 3002, contact 2 of relay A7(30), contact 4 of relay A2(30), conductor 3019 to ground through lamp 3029. A second circuit will be closed from battery through resistance 3003, contact 2 of relay A2(30), contact 4 of relay A0(30), conductor 3012 to ground through the No. 2 lamp. A third circuit will be closed from battery through resistance 3004, contact 2 of relay A0(30), contact 4 of relay A7(30), conductor 3017 to ground through the No. 7 lamp. With these three lamp circuits closed in parallel in this fashion, the current is insufficient to light any one of the lamps. In addition, the multifrequency receiver 2809 is designed to connect ground to conductor 2835, whenever a pulse comprising more than two frequencies is received. Ground on conductor 2825 operates relay FF(26) which locks over its contact 2 to ground on conductor 2603 and connects battery from conductor 2711 through resistance 2617 to conductor 2618 and through lamp FF(25) to ground. Lamp FF(25) lights to inform the service observing operator that a false frequency has been received.

If the operator makes an error in keying a number or she receives a reorder signal she may remove the front plug from the trunk jack before or immediately after she has completed setting up the designation. The withdrawal of plug 1005 will cause the immediate release of relay F(4) and relay F(4) in releasing restores the key-set circuit to normal. The withdrawal of plug 1005 from jack 1006 also causes relays FP(9), FP1(9) and FSV(9) to release, in turn releasing relay KA(25) and relay FC(28) at the service observing position. With relay KA(27) released the shunt is removed from the winding of relay KD(27) and that relay operates opening the circuit for lamp KON(25). Relay FC(28) opens the circuit of relay FPU(28) and the latter relay releases slowly, in turn releasing relay HG(26) which removes ground from the locking circuit of relay KC(25) and various other relays. Relay KC(25) releases, in turn releasing relay KD(27) whereupon the circuit is in condition to receive a new front plug-up signal.

If the operator should depress any of the numerical keys before the distant sender is ready to receive pulses as indicated by the operation of relay SA1(5) and the lighting of lamp 506, the depression of any key will close a circuit for relay KD(5) over contact 11 of relay SA1(5). Relay KD(5) operates and locks in a circuit from battery through its winding, conductor 531, normal contacts of the front and rear keys of Fig. 4, conductor 416, contact 2 of relay KD(5), conductor 502 to ground at contact 11 of relay F(5). Relay KD(5) closes a circuit from interrupted ground on conductor 533 over its contact 5 and contact 4 of relay SA(5) to battery through lamp 506 causing that lamp to flash. With relay KD(5) operated the circuit for relay SA1(5) is opened and that relay cannot operate to prepare the key-set circuit for pulsing. To restore the circuit to pulsing condition either the front or rear key of Fig. 4 may be operated momentarily to open the locking circuit of relay KD(5). With relay KD(5) released, lamp 506 is extinguished and the operating circuit of relay SA1(5) is restored so that the latter relay may operate if the sender is now ready for pulsing.

At the service observing position the receipt of the digit will cause the multifrequency receiving circuit 2809 to operate and ground the corresponding conductors, in addition grounding conductors 2832 and 2831 to operate relays RA(26) and SYN(26). Relay RA(26) will operate relay BS(29) in the usual manner. However with relay KP(27) operated and relay KP1(27) normal, since no KP signal has been received, a circuit is closed from ground over contact 4 of relay RA(26), conductor 2642, contact 3 of relay PKL(27), contact 1 of relay KP1(27) to battery through the winding of relay PK(27). Relay PK(27) operates the locks over its contact 2 to ground on conductor 2606. At its contact 5 relay PK(27) connects interrupted ground to the winding of relay FL(27). Relay FL(27) therefore operates intermittently to close a circuit from battery over contact 1 of relay MF(27), conductor 2615, conductor 2713, contact 1 of relay FL(27), contacts 6 and 3 of relay PK(27), conductor 3206 to ground through lamp SDR(25) causing that lamp to flash. Relay PK(27) also opens one of the holding circuits for relay PC(25) and when the digit signal is over, the release of relay SYN(26) opens the remaining holding circuit for relay PC(25). Therefore relay PC(25) releases, disconnecting the multifrequency receiving circuit 2809 from the front observing circuit thus preventing the registration of any more digits. Relay PC(25) also opens a circuit to disable the multifrequency receiving circuit.

This preliminary keying feature is canceled if the cord operator has not inserted the rear plug 1001 in a jack prior to plugging the front cord 1005 in a jack. Under this condition when relay FPU(28) operates a circuit is closed from ground at contact 5 of relay MK(32), conductor 3204, contact 2 of relay FPU(28), contact 1 of relay RPU(28), conductor 2816 to battery through the winding of relay PKL(27). Relay PKL(27) operates and locks over its contact 1 to conductor 2812 independent of the contact of relay RPU(28). At its contact 3 relay PKL(27) opens the operating circuit of relay PK(27) and closes a circuit for operating relay KP(27) over contact 2 of relay PKL(27), conductor 2642 to ground at contact 4 of relay RA(26) so that relay KP1(27) operates in response to the first signal whether it is the KP signal or a digit signal.

If the operator keys a full set of digits relay RX(29) is operated during the reception of the last digit in a manner similar to the operation of the other steering relays, in turn operating relay OD(26). If, under this condition, the operator falsely keys an additional digit, relays SYN(26) and RA(26) are operated as previously described. With any one of the conductors 2820, 2821, 2822 or 2824 grounded by the multifrequency receiving circuit, for example conductor 2820, a circuit will be closed from ground on conductor 2820, contact 6 of relay EV1(26), conductor 2620, contact 7 of relay RX(29), conductor 2903, contact 2 of relay RA(26) to battery through the winding of relay OE(26). Relay OE(26) operates and locks over its contact 1 to ground on conductor 2603 and connects battery on conductor 2711 through resistance 2619, contact 2 of relay OE(26), conductor 2640 to ground through lamp RX(25) which lights to indicate that the operator had keyed an extra digit.

*Concentration of observations*

The cord circuit observing trunk is normally connected with about fifty service observing circuits and their associated cord circuits. In order to permit observations to become concentrated on less than the full number of cord circuits, means is provided for rendering only a portion of the service observing circuits effective to seize the service observing trunk circuit. This is accomplished by arranging for the selective operation of relays GC1(6), GC2(6), etc. If the service observing trunk is associated with fifty service observing circuits there will be two CO relays as shown, each CO relay controlling the operating circuits for five GC relays and each GC relay controlling the operating circuits for five relays like relay A1(11). Therefore the service observing circuits to be rendered effective will be handled in groups of five. The selection of the groups is determined by cross-connections at rack 700. It will be observed that terminal 1 on rack 700 is grounded over a back contact of relay AG(7); terminal 2 is grounded over back contacts of relays BG(7) and AG(7) in series; terminal 3 is grounded over a back contact of relay BG(7); terminal 4 is grounded directly. The operating circuits for the GC relays are extended to the left terminals of rack 700 and are cross-connected to terminals 1, 2, 3 and 4 as desired. Either relay AG(7) or relay BG(7) can be operated from the service observing position as will be described hereinafter but they cannot be operated simultaneously. The service observing circuits may be regarded as arranged in four groups A, B, C and D. Group D will include circuits controlled by those GC relays cross-connected to terminal 4 and will always be effective. Group B will include circuits controlled by those GC relays cross-connected to terminal 3 and will be rendered ineffective if relay BG(7) is operated. Group C will include circuits controlled by those GC relays cross-connected to terminal 2 and will be ineffective if either relay AG(7) or BG(7) is operated. Group A will include circuits controlled by those GC relays cross-connected to terminal 1 and will be ineffective if relay AG(7) is operated.

To control the operation of relays AG(7) and BG(7), when the cord service observing trunk circuit is idle the out-of-service key OSK(22) will be operated, closing an obvious circuit for the out-of-service relay OS(22). With relay OS(22) operated the signaling circuit is opened at contacts 4 and 5 of relay OS(22). The front observing circuit conductors 2210 and 2211 and the rear observing circuit conductors 2212 and 2213 are extended to contacts of key SW(22).

With the signaling circuit opened, relay ST(6) is released as well as relays ST1(6) and ST2(7). With relay ST2(7) released conductor 2210 is extended as previously traced to conductor 801 and over contact 7 of relay ST2(7) to battery through resistance 718; conductor 2211 extends through the winding of relay FCA(8), conductor 716, contact 5 of relay ST2(7) to ground; conductor 2212 extends to conductor 803 and over contact 11 of relay ST2(7) to battery through resistance 718; conductor 2213 extends through the lower winding of relay RCA(8), conductor 707, contact 9 of relay ST2(7) to ground. Key SW(22) is a three-position key being normally in its central position where both contacts are opened. If key SW(22) is moved to the left, conductors 2210 and 2211 are connected together completing an operating circuit for relay FCA(8). Relay FCA(8) operates and connects ground over its contact, conductor 810, contact 3 of relay ST2(7) to battery through the winding of relay AG(7). Relay AG(7) operates in this circuit. Having operated key SW(22) the out-of-service key OSK(22) is restored, releasing relay OS(22) and reclosing the signaling circuit. Relay ST(6) operates as previously described, in turn operating relays ST1(6) and ST2(7). Relay AG(7) is slow to release and remains operated until relay ST1(6) completes a locking circuit for relay AG(7) which extends over contact 3 of relay AG(7), contact 2 of relay BG(7), conductor 719 to ground at contact 3 of relay ST1(6).

If key SW (22) is operated to the right, conductors 2212 and 2213 are connected together completing a circuit for relay RCA(8) which operates, closing a circuit from ground over its contact, conductor 805, contact 1 of relay ST2(7) to battery through the winding of relay BG(7). Relay BG(7) locks over a back contact of relay AG(7) to ground on conductor 719 when relay ST1(7) reoperates.

*All positions busy*

Whenever all occupied positions at the service observing desk are simultaneously busy and are therefore unable to accept any additional calls for observation, group busy relay GB(22) is operated as previously described, reversing the connection of battery and ground to the signaling circuit. This reversed battery causes the operation of relay PB(6) disconnecting ground from the operating circuits of relays CO1(6) and CO2(6) and from the locking circuit of relay TM2(7). With relays CO1(6) and CO2(6) released, relays GC1(6), GC2(6), etc. cannot operate, none of the relays like relay B(11) can operate and none of the relays like relay A1(11) can operate.

*Release and recycle of service observing trunk circuit*

Relay PB(6) when operated as previously described in response to release by the service observing operator, opens the locking circuit of relay TM2(7) which releases after an interval. Relay TM2(7) opens the locking circuit of relay A1(11) causing that relay to release, in turn releasing relay C1(11). Relay C1(11) disconnects the cord and key-set circuit from the observing trunk, causing the tubes G7(9), G1(9), G3(9), G10(9), G8(9) and G5(9) to return to their normal condition, thereby releasing any of the relays FR(9), FR1(9), FP(9), FP1(9), FSV(9), RR(9), RR1(9), RP(9), RP1(9) and RSV(9) which may have been operated.

The release of relay A1(11) releases relay TC(6) which in turn releases relays CA(7), LB(6) and TC1(6) and reoperates relays TM1(7) and CT(6). Relay CA(8) removes the shunt from the upper winding of relay RCA(8) restoring the rear observing circuit to its high resistance condition. The release of relay LB(6) removes the shunt around the high resistance winding of relay ST(6) restoring the signaling circuit to its normal high resistance condition. Relay TC1(6), which releases slowly, prepares the circuits for relays CO1(6) and CO2(6).

When the service observing position has completed its release functions, battery and ground are restored to normal on the signaling circuit releasing relay PB(6), completing the operating circuits for relays CO1(6) and CO2(6) which reoperate. It may be noted that relay ST(6) remains operated, in turn holding relays ST1(6), ST2(7) and HC(6) operated. If either relay GB(7) or AG(7) is operated it is also held operated.

*Stale call timing*

It will be remembered that when the cord service observing trunk is in condition to receive a call, the relay, such as relay B(11), is operated in each service observing circuit on which no call is in progress so that, when relay PU(11) operates, the associated relay A1(11) operates, in turn operating relay TC(6) which operates relay LB(6) to transmit a seizure signal to the service observing desk. Relay TC(6) also opens the circuit of relay TM1(7) to initiate the sequential release of relays TM1(7) and TM2(7), both of which release slowly to measure a time interval. Normally the call will be accepted at the service observing position and relay CA(7) operated within this time interval thereby closing a locking circuit for relay TM2(2) to prevent its release. However, if there is a sufficient delay in returning the call-accepted signal, relay TM1(6) in releasing opens the circuit of relay LB(6) to remove the seizure signal from the signaling circuit. If the call is not accepted before relay TM2(7) completely releases, the locking circuit for relay A1(11) is opened at contact 1 of relay TM2(7) releasing relay A1(11) which in turn releases relay C1(11), relay TC(6) and relay TC1(6). When relay TC(6) is released, relays CT(6), TM1(7) and TM2(7) are reoperated. When relay TC1(6) is released, relays CO1(6) and CO2(6) reoperate followed by relays GC1(6), GC2(6), etc. which close circuits for operating the relays like relay B(11) in all idle service observing circuits. Since relay PU(11) is held operated from the call which attempted to seize the service observing trunk, relay B(11) cannot be operated nor can relay A1(11) be reoperated until the call in progress is terminated or abandoned.

*Key-set-attached timing*

It will be remembered that following the plug-up of the front plug 1005 a timing operation was initiated measured by the charging of condenser 708 and the operation of tube 713 and relay KT(7). If relay KT(7) operates before the cord operator operates her front key 402, the circuit of relay KA(6) is opened at contact 1 of relay KT(7) and no key-set-attached signal can be transmitted to the service observing position to prepare that circuit for receiving the designations. It may be noted however that under this condition and also if the operator key-pulses over the rear plug the signals sent out are audible to the service observing operator as tones or clicks.

*Speed of answer observing*

Recording completing trunks appear at a toll operator's position who completes toll calls, the details of which have already been received by some other operator. Therefore the chief point of interest from a service observing standpoint is the speed with which the toll operator responds to an incoming call on such a trunk.

A typical recording completing trunk is shown in Fig. 12. When this trunk is seized at the distant office, battery and ground are connected to conductors 1200 and 1201, completing a circuit over conductor 1200 to the upper left winding of repeating coil 1202, contact 1 of relay Q(12), upper and lower windings of relay L(12), lower left winding of repeating coil 1202 to conductor 1201. Relay L(12) operates in this circuit and closes its contact 1, completing an obvious circuit for relay RS(12). Relay RS(12) operates and connects battery over its contact, contact 4 of relay SC(12), conductor 1203 to ground through lamp LP(12).

When the toll operator inserts a plug 1207 in jack 1208 of this trunk circuit, resistance battery on the sleeve of plug 1207 completes a circuit over the sleeve of jack 1208 through the upper winding of relay S(12) to ground. Relay S(12) operates and closes a circuit for relay SC(12) which also operates. Relay SC(12) closes a shunt around the lower winding of relay L(12) over contact 4 of relay Q(12) and contact 1 of relay SC(12). It also connects condenser A(12) between the right windings of repeating coil 1202 to provide a talking circuit and at its contact 4 opens the circuit of lamp LP(12). The operator may then receive the details of the call and complete it to the wanted subscriber.

If the calling subscriber flashes the switchhook, relay L(12) releases and reoperates intermittently connecting ground over its contact 2 to the lower winding of relay S(12) to reduce the resistance in the sleeve circuit and cause the cord supervisory lamp (not shown) to flash.

Figure 13:
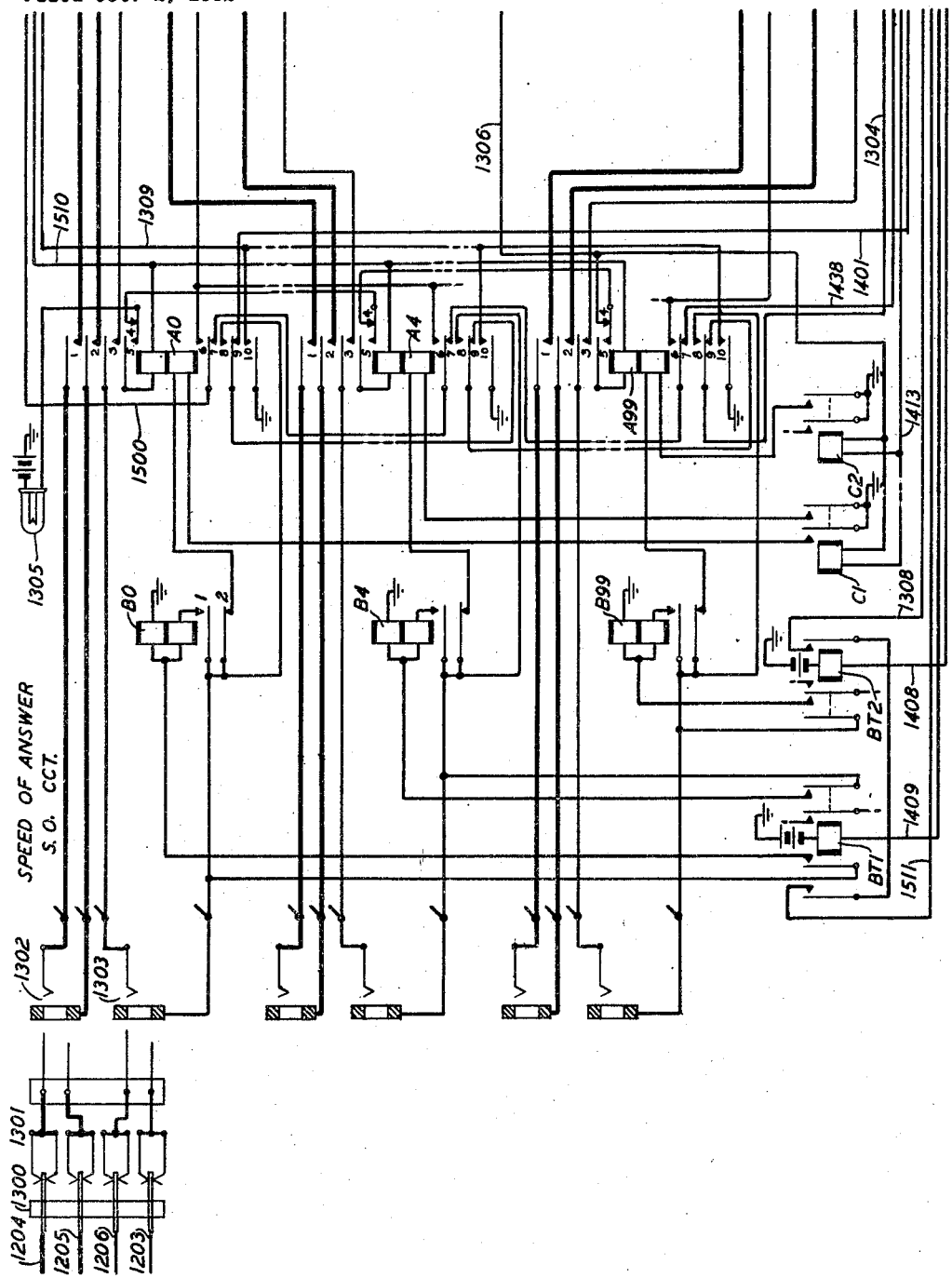

For service observing purposes, the tip of jack 1208, the ring of jack 1208, the sleeve of jack 1208 and the lamp circuit are connected over conductors 1204, 1205, 1206 and 1203 to a terminal rack 1300 where they may be connected by means of a patching cord 1301 to jacks such as jacks 1302 and 1303 associated with one of the service observing circuits of Fig. 13. These service observing circuits are connected in multiple to the speed of answer observing trunk circuit shown in Figs. 14 and 15.

The speed of answer observing trunk circuit is connected with the service observing position over two pairs of conductors, constituting two circuits, over one of which signals are transmitted between the service trunk circuit and the service observing position, which may be called the signaling circuit, and over the other of which the circuit under observation is connected to the position, which may be called the observing circuit. At the service observing office the speed of answer service observing trunk appears in a series of distributing relays LOA(23), LOB(23), LOC(23) and the associated relays LO1A(23), LO1B(23) and LO1C(23) in a manner similar to the cord observing trunk previously described.

If one or more positions are available to observe on this type of circuit, relay GB(23) will be released and a circuit will be closed from battery over contact 3 of relay GB(23), conductor 2301, resistance 2302, contacts 1 of relays LO1C(23), LO1B(23) and LO1A(23) and of the intermediate relays, upper winding of relay L(23), contact 5 of relay OS(23), conductor 2303, upper winding of relay PB(14), upper and lower windings of relay ST(14), lower winding of relay PB(14), conductor 2304, contact 4 of relay OS(23), lower winding of relay L(23), contacts 3 of relays LO1A(23), LO1B(23), LO1C(23) and of the intermediate relays, resistance 2305, conductor 2306 to ground at contact 1 of relay GB(23). Relay ST(14) operates in this circuit, closing an obvious operating circuit for relay ST1(14). The direction of current flow in this circuit is such that polarized relay PB(14) cannot operate at this time.

Relay ST1(14) closes a circuit from ground over its contact 7, conductor 1403, contact 1 of relay TC(14) to battery through the winding of relay AB1(14). Relay AB1(14) makes a continuity test of one chain circuit extending through the service observing circuits of Fig. 13. Each of the individual service observing circuits has a seizing relay such as relays A0(13), A4(13) and A99(13) the contacts of which are connected by a plurality of chain circuits. These chain circuits are given a continuity test each time that the service observing trunk circuit is placed in service.

With relay AB1(14) operated, a circuit is closed from battery through resistance 1400, contact 4 of relay AB1(14), conductor 1401, contacts 9 of relays A0(13), A4(13), A99(13) and the intermediate relays, conductor 1304, contact 3 of relay AB1(14), resistance 1402 to ground through the winding of relay AB(14). If this chain circuit is continuous, relay AB(14) operates, closing a locking circuit for relay AB1(14) which may be traced from battery through the winding of relay AB1(14), contact 5 of relay AB1(14), contact 1 of relay AB(14), conductor 1403 to ground at contact 7 of relay ST1(14).

Relay AB(14) closes a circuit which tests two other chain circuits. This circuit may be traced from battery through resistance lamp 1305, contacts 4 of relays A0(13) to A99(13), conductor 1306, contact 1 of relay ST1(14), contact 3 of relay ST3(15), lower winding of relay ST2(15), conductor 1500, contacts 7 of relays A0(13) to A99(13), conductor 1438, contact 4 of relay AB(14) to ground. If these two chain circuits are continuous, relay ST2(13) operates, locking in a circuit from battery through its upper winding and over its contact 4, conductor 1403 to ground at contact 7 of relay ST1(14).

When relay ST1(14) operates, it also closes a circuit from ground over contact 1 of key 1501, conductor 1502, contact 2 of relay ST1(14), conductor 1404, contact 6 of relay ST3(15) to battery through the heater coil of thermal relay P(15). If any one of the above-traced chain circuits is open, relay ST2(15) cannot operate and, after a time interval, relay P(15) closes its contact completing a circuit from ground on conductor 1404 over the contact of relay P(15) to battery through the winding of relay ST3(15). Relay ST3(15) operates and locks over its contact 5 to ground on conductor 1404. With relay ST3(15) operated, the operating circuit of relay ST2(15) is opened and that relay cannot operate. With relay ST2(15) non-operated, relay ST3(15) connects ground over contacts 3 and 2 of key 1501, contacts 7 and 8 of relay ST3(15) and contacts 5 and 6 of relay ST2(15) to an alarm circuit. Relay ST3(15) also closes a circuit from ground over its contact 2 and contact 3 of relay ST2(15) to battery through lamp NC(15) which lights. Key 1501 may be operated to silence the alarm and release relay ST3(15), but lamp NC(15) remains lighted over contact 4 of key 1501.

Relay ST3(15) in operating opens the circuit of thermal relay P(15) permitting that relay to cool and release. Although relay ST3(15) is released by the operation of key 1501, relay P(15) does not reoperate since its circuit is opened at contact 1 of key 1501. Relays ST(14) and ST1(14) remain operated and, if relay AB(14) is operated, relay AB1(14) holds operated to ground on contact 7 of ST1(14).

If relay ST2(15) operates to indicate that the various chain circuits are continuous, it connects ground over its contact 7 to conductor 1503 to close the heater circuits for vacuum tubes TR(14) and S(15). At its contact 2 relay ST2(15) connects —48 volt battery through resistance 1504 over conductor 1505 to ground through resistance 1506 establishing a voltage divider to provide the proper voltage on the cathodes and right grid of tube S(15). At its contact 1 relay ST2(15) connects ground over conductor 1507, contact 2 of relay TC(14), conductor 1405 to battery through the winding of relay TM1(15) causing the latter relay to operate. Relay TM1(15) closes an obvious circuit for operating relay TM2(15). In addition, relay ST2(15) closes circuits from ground over contacts 6 and 7 of relay TC(14), conductors 1406 and 1407, contacts 8 and 9 of relay ST2(15), conductors 1508 and 1509, contacts 5 and 1 of relay CC(14), conductors 1408 and 1409 to battery through the windings of relays BT2(13) and BT1(13). Relays BT1(13) and BT2(13) operate and connect the sleeve of the lower jack of each service observing circuit to the upper winding of the associated B relay preparing the service observing circuits for operation.

Relay TM1(15), when operated as above described, connects ground over its contact 4 and conductor 1510 to the upper windings of relays A0(13) to A99(13). Relay TM2(15) at its contact 3 also connects ground to conductor 1510. The sleeve of the lower jack of a service observing circuit is connected over the patching cord to the lamp of the associated trunk. For example, the sleeve of jack 1303 is connected over cord 1301 and conductor 1203 to lamp LP(12). Therefore, with relay BT1(13) operated, if the trunk is idle, ground is connected through lamp LP(12) over conductor 1203, cord 1301, sleeve of jack 1303, contact of relay BT1(13) to ground through the upper winding of relay B0(13). Similar circuits are closed for the other service observing trunks.

If the trunk circuit of Fig. 12 had been busy when relay BT1(13) was operated, battery connected over conductor 1203 to lamp LP(12) as previously described would be extended over the above-traced circuit to ground through the upper winding of relay B0(13) causing that relay to operate and lock through its two windings and contact 1 to battery on the sleeve of jack 1303 when relay BT1(13) releases. At its contact 2 relay B0(13) opens the circuit of relay A0(13) to prevent it from operating. As long as relays BT1(13) and BT2(13) remain operated the arrival of a call on one of the trunk circuits will cause the associated B relay to operate and lock until the call has been answered.

Whether or not relay ST2(15) operates, thermal relay P(12) will carry out its timing function to operate relay ST3(15). However, if relay ST2(15) has been operated at the time that relay ST3(15) operates no alarm is sounded but a circuit is closed from ground over the normally closed contact of relay PB(14), conductor 1410, contact 1 of relay ST3(15), contact of relay TC1(15), conductor 1511, contacts of relays BT1(13) and BT2(13), conductor 1308 to battery through the winding of relay CC(14). Relay CC(14) operates and locks over its contact 3 and conductor 1511 to ground as above traced. Relay CC(14) at its contacts 1 and 5 disconnects ground on conductors 1508 and 1509 from relays BT1(13) and BT2(13) causing these relays to release and extends ground on conductor 1508 over its contact 4 to conductor 1413, windings of relays C1(13) and C2(13), contacts 4 of relays A99(13) to A0(13) to battery through lamp 1305. Relays C1(13) and C2(13) operate, connecting ground to the lower windings of relays A0(13) to A99(13). The lower windings of relays A0(13) to A99(13) are normally connected over a back contact of the associated ones of relays B0(13) to B99(13) to the sleeves of the corresponding service observing jacks. With a B relay operated the connection between the associated A relay and the jack sleeve is opened.

The speed of answer service observing trunk circuit is also equipped with means for reducing the number of circuits on which observations may be made. Relays AG(14) and BG(14) are operable from the position circuit as will be described hereinafter to control the connection of ground to terminals 1414 to 1417. Relays like relays C1(13) and C2(13) are connected to terminals 1414 to 1417 in accordance with the prearranged plan for reducing the number of circuits to be observed. With relays AG(14) and BG(14) normal, when relay CC(14) operates, ground on conductor 1509 is connected over contact 2 of relay CC(14), contact 1 of relay AG(14) to terminal 1417 and over contact 1 of relay AG(14) and contact 3 of relay BG(14) to terminal 1416. Ground on conductor 1508 is connected over contact 4 of relay CC(14) directly to terminal 1414 and over contact 1 of relay BG(14) to terminal 1415 so that all of the relays such as relays C1(13) and C2(13) will be operated. With relay AG(14) operated ground is removed from terminals 1416 and 1417 while with relay BG(14) operated ground is removed from terminals 1415 and 1416 preventing the operation of the C relays connected to those terminals.

Assume now that the trunk of Fig. 12 is seized at the distant end as previously described, relays L(12) and RS(12) operate, relay RS(12) connecting battery to conductor 1203 to light lamp LP(12). Battery on conductor 1203 also extends over the cord 1301 to the sleeve of jack 1303, contact 2 of relay B0(13) through the lower winding of relay A0(13) to ground at a contact of relay C1(13). Relay A0(13) operates in this circuit and closes a locking circuit for itself from battery through resistance lamp 1305, contact 5 and upper winding of relay A0(13), conductor 1510 to ground at contact 4 of relay TM1(15) and contact 3 of relay TM2(15) and opens the locking circuits for higher numbered relays such as relays A4(13) and A99(13) so that, if simultaneous calls on other trunks cause the operation of higher numbered A relays, these relays cannot lock to the service observing trunk circuit. Relay A0(13) extends the tip conductor 1204, ring conductor 1205 and sleeve conductor 1206 of the trunk over its contacts 1, 2 and 3 to contacts of relay CT0(14). Relay A0(13) also opens the battery supplied to relays C1(13), C2(13), etc., opening the operating circuits for the other A relays so that calls which arrive later cannot operate the associated A relays. In addition, relay A0(13) closes a circuit from ground at its contact 10, conductor 1309 to battery through the winding of relay TC(14). Furthermore relay A0(13) at its contact 8 extends the operating circuit for relay AB(14) to the sleeve of jack 1303 and conductor 1203 so that relay AB(14) is now held operated under the control of the lamp circuit.

Relay TC(14) operates in the above-traced circuit and closes a shunt around the upper winding of relay ST(14) which may be traced from the junction of the two windings of relay ST(14), conductor 1434, contact 1 of relay TM1(15), conductor 1512, contact 4 of relay TC(14) over contact 2 of relay TC2(14) or over contact 1 of relay INT(14) to the other side of the upper winding of relay ST(14). The closure of this shunt circuit reduces the resistance in the signaling circuit thereby operating relay L(23) as a seizure signal.

In a manner similar to that described for the cord observing operation, the operation of relay L(23) connects ground to the windings of relays LOA(23), LOB(23), LOC(23) and to the corresponding relays of other operator positions. Assuming that the intermediate position is bidding for a call in this class at this time, the circuit of relay LOB(23) will be extended over contact 9 of relay LO1B(23), contact of relay S1B(23), conductor 2307, contact 3 of relay PN(35) to battery at the normally closed right contact of key 3505. Relay LOB(23) operates and locks over its contact 4 and conductor 2206 to ground at contact 8 of relay R1(35). At its contact 2 relay LOB(23) extends battery to the winding of relay LO1B(23) operating the latter relay which locks over its contact 6, conductor 2200, contacts 7 of relay LO1B(22) and the intermediate trunk relays, conductor 3507 to battery at contact 7 of relay R1(35). Relay LO1B(23), in operating, opens the operating circuit of relay LOB(23) but that relay is held operated in a circuit from ground on conductor 2206, contact 4, winding and contact 2 of relay LOB(23), contact 6 of relay LO1B(23) to battery as above traced on conductor 3507.

With relays LOB(23) and LO1B(23) operated, the signaling circuit is disconnected from the contacts of group busy relay GB(23) and is extended over contacts 2 and 4 of relay LO1B(23), conductors 2207 and 2208 and thence as traced for the previous observation to battery and ground through the windings of polarized relay KA(27) and marginal relay HB(27). Relay HB(27) operates in this circuit and closes a circuit from ground over conductor 2715 to battery through the winding of relay INT(35) operating the latter relay. Relay INT(35) operates relay TD(35) to hold relay TD2(35) operated after relays PN (35) and TD1(27) release.

Relay LO1B(23) releases relay PN(35) and when relay PN(35) is released ground is connected to conductor 3511 and over contact 8 of relay LO1B(23) to conductor 2312 which is cross-connected to conductor 2521 and over that conductor to battery through the winding of relay MSA(27) in the same manner that conductor 2209 is cross-connected to conductor 2500 and to the winding of relay MCD(27). Relay MSA(27) connects ground to conductors 2701 and 3513 to operate the position busy relay PB(35) and the call-accepted relay CA(28). With relays LOB(23), PB(35) and INT(35) operated a circuit is closed for lighting trunk lamp 2311.

With relay CA(28) operated, the observing circuit is completed extending from battery over contact 2 of relay CA(28), contact 3 of relay CA1(28), lower winding of relay RR(28), conductor 2807, upper right winding of repeating coil 2504, conductor 2505, contact 6 of relay LOB(23), contact 8 of relay OS(23), conductor 2310, upper right winding of repeating coil 1435, contact 10 of relay ST1(14), windings of relay CA(14), upper left winding of repeating coil 1435, conductor 2309, contact 1 of relay OS(23), contact 5 of relay LOB(23), conductor 2214, lower right winding of repeating coil 2504, conductor 2506, upper winding of relay RR(28), contact 2 of relay CA1(28) to ground at contact 1 of relay CA(28).

Relay CA(14) operates in this circuit and closes a circuit from ground over its contact, contact 4 of relay ST1(14), conductor 1437, contact 8 of relay TC(14), conductor 1436 to battery through the winding of relay CA1(15). Relay CA1(15) operates and connects ground over its contact 4 to conductor 1437 to provide a locking circuit for itself. Relay CA1(15) closes a locking circuit for relay TM2(15) which may be traced from battery through the winding of relay TM2(15), contact 2 of relay TM2(15), contact 1 of relay CA1(15), contact 1 of relay ST3(15), conductor 1410 to ground at the contact of relay PB(14). Relay CA1(15) also connects ground to conductor 1500 completing a circuit over contact 6 of relay A0(13) to the winding of relay CT0(14). Relay CT0(14) extends the tip and ring conductors of the trunk to the grids of tube TR(14) and connects the sleeve conductor of the trunk to the left grid of tube S(15). Relay CA1(15) also connects conductor 1512 to conductor 1434 over its contact 2 to maintain the shunt around the upper winding of relay ST(14). At its contact 5 relay CA1(15) connects interrupted ground on conductor 1513 over conductor 1514 to battery through the winding of relay INT(14).

Relay TC(14) at its contact 2 opens the circuit of relay TM1(15) which releases slowly and opens the operating circuit of relay TM2(15) which is also slow to release. The release time of these relays measures an interval during which a call-accepted signal must be received from the service observing position if it is to be effective. If relay TM1(15) releases before relay CA1(15) operates the shunt around the upper winding of relay ST(14) is opened to terminate the seizure signal but relay TM1(15) connects ground over its contact 2 and contact 1 of relay TM2(15) to conductor 1500 to operate relay CTO(14) to avoid delay if the call-accepted signal is received following the release of relay TM1(15) but before relay TM2(15) releases. If relay TM2(15) releases before the call-accepted signal is received, ground is removed from conductors 1500 and 1510 releasing relay CTO(14) and relay A0(13) to prepare the circuit to receive another call.

Relay TC(14) at its contact 5 connects ground to conductor 1418 operating relay TC1(15) which opens the circuit of relay CC(14). Relay CC(14) releases but relays BT1(13) and BT2(13) cannot reoperate since ground has been removed from their operating circuits at contacts 6 and 7 of relay TC(14). The release of relay CC(14) opens the holding circuits for any B relays which have been operated in the service observing circuits of Fig. 13, permitting such relays to release.

When relay CA(28) operates as above described it releases relay CA1(28) to include relays RM(28) and RC(28) in the observing circuit and to operate relay SP(37) as previously described. Relay RC(28) operates and in turn operates relay RPU(28) but relay RPU(28) is ineffective for this class of call.

Tube TR(14) to which the tip and ring conductors of the recording completing trunk are connected serves as a one-way transmission path between the incoming trunk and the service observing position where the left windings of repeating coil 2504 are extended by the operation of relay SP(37) to the service observing operator's headset.

Tube S(15) is arranged in a balanced bridge circuit similar to tube PU(11). With the sleeve conductor of the trunk under observation grounded through the winding of relay S(12), the bridge circuit will be slightly unbalanced in a direction to cause the current flow through the winding of relay PU(15) to be such that the relay holds its contact 1 closed.

When now the toll operator inserts the plug 1207 of a cord at her position in the trunk jack 1208, battery connected to the sleeve of the cord plug will cause the potential on the left grid of tube S(15) to become more negative, reducing or cutting off the current flow through the left half of tube S(15) and reversing the direction of current flow through relay PU(15) so that relay PU(15) closes its contact 2.

As previously described, the insertion of plug 1207 in jack 1208 operates relays S(12) and SC(12) thereby disconnecting battery from conductor 1203. With battery disconnected from conductor 1203, relay AB(14) releases followed by relay AB1(14). Both of these relays are slow to release. When relay AB(14) releases, it closes a shunt around the upper winding of relay CA(14) which may be traced from conductor 1425 connected to the left terminal of the upper winding of relay CA(14), contact 8 of relay ST1(14), conductor 1423, contact 3 of relay AB(14), conductor 1422, contact 5 of relay PU1(15) which has not yet operated, conductor 1516 to the right terminal of the upper winding of relay CA(14). The closure of this shunt permits marginal relay RM(28) to operate completing a circuit from ground over the contact of relay RM(28), conductor 2814, contact 3 of relay MSA(27) through lamp RPU(27) to battery at contact 2 of relay TD1(27). Lamp RPU(27) lights and since the observing circuit is connected through to the observing operator's headset she can hear the toll operator challenge.

When relay AB1(28) releases a short time later it opens its own holding path and closes a substitute shunt around the upper winding of relay CA(14) from conductor 1425, contact 8 of relay ST1(14), conductor 1423, contact 2 of relay INT(14), contact 1 of relay AB1(14), conductor 1422, contact 5 of relay PU1(15) to conductor 1516. With relay AB1(14) released and relay PU(15) operated, a circuit is closed from ground over contact 5 of relay AB(14), conductor 1420, winding of relay PU1(15), contact 3 of relay PU1(15), contact 2 of relay PU(15), contact 7 of relay PU1(15), conductor 1515, contact 6 of relay AB1(14), conductor 1421, contact 3 of relay TC(14) to battery. Relay PU1(15) operates in this circuit closing a locking circuit for itself from battery on conductor 1421, contact 2 and winding of relay PU1(15) to ground on conductor 1420.

With relay PU1(15) operated, the shunt around the upper winding of relay CA(14) extends from conductor 1425 over contact 8 of relay ST1(14), conductor 1423, contact 1 of relay PU1(15), contact 2 of relay PU(15), contact 6 of relay PU1(15) to conductor 1516 so that the shunt and thereby the plug-up signal at the service observing desk are now directly under the control of relay PU(15). Should the toll operator subsequently remove plug 1207 from jack 1208 the potential on the left grid of tube S(15) will return to ground and relay PU(15) will open its contact 2 and close its contact 1. The opening of contact 2 of relay PU(15) opens the shunt around the upper winding of relay CA(14) whereupon relay RM(28) releases extinguishing lamp RPU(27).

Figure 14:
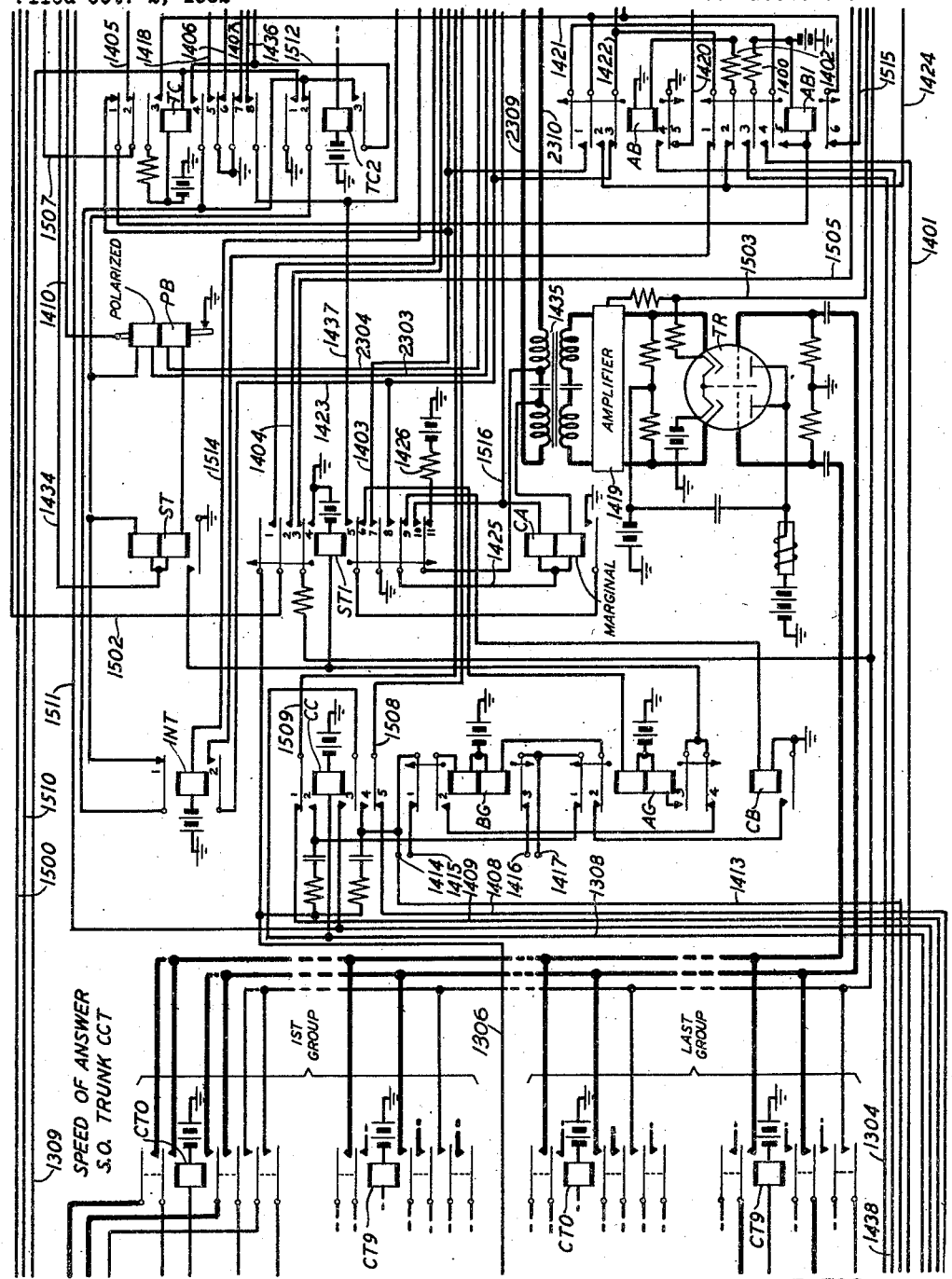
Figure 15:
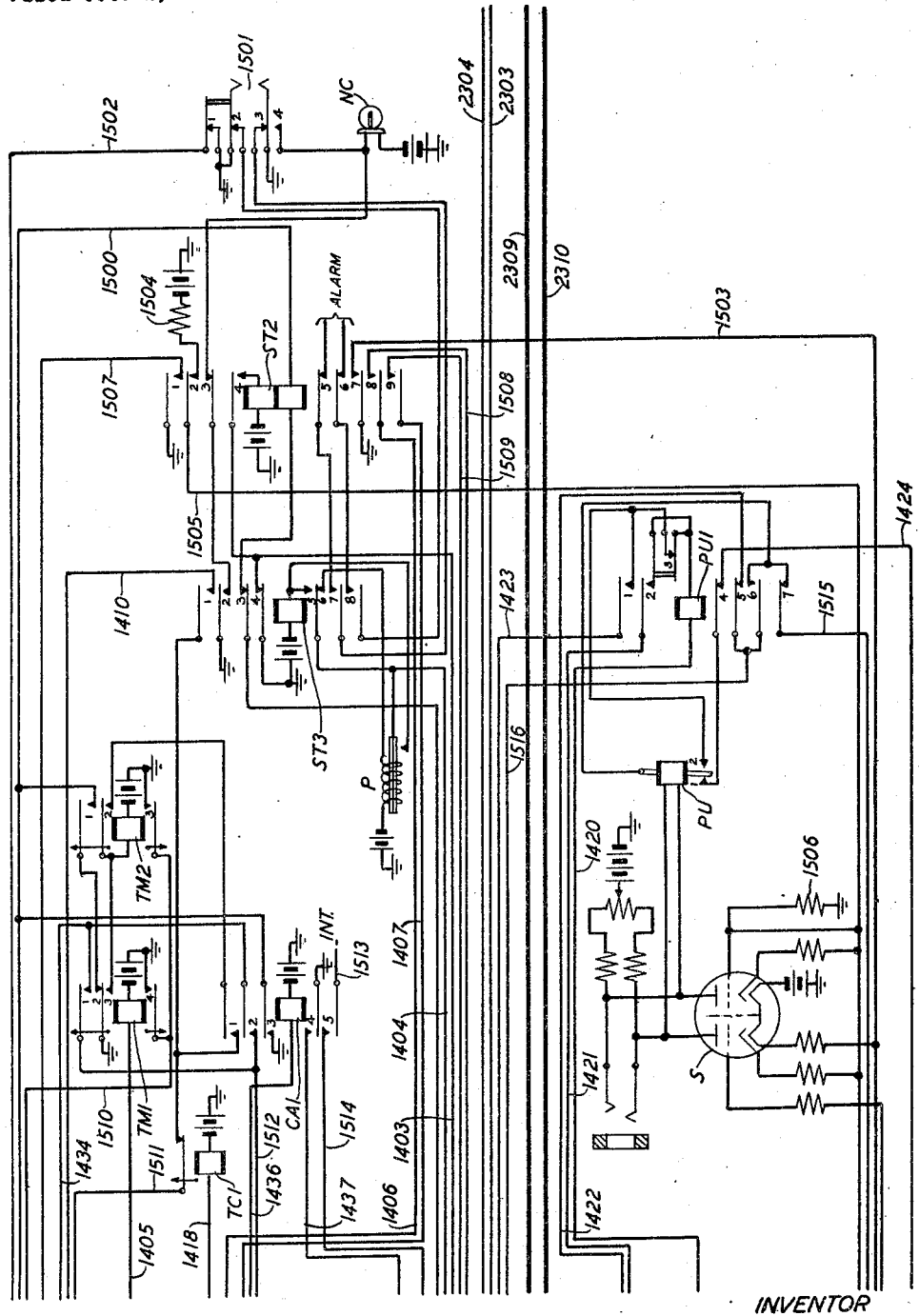

The service observing circuits of Fig. 13 and the service observing trunk of Figs. 14 and 15 are arranged to transmit a distinctive signal to the service observing operator in the event the call is abandoned before the toll operator plugs into the trunk of Fig. 12. The abandonment of the call results in the release of relay L(12) followed by the release of relay RS(12) and the removal of battery from conductor 1203 to extinguish lamp LP(12). As previously described, after the call has been accepted, relay AB(14) is held by battery on conductor 1203 while relay AB1(14) is held under the control of relay AB(14). Therefore the abandonment of the call opens the circuit of relay AB(14) which releases slowly so that it will not release as a result of flashing over the incoming trunk. Relay AB(14) in releasing functions as above to close a shunt around the upper winding of relay CA(14) and cause the lighting of lamp RPU(27) at the observing position. When relay AB1(14) releases a short time later the shunt previously traced by way of the contact of relay INT(14) is closed. Since relays PU(15) and PU1(15) have not been operated, a circuit is closed from ground through the winding of relay AB(14), resistance 1402, contact 2 of relay AB1(14), conductor 1424, contact 4 of relay PU1(15), contact 1 of relay PU(15), contact 7 of relay PU1(15), conductor 1515, contact 6 of relay AB1(14), conductor 1421 to battery over contact 3 of relay TC(14). Relay AB(14) operates in this circuit and opens the original shunt around the upper winding of relay CA(14) leaving the shunt controlled by relay INT(14) so that this shunt is intermittently opened and closed to cause lamp RPU(27) to flash. With relay AB(14) operated, relay AB1(14) is locked under the control of relay ST1(14) and the flashing signal is locked in so that it cannot be affected either by subsequent reseizure of the trunk or by the toll operator plugging into the trunk jack.

The service observing operator observes the lighting of trunk lamp 2311 and the elapsed time before the lighting of lamp RPU(27), making allowance for the constant delay of approximately .5 second introduced by the release of relay AB(14). Having heard the toll operator challenge, the observing operator will ordinarily immediately operate her release key which causes the same operations at the observing position which were described for the cord observing operation including the release of relay LOB(23).

The operation of the release key reverses the connection of battery and ground to the signaling circuit in the manner previously described causing relay PB(14) to operate. With relay PB(14) operated, ground is disconnected from the locking circuit of relay TM2(15) permitting that relay to release. Relay TM2(15), when released, opens the locking circuit of relay A0(13) and the latter relay releases, disconnecting the recording completing trunk from the service observing circuit and releasing relay PU(15). Relay A0(13) opens the circuits of relays CTO(14) and TC(14) causing these relays to release.

The release of relay PU(14) opens the shunt around the upper winding of relay CA(14) causing relay RM(28) to release and extinguish lamp RPU(27). Relay TC(14), in releasing, opens the shunt around the upper winding of relay ST(14) causing relay HB(27) to release and in turn release relay INT(35), relay TD(35) and relay TD2(35). The release of relay TD2(35) releases relay LO1B(23) which opens the signaling circuit and transfers it again to the contacts of relay GB(23), thereby releasing relay PB(14). With relay PB(14) released, the speed-of-answer service observing trunk is ready to receive another call. Relay LO1B(23) also releases relay MSA(27) to remove the speed-of-answer class mark and to restore the position for another observation.

Means is provided whereby the speed-of-answer service observing circuits may be divided into two groups, and the group to which the call under observation belongs, identified to the observing operator. Calls in one group will proceed as above described with the shunt around the upper winding of relay ST(14) maintained steadily. For calls in the other group, the winding of relay TC2(14) will be connected to the conductor corresponding to conductor 1309 in place of the winding of relay TC(14), the latter relay being operated over contact 1 of relay TC2(14). With relay TC2(14) operated, the branch of the previously traced shunt around the upper winding of relay ST(14) extending over contact 2 of relay TC2(14) is opened, leaving the shunt dependent upon contact 1 of relay INT(14). When relay CA1(15) connects interrupted ground to the winding of relay INT(14), the latter relay operates and releases intermittently, opening and closing the shunt around the upper winding of relay ST(14), in turn operating and releasing relay HB(27) which results in the intermittent operation of relay INT(35) to cause trunk lamp 2311 to flash.

In order to operate relay AG(14) or relay BG(14) to reduce the number of service observing circuits on which observation may be made, key OSK(23) is operated when the speed-of-answer observing trunk is idle, operating relay OS(23). Relay OS(23) disconnects conductors 2309 and 2310 of the observing circuit from the contacts of relays LOA(23), LOB(23), etc. and disconnects conductors 2303 and 2304 from the windings of relay L(23). Relay OS(23) connects conductor 2309 over its contacts 2 and 3 to resistance 2313 and contact 2 of key SW(23). Relay OS(23) also connects conductor 2310 over its contacts 7 and 6 to the inner side of contacts 1 and 2 of key SW(23). Since the service observing trunk circuit is idle, conductor 2309 extends through the upper left winding of repeating coil 1415, lower winding of relay CA(14), conductor 1425, contact 9 of relay ST1(14) to ground through the winding of relay CB(14). Conductor 2310 extends through the upper right winding of repeating coil 1415, contact 11 of relay ST1(14), resistance 1426 to battery. If key SW(23) is moved to the right, conductors 2309 and 2310 are connected together and marginal relay CA(14) and relay CB(14) both operate. Relay CA(14) at its contact closes a circuit over contact 6 of relay ST1(14) through the upper winding of relay AG(14) to battery. Relay AG(14) operates and prepares a locking circuit for itself under the control of relay ST(14). Relay CB(14) attempts to close a circuit over its contact and contact 2 of relay AG(14) to the lower winding of relay BG(14) but relay AG(14) in operating opens this circuit and prevents the operation of relay BG(14) at this time. When key OSK(23) has been released relay ST(14) reoperates and closes the locking circuit of relay AG(14), which is sufficiently slow to release to remain operated until its locking circuit is closed.

If key SW(23) is moved to the left, conductors 2309 and 2310 are connected together through resistance 2313. Under this condition marginal relay CA(14) does not operate, but relay CB(14) does operate completing the circuit above traced for relay BG(14) which is now effective, since relay AG(14) has not been operated. If relay AG(14) had previously been operated the release of relay ST(14) by the operation of relay OS(23) opens the locking circuit of relay AG(14). Relay BG(14), when operated, locks in a circuit from battery through its upper winding over contact 4 of relay AG(14) to ground at the contact of relay ST(14), relay BG(14) also being slow to release to hold over until relay ST(14) reoperates.

Intertoll trunk observing

A typical intertoll trunk circuit is shown in Fig. 16. For this type of trunk, signaling between the trunk circuit and the originating office is done by means of a composite signaling circuit. When the trunk is seized at the distant end, ground is connected to conductor 1600 and remains connected thereto throughout the call, except in the case of a rering signal.

Ground on conductor 1600 completes a circuit over contact 8 of relay CO(16) and conductor 1625 to battery through the winding of relay LC(16) and over contact 10 of relay CO(16) or over contact 6 of relay IN(16) to battery through the winding of relay SV(16). Relay SV(16) operates and connects battery through resistance lamp A(16) to conductor 1601 as a stop-dial signal to the originating office to indicate that the equipment is not ready to receive pulses. Relay LC(16) also operates, closing a circuit from ground over its contact 4 to battery through the lower winding of relay IN(16), operating the latter relay which locks over its contact 4 directly to ground. At its contact 5 relay LC(16) connects ground to condenser TMC(16) to remove any residual charge from that condenser.

Relay IN(16) closes a circuit from ground over its contact 5, contact 7 of relay CO(16) to conductor 1602 to initiate the connection of an idle incoming sender with the trunk circuit. Relay IN(16) at its contact 7 connects the winding of relay LC(16) to conductor 1600 so that relay LC(16) remains operated under the control of the originating office after relay CO(16) operates.

When a sender has been attached, ground is connected to conductor 1603 operating relay CO(16) which locks over its contact 6 to ground at contact 5 of relay IN(16). At its contact 7 relay CO(16) opens the previously traced start circuit. At its contact 10, relay CO(16) disconnects the winding of relay SV(16) from conductor 1600. Relay IN(16) at its contact 6 has already disconnected relay SV(16) from conductor 1600, but relay SV(16) is held operated under the control of the attached sender through retard coils 1604 and 1605 and over conductors 1606 and 1607 to ground in the sender.

Relay CO(16) also connects ground over its contact 2 and contact 9 of relay SP(16) to conductor 1608. The connected sender extends this ground to conductor 1609 and the winding of relay SP(16). Relay SP(16) operates in this circuit and at its contact 13 connects incoming conductors 1610 and 1611 together through resistance T(16) and condensers T(16) and R(16). Relay SP(16) connects conductors 1612 and 1613 through condensers T1(16) and R1(16) over contacts 3 and 11 of relay SP(16), condensers T2(16) and R2(16) to conductors 1607 and 1606 leading to the sender to provide a path for the incoming multifrequency pulses. Relay SP(16) also connects outgoing conductors 1614, 1615, 1616 and 1617 over its contacts 7, 14, 5 and 12 to conductors 1618, 1619, 1620 and 1621 to permit the sender to control the outgoing end of the connection.

When the sender is ready to receive pulses, it removes ground from conductors 1606 and 1607 permitting relay SV(16) to release, disconnecting battery from conductor 1601 and again connecting ground thereto as a start-dial signal. Multifrequency pulses are received over conductors 1612 and 1613 which are extended to the sender as above traced.

When the sender has completed its function it releases relay SP(16), which connects conductors 1610, 1611, 1612 and 1613 through condensers T(16), R(16), T1(16) and R1(16), contacts 1, 15, 2 and 10 of relay SP(16) to conductors 1614, 1615, 1616 and 1617 to set up the communication path. Relay SV(16) is now connected to a simplex circuit over contact 9 of relay CO(16) through resistances SV1(16) and SV2(16), retard coils B1(16) and B2(16) and contacts 1 and 15 of relay SP(16) to conductors 1614 and 1615 to receive supervisory signals from the outgoing end of the connection. When the called subscriber answers, ground is received over this simplex circuit operating relay SV(16) to connect battery to conductor 1601 as an off-hook signal. When the subscriber disconnects, ground is removed from the simplex circuit, relay SV(16) releases and substitutes ground for battery on conductor 1601 as an on-hook signal.

If the originating operator rerings, ground will be removed from conductor 1600 for a measured interval releasing relay LC(16) for that interval. With relay LC(16) released, a circuit is closed from ground at contact 3 of relay IN(16) or contact 1 of relay CO(16), contact 2 of relay LC(16), contact 16 of relay SP(16) to battery through the winding of relay IR(16). When relay LC(16) reoperates the circuit of relay IR(16) is opened, but that relay is slow to release, and for the release time of that relay, battery is connected through resistance RB(16), contact 1 of relay LC(16), contact 3 of relay IR(16), retard coil A1(16), contact 10 of relay SP(16) to conductor 1617 and ground is connected over contact 1 of relay CO(16), contact 3 of relay LC(16), resistance RG(16), contact 2 of relay IR(16), retard coil A2(16), contact 2 of relay SP(16) to conductor 1616. The connection of ground and battery to conductors 1616 and 1617 causes the outgoing circuit to ring towards the called end.

When the originating end disconnects, ground is removed from conductor 1600, releasing relay LC(16). Relay LC(16) operates relay IR(16) as previously described. At the same time it disconnects ground from condenser TMC(16) and that condenser charges in a circuit from +130 volt battery, resistance lamp B(16), contact 1 of relay IN(16), contact 6 of relay LC(16), resistance 1622, condenser TMC(16), resistance 1623 to ground. Condenser TMC(16) is connected through resistance 1624 to the control anode of tube TM(16). At the same time, +130 volt battery is connected to the main anode of tube TM(16), the cathode of which is connected to ground through the upper winding of relay IN(16). When the charge on condenser TMC(16) reaches the breakdown potential, the tube TM(16) becomes conducting and current flows through the upper winding of relay IN(16) in a direction to oppose the current flow through the lower winding and causes relay IN(16) to release. The time required for condenser TMC(16) to charge sufficiently to cause tube TM(16) to break down is considerably in excess of that during which relay LC(16) is released in response to the rering signal. When relay IN(16) releases, tube TM(16) is extinguished and relays CO(16) and IR(16) released. Relay SV(16) if operated also releases. The release of relay CO(16) serves to break down the outgoing end of the connection.

If a call is abandoned before relay CO(16) is operated, the release of relay IN(16), as above described, immediately releases the link circuit by which an idle sender is selected. If a call is abandoned after relay CO(16) is operated, that relay is held operated by the sender and when the sender attempts to operate relay SP(16), conductor 1609 will be extended over contact 8 of relay SP(16), contact 4 of relay CO(16) and contact 2 of relay IN(16) to ground, to give the sender an abandoned call signal. If a call is abandoned while the marker is setting up the connection the marker prevents the release of the sender and completes its function, after which the sender releases relays CO(16) and SP(16) to release the outgoing circuit. Until relay CO(16) is released, an attempted reseizure will be ineffective.

Figure 19:
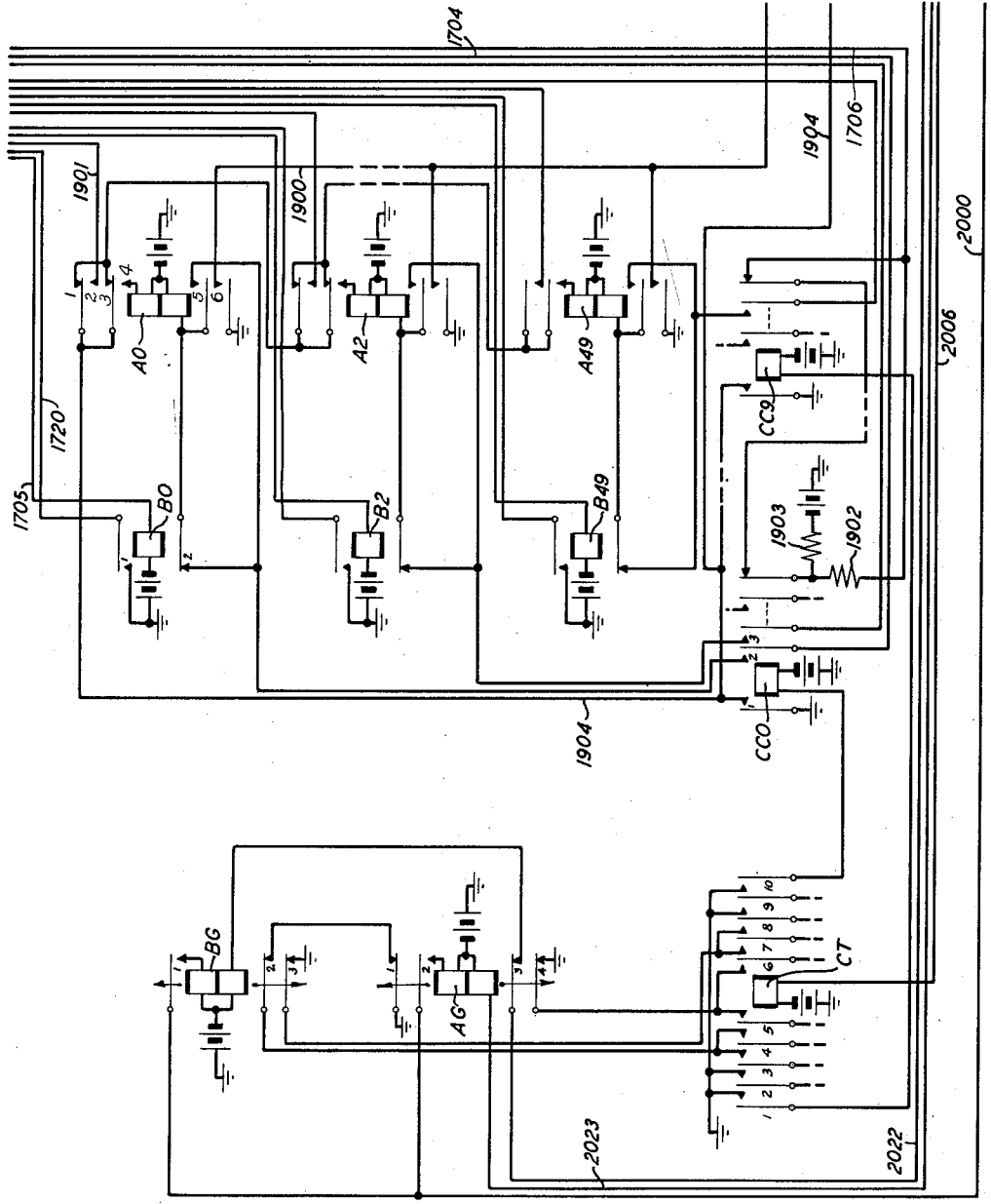

For service observing purposes the incoming conductors of trunk circuits such as the trunk circuit of Fig. 16 are connected to a service observing jack. In practice, the connection of the service observing jack to the telephone conductors may conveniently be made at the patching jack frame but these connections have, for convenience, been shown as direct multiples. The incoming talking conductors 1610 to 1613 are connected to contacts 1 to 4 of jack 1627. Contact 5 of jack 1627 is connected over conductor 1625 to the operating circuit for relay LC(16) and thence as above traced to the incoming signaling conductor 1600. The outgoing signaling conductor 1601 is connected to contact 6 of jack 1627. Contact 7 of jack 1627 is connected over conductor 1626 to contact 3 of relay IN(16) and contact 1 of relay CO(16), and contact 8 of jack 1627 is connected to ground to indicate that this trunk is a trunk over which designations are transmitted by multifrequency pulses. For intertoll trunks adapted for dial type pulsing, no ground would be connected to contact 8. Jack 1627 is connected by means of a multiconductor cord 1628 to the jack of a service observing circuit such as shown in Fig. 19. It will be assumed that cord 1628 is inserted in jack 1629 connected to the first service observing circuit.

Figure 17:
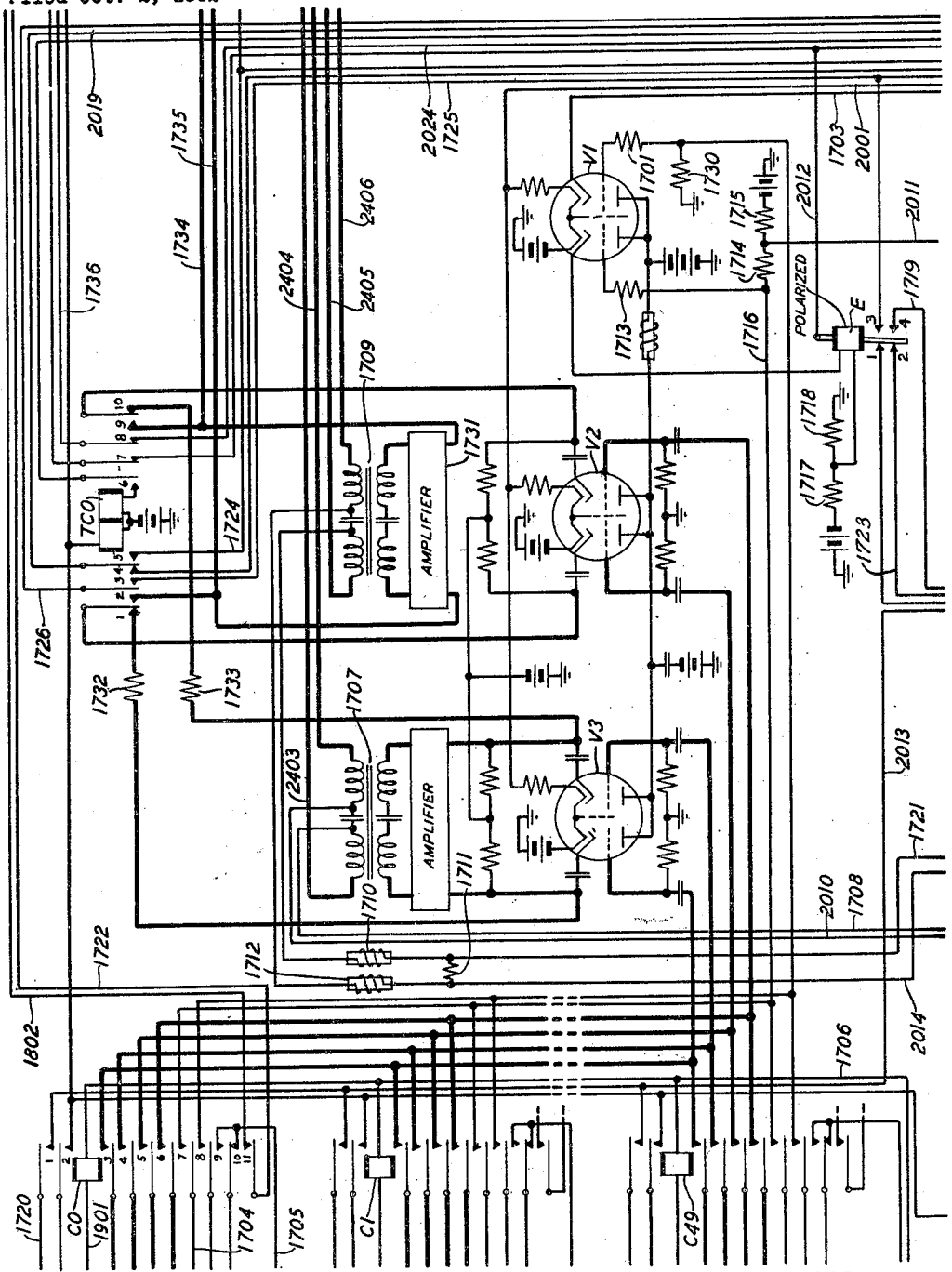
Figure 18:
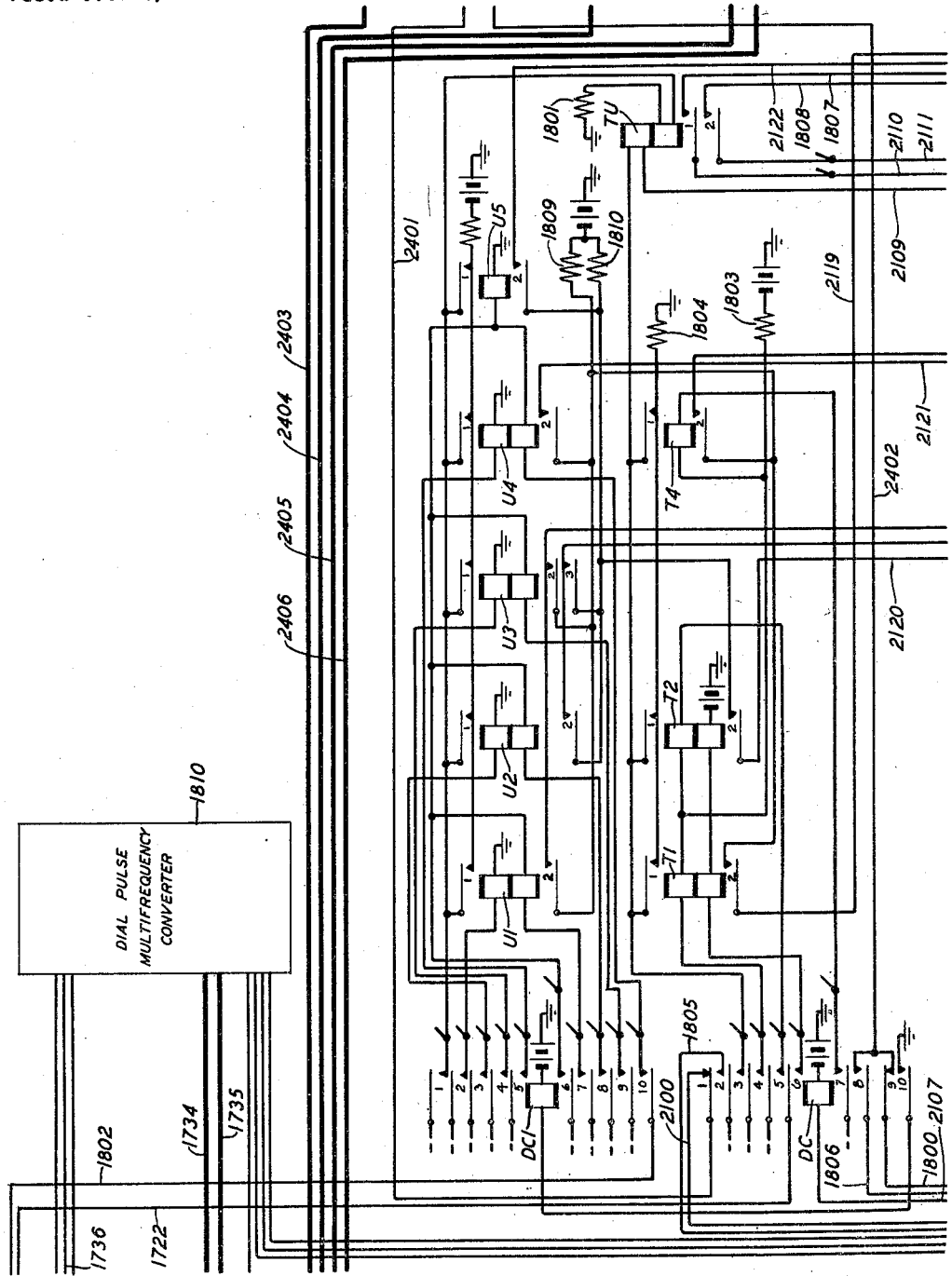
Figure 20:
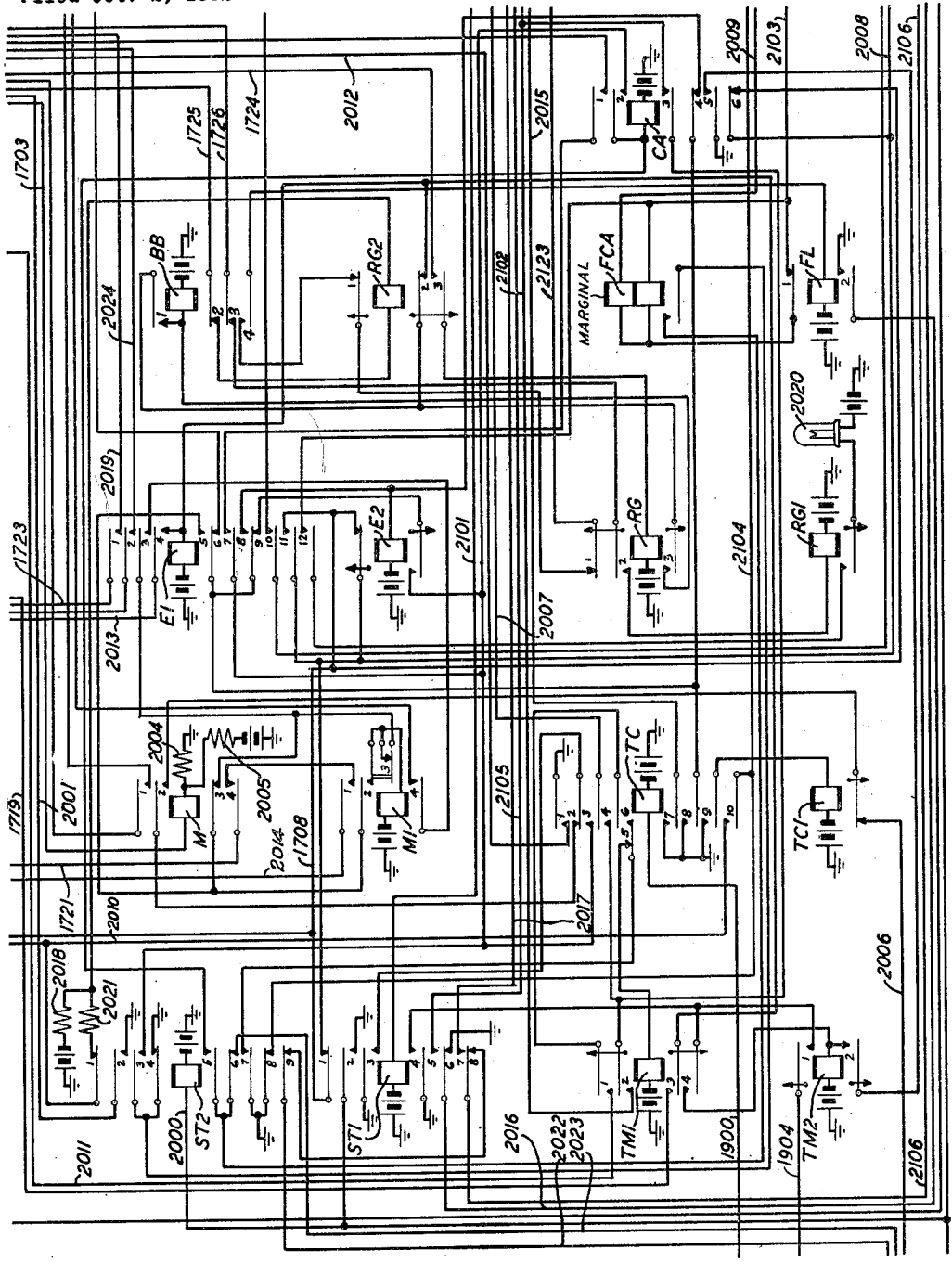

This service observing circuit is one of a plurality of such circuits having access to the intertoll service observing trunk of Figs. 17 and 20. This service observing trunk is connected over three pairs of conductors to the service observing desk where they appear in contacts of relays LOA(24), LOB(24), LOC(24), etc. and relays LO1A(24), LO1B(24), LO1C(24), etc. Conductors 2401 and 2402 are included in the signaling circuit. Conductors 2403 and 2404 are included in a first observing circuit and conductors 2405 and 2406 are included in a second observing circuit.

With one or more of the service observing operators available to observe on this type of circuit, relay GB(24) will not be operated and the signaling circuit may be traced from battery over contact 3 of relay GB(24), conductor 2407, resistance 2408, contacts 1 of relays LO1C(24), LO1B(24), LO1A(24) and the intermediate relays, upper winding of relay L(24), contact 5 of relay OS(24), conductor 2402, contact 9 of relay DC(18), conductor 1800, upper winding of relay PB(18), upper and lower windings of relay ST(21), lower winding of relay PB(21), conductor 2100, contact 1 of relay DC(18), conductor 2401, contact 4 of relay OS(24), lower winding of relay L(24), contacts 3 of relays LO1A(24), LO1B(24), LO1C(24) and the intermediate relays, resistance 2409, conductor 2410 to ground at contact 1 of relay GB(24). Current flow in this circuit is such that relay ST(21) operates but marginal relay L(24) and polarized relay PB(21) cannot operate.

Relay ST(21) closes a circuit from ground over its contact, contact 1 of relay PB(21), conductor 2101 to battery through the winding of relay ST1(20) which operates. Relay ST1(20) at its contact 2 connects ground over conductor 2000 to battery through the winding of relay ST2(20) operating the latter relay. Relay ST2(20) at its contact 2 connects ground to conductor 2001 to energize the heaters of tubes V1(17), V2(17) and V3(17). Relay ST2(20) also closes a circuit from ground over its contact 7, contact 5 of relay TC(20) to battery through the winding of relay TM1(20). Relay TM1(20) operates and closes a circuit from ground over contact 4 of relay ST1(20), contact 4 of relay TM1(20) to battery through the winding of relay TM2(20). Relay TM2(20) also operates.

Tube V1(17) functions as two separate triodes and with battery connected to the right plate and ground connected to the grid through resistances 1730 and 1701 current flows through the right half of tube V1(17) over conductor 1703 to the winding of relay M(20) which is connected to a reduced potential provided by the voltage divider made up of resistances 2004 and 2005. Relay M(20) is therefore normally operated and closes a circuit from ground over contact 3 of relay ST1(20), contact 2 of relay TC(20), contact 2 of relay M(20), contact of relay TC1(20), conductor 2006 to battery through the winding of relay CT(19) which operates. With relay CT(19) operated, ground is connected to the windings of relays CC0(19) and CC9(19), the latter relays preparing circuits by which an incoming call on one of the associated trunk circuits may seize the intertoll service observing trunk.

It may be noted that relay CT(19) also closes direct circuits for other CC relays and closes additional circuits which may or may not be effective according as relays AG(19) and BG(19) are or are not operated.

When now the trunk of Fig. 16 is seized at the distant end, ground is connected to conductor 1600 and as previously traced to conductor 1625 so that ground now extends over contacts 5 of jacks 1627 and 1629, conductor 1704, contact 2 of relay CC0(19), contact 2 of relay B0(19) to battery through the lower winding of relay A0(19). Relay A0(19) operates and locks over its contact 5 to its operating ground, independent of relay B0(19), and also closes a locking circuit for itself from battery through its upper winding and over its contact 4 and conductor 1904 to ground at contact 1 of relays CC0(19), CC9(19), etc. and to ground over contact 1 of relay TM2(20) and contact 4 of relay ST1(20). The locking circuit closed over conductor 1904 is a chain circuit extending over the back contact of unoperated A relays to the operated A relay. Since relay A0(19) occupies the highest position in the chain, relay A0(19) will lock without regard to the other A relays but if relay A49(19) were operated it would lock to its operating ground but would lock over conductor 1904 only if the higher relays in the chain such as relays A2(19) and A0(19) were not operated.

As soon as relay IN(16) operates, ground is connected to conductor 1626 completing a circuit over contact 7 of jacks 1627 and 1629, contact 10 of relay C0(17), conductor 1705 to battery through the winding of relay B0(19). Relay B0(19) operates and opens the operating circuit of relay A0(19). Whenever any of the trunks connected with service observing circuits are busy, the corresponding B relay will be operated so that when relays CC0(19), etc. operate, the associated A relay cannot operate.

Relay A0(19) closes a circuit from ground over its contact 6, conductor 1900 to battery through the winding of relay TC(20). Relay A0(19) also closes a circuit from ground over contact 1 of relay CC0(19), contact 2 of relay A0(19), conductor 1902, winding of relay CO(19), conductor 1706, resistances 1902 and 1903 to battery. Relay TC(20) operates in the above-traced circuit and at its contact 9 closes an obvious circuit for operating relay TC1(20). With relay TM1(20) operated, relay TC(20) also closes a shunt around the lower winding of relay ST(21) which may be traced from conductor 2102 which is connected to the right side of the lower winding of relay ST(21), contact 2 of relay TM1(20), contact 4 of relay TC(20) to conductor 2007 which is connected to the left side of the lower winding of relay ST(21). This increases the current flow in the signaling circuit as the seizure signal to the service observing desk.

In addition, relay TC(20) closes a circuit from ground over its contact 8, contact 4 of relay CA(20) to battery through the winding of relay E2(20) which operates. At its contact 5, relay TC(20) opens the circuit of relay TM1(20) and that relay starts to release and in turn starts the release of relay TM2(20). The sum of the release times of these relays is the time interval during which the call-accepted signal should be received. Relay TC(20) also opens the circuit of relay CT(19) and that relay releases, in turn releasing relays CC0(19), CC9(19), etc. which disconnect the A relays from their associated trunk circuits so that any operated A relays other than relay A0(19) will release, and preventing the subsequent operation of any A relays. Relays CC0(19), etc. disconnect ground from conductor 1904 leaving relay A0(19) locked under the control of relay TM2(20). When relays CC0(19), CC9(19), etc. release, a shunt is closed around resistance 1902 causing relay CO(17) to operate. High resistance 1902 is included in the original circuit of relays CO(17), etc. to prevent the false operation of more than one such relay, during the interval that several A relays may be operated.

With relay CO(17) operated, ground is connected over contact 8 of jacks 1627 and 1629, contact 2 of relay CO(17) to battery through the left winding of relay TC0(17) operating that relay. Relay TC0(17) connects the output conductors of tube V2(17) through amplifier 1731 to the lower windings of repeating coil 1709.

When relay TC(20) closes the shunt around the lower winding of relay ST(21) as a seizure signal, relay L(24) operates, connecting ground to the windings of relays LOA(24), LOB(24), LOC(24), etc. Assuming that the intermediate position is bidding for a call in this class, relay LOB(24) will operate, in turn operating relay LO1B(24) in the manner described for previous calls. With relays LOB(24) and LO1B(24) operated, the signaling circuit is extended over contacts 2 and 4 of relay LO1B(24) to battery and ground through the windings of relays KA(27) and HB(27). Relay HB(27) operates, in turn operating relays INT(35) and TD(35) to hold relay TD2(35) operated. The operation of relay LO1B(24) opens the circuit of relay PN(35) and that relay releases, connecting ground through resistance 3510 and over contact 7 of relay PN(35) to conductor 3511. Relay LO1B(24) extends ground on conductor 3511 to conductor 2412 which is cross-connected to conductor 2522 operating relay MIT(32) to prepare the observing circuit for observing on an intertoll trunk. Relay MIT(32) at its contact 9 connects ground to conductor 2701 operating relay PB(35). At its contact 6 relay MIT(32) grounds conductor 3208, operating relay MF(27). Relay MIT(32) also connects ground over its contact 7 to battery through the winding of relay MK(32) operating the latter relay. With relays PB(35) and MK(32) operated, a circuit is closed from ground at contact 3 of relay LOB(24) through lamp 2413, conductor 2217, contact 1 of relay PB(35), contact 3 of relay BC(35), conductor 3207, contact 6 of relay MK(32), conductor 3519 to battery through resistance 3520. Lamp 2413 lights to identify the service observing trunk to the service observing operator.

Relay MIT(32) also connects ground over its contact 10 to conductor 2800 operating relay CA(28). With relay CA(28) operated the two observing circuits are closed.

The first observing circuit may be traced from ground over contact 6 of relay CA(28), contact 5 of relay CA1(28), conductor 2804, contact 1 of relay SD(32), conductor 3202, upper winding of relay FR(28), conductor 2805, lower right winding of repeating coil 2501, conductor 2503, contact 1 of relay LOB(24), contact 1 of relay OS(24), conductor 2403, upper left winding of repeating coil 1707, conductor 1708, contact 6 of relay CA(20), conductor 2008, lower winding of relay D(21), conductor 2103, contact 1 of relay FL(20), upper winding of relay FCA(20), conductor 2009, upper winding of relay D(21), conductor 2104, contact 10 of relay TC(20), conductor 2010, upper right winding of repeating coil 1707, conductor 2404, contact 8 of relay OS(24), contact 2 of relay LOB(24), conductor 2502, upper right winding of repeating coil 2501, conductor 2803, lower winding of relay FR(28), conductor 3201, contact 3 of relay SD(32), conductor 2802, contact 7 of relay CA1(28), contact 5 of relay CA(28) to battery through resistance 2801.

The second observing circuit may be traced from ground over contact 1 of relay CA(28), contact 2 of relay CA1(28), upper winding of relay RR(28), conductor 2506, lower right winding of repeating coil 2504, conductor 2214, contact 7 of relay LOB(24), conductor 2405, upper left winding of repeating coil 1709, retard coil 1710, resistance 1711, retard coil 1712, upper right winding of repeating coil 1709, conductor 2406, contact 8 of relay LOB(24), conductor 2505, upper right winding of repeating coil 2504, conductor 2807, lower winding of relay RR(28), contact 3 of relay CA1(28), contact 2 of relay CA(28) to battery through resistance 2806. The closure of these observing circuits constitutes a call-accepted signal to the service observing trunk circuit.

Relay MF(27) at its contact 2 connects battery to conductor 2702 and relay MIT(32) at its contact 5 connects ground to conductor 2703 to prepare the multifrequency receiving circuit 2809. Relay MK(32) at its contact 4 connects ground over conductor 3209 to battery through the winding of relay MK1(25), operating the latter relay. Relay MK1(25) reverses the connection between repeating coils 2501 and 2504 and the operator's telephone circuit and inserts pad 2523 in the connection between repeating coil 2504 and the operator's telephone.

When relay CA(28) operates as above described, it opens the circuit of relay CA1(28) and that relay releases slowly to remove the shunt from the windings of relays RM(28), RC(28), FM(28) and FC(28). Since only the upper winding of relay FCA(20) is included in the first observing circuit as above traced, as soon as relay CA1(28) releases, marginal relay FM(28) operates as well as relay FC(28). Relay FC(28) operates relay FPU(28) which extends its operating ground over its contact 5, conductor 2817, contact 2 of relay MIT(32), conductor 3210 through lamp RPU(27) to battery at contact 2 of relay TD1(27) lighting lamp RPU(27) as a signal that the intertoll trunk has been seized. Relay FPU(28) also operates relay HG(26) as described for cord circuit observing. Relay HG(26) locks in a circuit from battery through its winding, conductor 2509, contact 1 of relay MIT(32), conductor 2606 to ground at contact 7 of relay HG(26). Relay HG(26) grounds conductors 2600 to 2605 to prepare for the designation registration and operates relay KP(27). Ground on conductor 2606 also completes a circuit over contact 1 of relay PK(27), conductor 2707, contact 9 of relay MK(32), conductor 2708, contact 8 of relay ST(26), conductor 2650, contact 6 of relay FPU(28), conductor 2811 to battery through the winding of relay PC(25) which operates.

Relay FM(28) closes a circuit from ground over its contact, conductor 2813, contact 10 of relay MK(32) to battery through the winding of relay FM1(32) which operates.

In the intertoll service observing trunk circuit the left grid of tube V1(17) is connected to battery through resistances 1713, 1714 and 1715. The point of junction between resistances 1713 and 1714 is connected over conductor 1716, contact 7 of relay CO(17) to conductor 1704 which is connected as previously traced to the operating circuit of relay LC(16) in the intertoll trunk circuit. The left cathode of tube V1(17) is connected through the winding of polarized relay E(17) to reduced battery potential supplied by a voltage divider made up of resistances 1717 and 1718. The current flow in this circuit is normally in a direction to cause relay E(17) to hold its contacts 1 and 2 closed. When the intertoll trunk is seized followed by the operation of relay TC(20) as above described, ground is connected over contact 7 of relay ST2(20), contact 6 of relay TC(20), contact 1 of relay TM1(20) and conductor 2011 to battery through resistance 1715. This ground increases the current flow through tube V1(17) sufficiently to cause the operation of relay E(17). When relay CO(17) operates, ground on conductor 1625 is extended over contacts 5 of jacks 1627 and 1629, contact 7 of relay CO(17) to the junction between resistances 1713 and 1714 holding relay E(17) operated under the control of the incoming trunk.

When relay E(17) operates, it closes a circuit from ground over contact 1 of relay TC(20), conductor 2012, contact 4 of relay E(17), conductor 1719, contact 3 of relay TM1(20) to battery through the winding of relay E1(20). Relay E1(20) operates and locks over its contact 4, conductor 2013, contact 1 of relay CO(17), conductor 1720 to ground at contact 1 of relay B0(19). Relay E1(20) closes a circuit from ground over contact 8 of relay TC(20), contact 8 of relay E1(20) to battery through the winding of relay E2(20). Therefore, relays E1(20) and E2(20) remain operated after relay TM1(20) releases. Relay E1(20) at its contact 11 closes a supplementary connection between conductor 1708 and the lower winding of relay D(21) so that the first observing circuit remains closed after relay CA(20) operates.

When the first observing circuit is completed at the service observing position as a call-accepted signal, relay FCA(20) operates closing a circuit from battery through the winding of relay CA(20), contact 5 of relay ST2(20), contact of relay FCA(20), contact 3 of relay ST2(20), contact 3 of relay TC(20) to ground at contact 3 of relay ST1(20). Relay CA(20) operates and locks over its contact 2, contact 3 of relay TC(20) to ground at contact 3 of relay ST1(20). With relay CA(20) operated a locking circuit is closed for relay TM2(20) extending from battery through the winding of relay TM2(20) and over its contact 2 to ground at contact 5 of relay CA(20). With relay TM2(20) held operated, the connection between the intertoll trunk and the service observing position is held under the control of the observing position.

As soon as the intertoll trunk was seized, relay SV(16) operated and connected battery to conductor 1601 as previously described. Battery on conductor 1601 is connected over contact 6 of jacks 1627 and 1629, contact 8 of relay CO(17) through resistance 1701 to the right grid of tube V1(17). Battery on this grid decreases the current flow through the right half of tube V1(17) so that relay M(20) releases, closing a circuit from ground over contact 8 of relay TC(20), contact 5 of relay E1(20), contact 3 of relay M(20), contact 3 and winding of relay M1(20) to battery. Relay M1(20) operates in this circuit and locks over its contact 2, contact 5 of relay E1(20)

to ground at contact 8 of relay TC(20), independent of relay M(20).

When the sender is ready to receive pulses, relay SV(16) is released and ground is connected to conductor 1601. The right half of tube V1(17) now becomes conducting and relay M(20) reoperates. With relays M(21) and M1(21) operated, a shunt is closed around resistance 1711 extending over conductor 1721, contact 4 of relay M(20), contact 1 of relay M1(20) and conductor 2014. This shunt increases the current flow in the second observing circuit, permitting relays RC(28) and RM(28) to operate. Relay RC(28) operates relay RPU(28). Relay RM(28) closes a circuit from ground over its contact, conductor 2814, contact 3 of relay MIT(32), conductor 3211, contact 6 of relay ST(26), conductor 2709, contact 9 of relay HG(26), conductor 2608, contact 3 and winding of relay KC(25) to battery. Relay KC(25) operates in this circuit and locks over its contact 4 through resistance 2510 to ground on conductor 2606. With relays PC(25), KC(25) and MK1(25) operated, the left winding of repeating coil 2504 associated with the second observing circuit is connected to the multifrequency receiving circuit 2809. Ground connected to conductor 2814 by relay RM(28) also extends over contact 12 of relay MK1(25) and conductor 2524 to battery through lamp FSV(27) which lights.

Relay KC(25) closes a circuit from ground through lamp SDR(25), conductor 3206, contact 4 of relay PK(27), conductor 2716, contact 2 of relay MK(32), conductor 3203, contact 6 of relay KC(25), resistance 2512, conductor 2513, contact 3 of relay KD(27), conductor 2711 to battery at contact 1 of relay MF(27) to light lamp SDR(25). Relay KC(25) also connects ground over its contact 5, conductor 2525 through the winding of relay KD(27) and resistance 2710 to battery. However, relay KD(27) cannot operate, since battery through resistance 2710 is shunted over contact 2 of relay KD(27), conductor 2709, contact 6 of relay ST(26), conductor 3211, contact 3 of relay MIT(32), conductor 2814 to ground at the contact of relay RM(28).

The registration transmitted by the originating office is received over conductors 1612 and 1613, branches of which are extended over contacts 3 and 4 of jacks 1627 and 1629, contacts 5 and 6 of relay CO(17) to the grids of tube V2(17). Tube V2(17) transmits the multifrequency pulses over the second observing circuit to the multifrequency receiving circuit 2809.

The registration of the designation takes place as described for cord observation. The preliminary KP signal causes the operation of relay KP1(27) and the release of relay KP(27), while the final or start signal causes the operation of relays ST(26) and KD(27) and the release of relay PC(25). The operation of relay KD(27) extinguishes lamp SDR(25). The operation of relay ST(26) lights lamp ST(25) and the release of relay PC(25) disconnects the multifrequency receiving circuit 2809 from the second observing circuit.

Each intertoll observing circuit is given an arbitrary two-digit number from 00 to 49. While a service observation is in process this number is transmitted to the service observing position. The pulsing circuit used for transmitting the number is started under the control of the observing position where the identification receiving circuit is common to a plurality of service observing trunks. When relay MK(32) operates, as previously described, a circuit is closed from ground over contact 7 of relay MK(32), conductor 3212, contact 2 of relay LP(38), conductor 3802, contact 6 of relay IF(32), conductor 3213, contact 4 of relay SH(31), conductor 3100, contact 4 of relay SH(32), conductor 3214, contact 4 of relay SH(33), conductor 3300 to battery through the winding of relay SI(31). It will be understood that this circuit also includes back contacts on the SH relays of the intermediate positions, which are not shown, and therefore is closed only if no other position is using the indicator at the time. Relay SI(31) operates and closes a circuit from ground over its contact 1, conductor 3101, contact 9 of relay R1(35), conductor 3521, contact 5 of relay IF(32), contact 1 of relay SH(32), conductor 3215, contact 3 of relay LP(38), conductor 3803, contact 11 of relay MIT(32) to battery through the winding of relay SH(32). Relay SH(32) operates and locks over a circuit which may be traced from battery through the winding of relay SH(32), contact 11 of relay MIT(32), conductor 3803, contact 3 of relay LP(38), conductor 3215, contact 2 of relay SH(32), conductor 3217, contact 1 of relay LP(38), conductor 3804, contact 3 of relay IF(32), conductor 3218, contact 6 of relay R1(35) to ground at contact 2 of relay PB(35).) When relay INT(35) releases as described hereinafter, relay SH(32) is also locked in a circuit which may be traced from battery through the winding of relay SH(32), contact 6 of relay SH(32), conductor 3216, contact 2 of relay INT(35), conductor 3804, contact 3 of relay IF(32), conductor 3218, contact 6 of relay R1(35) to ground at contact 2 of relay PB(35). Relay SH(32) opens the previously traced circuit for relay SI(31) and that relay releases slowly, completing a circuit from ground over contact 2 of relay SI(31), contact 10 of relay SH(31), contact 6 of relay SD(31), conductor 3102, contact 9 of relay SH(32), conductor 3219, contact 4 of relay LP(38), conductor 3805 to battery through the winding of relay SD(32). Relay SD(32) operates in this circuit. The operating circuit of relay SD(32) also includes back contacts on the SH and SD relays of any positions lying between the position of Fig. 31 and the position of Fig. 32.

Ground connected to conductor 3102 as above traced also extends over contact 8 of relay SH(32), conductor 3220 to battery through the winding of relay SH1(38). Relay SH1(38) operates and locks over its contact 6, conductor 3806, contact 8 of relay MIT(32), contact 1 of relay IF(32), conductor 3221 to ground at contact 5 of relay R1(35). At its contact 1 relay SH1(38) closes an obvious circuit for operating relay SH2(38). At its contact 5 relay SH(32) connects ground to conductor 2700 to hold relay TD2(35) operated. At its contact 7 relay SH(32) opens the operating circuit for relay R1(35) to prevent the operation of the latter relay, if the observing operator attempts to release by operating her key RLS(35), before the observing circuit number has been recorded.

Relay SD(32) transmits the start identification signal to the intertoll service observing trunk circuit and at the same time starts the operation of a timing circuit which will be described hereinafter.

The start identification signal is produced by reversing the connection of battery and ground to the first observing trunk circuit causing relay D(21) to operate. Relay D(21) closes a circuit from ground over contact 7 of relay TC(20), conductor 2015, contact 3 of relay PCO(21), conductor 2105, contact 5 of relay ST1(20), conductor 2016, contact 2 of relay D(21), conductor 2106, contact 7 of relay ST1(20), conductor 2017 to battery through the winding of relay D1(21). Relay D1(21) operates in this circuit and locks over its contact 4, contacts 5 and 3 of relay PCO(21) to ground on conductor 2015. Relay D1(21) at its contact 3 connects ground over conductor 2107 to battery through the winding of relay DC(18) operating the latter relay, which in turn operates relay DC1(18).

Relays DC(18) and DC1(18) close the identification circuit which was prepared by relay CO(17). Assuming for the purpose of illustrating the operation of the pulse transmitting and receiving circuits that the number of the service observing circuit including relay CO(17) is 39, a circuit will be closed from ground, winding of relay U5(18), lower winding of relay U4(18), contact 10 of relay DC1(18), conductor 1802, contact 11 of relay CO(16), conductor 1722, contact 6 of relay DC(18), lower windings of relays T1(18) and T2(18) to battery. Relays T1(18), T2(18), U4(18) and U5(18) operate in this circuit.

The CO relay of each service observing circuit connects together two conductors representing the tens and units digits of the number assigned to that circuit. For a units digit 0 the circuit extends through the lower winding of relay TU(18) to ground through resistance 1801. For units digits from 1 to 4, relays U1(18) to U4(18) are energized through their upper windings while for the digits 6 to 9, these relays are energized through their lower windings in series with the winding of relay U5(18), relay U5(18) being operated alone for the digit 5. With any one of the relays U1(18) to U5(18) operated, battery is connected to the lower winding of relay TU(18) to operate that relay.

For tens digit 0 battery is supplied through resistance 2108 over conductor 2109 and through the upper winding of relay TU(18). For tens digits 1, 2 and 4, relay T1(18), T2(18) and T4(18) are operated alone, while for the tens digit 3 relays T1(18) and T2(18) are operated together over a circuit extending through their lower windings in series. With any of the relays T1(18), T2(18) or T4(18) operated, a circuit is closed through the upper winding of relay TU(18) to ground through resistance 1804.

Figure 21:
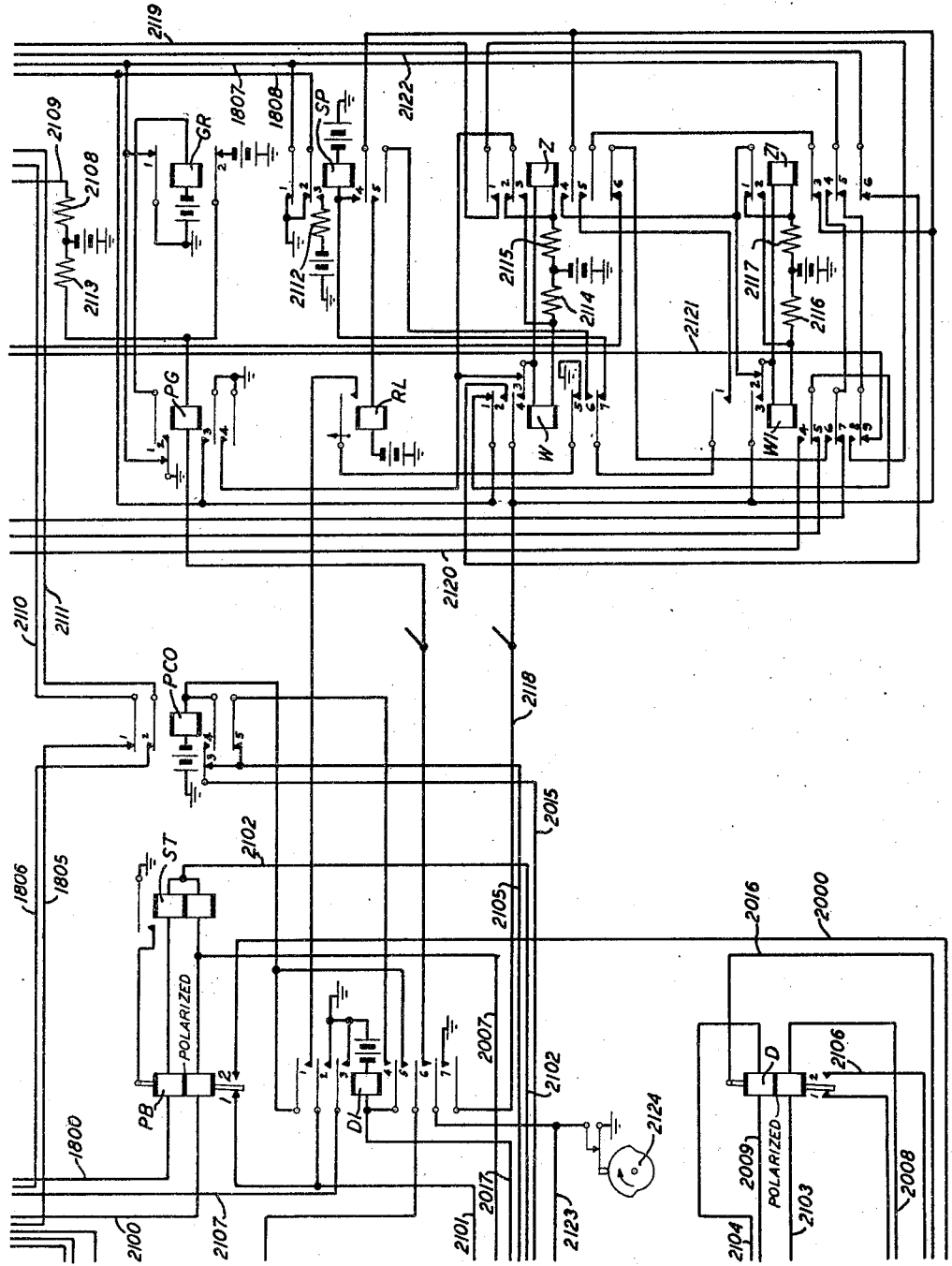

In addition, relay DC(18) disconnects conductors 2401 and 2402 of the signaling circuit from the windings of relays PB(21) and ST(21) and extends them over its contacts 2 and 3, conductors 1805 and 1806, contacts 1 and 2 of relay PCO(21), conductors 2110 and 2111, contacts 1 and 2 of relay TU(18) to the pulse generating relays of Fig. 21. Relay ST(21) releases but relay ST1(20) is held operated over conductor 2101 to ground at contact 2 of relay D1(21).

At the service observing position circuit, the operation of relay SH1(38) disconnects the signaling circuit extending as above traced to conductors 2207 and 2208 from the windings of relays HB(27) and KA(28) and extends them over its contacts 5 and 3, contacts 3 and 1 of relay PF1(38), contacts 5 and 4 of relay SH2(38) to the windings of polarized relays SN+(38) and SN−(38) and marginal relay MG(38). As indicated, relay SN+(38) is polarized to respond to positive pulses, relay SN−(38) is polarized to respond to negative pulses, while relay MG(38) responds to heavy pulses of either polarity. Relay HB(27) releases, in turn releasing relay INT(35), relay SH(32) being held operated in the locking circuit previously traced over contact 2 of relay INT(35) and in turn holding relay TD2(35) operated.

As soon as relay D1(21) operates, ground over the contact of interrupter 2124 is connected over contact 6 of relay D1(21), winding of relay PG(21) to battery over contact 2 of relay GR(21) and to battery through resistance 2113. Therefore, relay PG(21) operates intermittently under the control of interrupter 2124. The code used for transmitting the number of the service observing circuit is one commonly used for transmitting designations to manual operators and is known as the call indicator code. Each digit is represented by four pulses, the first and third of which may be a blank pulse or a light positive pulse and the second and fourth of which may be either a light negative pulse or a heavy negative pulse. For a blank pulse, ground is connected to conductor 1808 and conductor 1807 is disconnected. For a light positive pulse ground is connected to conductor 1808 and conductor 1807 is connected to battery through high resistance 1809. For a light negative pulse ground is connected to conductor 1807 and conductor 1808 is connected to battery through high resistance 2112. For a heavy negative pulse ground is connected to conductor 1807 and battery through low resistance 1810 is connected to conductor 1808 in parallel with high resistance 2112. The following table includes the code for the various digits in terms of light and heavy pulses:

| Digit | Identification Relays Operated | | Pulse No. | | | |
|---|---|---|---|---|---|---|
| | Tens | Units | 1 | 2 | 3 | 4 |
| 0 | None | None | | L− | | L− |
| 1 | T1 | U1 | L+ | L− | | L− |
| 2 | T2 | U2 | | H− | | L− |
| 3 | T1+T2 | U3 | L+ | H− | | L− |
| 4 | T4 | U4 | | L− | L+ | L− |
| 5 | | U5 | | L− | | H− |
| 6 | | U1+U5 | L+ | L− | | H− |
| 7 | | U2+U5 | | H− | | H− |
| 8 | | U3+U5 | L+ | H− | | H− |
| 9 | | U4+U5 | | L− | L+ | H− |

Between each two pulses, ground is connected to both conductors 1807 and 1808 to discharge the pulsing circuit and prevent a false operation at the receiving end due to surges. Before relay PG(21) operates for the first time, conductor 1807 is connected to ground over contact 1 of relay GR(21), contact 1 of relay PG(21) and contact 1 of relay SP(21), while conductor 1808 is connected to ground over contact 2 of relay SP(21). Whenever relay PG(21) operates it closes an obvious circuit for operating relay GR(21).

When relay PG(21) operates for the first time, marking the beginning of the first pulse period, it closes a circuit from ground over its contact 4, contact 3 and winding of relay W(21) to battery through resistance 2114. Relay W(21) operates and locks over its contact 4 and conductor 2118 to ground at contact 7 of relay D1(21), at the same time closing a circuit from battery through resistance 2115, winding of relay Z(21), contact 4 of relay W(21) to ground on conductor 2118. Relay Z(21) cannot operate at this time since ground over contact 4 of relay PG(21) is connected over contact 2 of relay Z(21) to resistance 2115 in shunt with the winding of the latter relay.

When relay PG(21) releases at the beginning of the second pulse period, relay Z(21) operates, closing a circuit from battery through resistance 2116, winding and contact 2 of relay W1(21), contact 4 of relay Z(21) to ground on conductor 2118. Relay W1(21) operates and locks over its contact 3 to ground on conductor 2118 and closes a circuit from battery through resistance 2117, winding of relay Z1(21), contact 3 of relay W1(21) to ground on conductor 2118. Relay Z1(21) does not operate at this time since the operating ground for relay W1(21) is extended over contact 1 of relay Z1(21) to battery through resistance 2117 in shunt with the winding of relay Z1(21).

When relay PG(21) operates at the beginning of the third pulse period, ground is connected over contact 4 of relay PG(21) and contact 3 of relay Z(21) to battery through resistance 2114 in shunt with the winding of relay W(21) and relay W(21) releases. Relay Z(21) is held operated over contact 3 of relay W(21) to ground at contact 4 of relay PG(21).

When relay PG(21) releases at the beginning of the fourth pulse period the holding circuit of relay Z(21) is opened and that relay releases. When relay Z(21) releases, the shunt around the winding of relay Z1(21) is opened and that relay operates. When relay PG(21) operates and releases at the beginning of the next four pulse periods, relays W(21) and Z(21) are operated and released as above described. When relay Z(21) operates at the beginning of the sixth pulse period, ground on conductor 2118 is connected over contact 4 of relay Z(21) and contact 2 of relay Z1(21) to battery through resistance 2116 in shunt with the winding of relay W1(21) and relay W1(21) releases but relay Z1(21) is held operated in a circuit from battery through resistance 2117, winding of relay Z1(21), contact 2 of relay W1(21), contact 4 of relay Z(21) to ground on conductor 2118.

When relay Z(21) releases at the beginning of the eighth pulse period, the circuit for relay Z1(21) is opened and relay Z1(21) also releases, restoring the pulsing relays to normal. During the next four pulse periods the operations of the first four pulse periods are repeated.

During the first two pulse periods, ground is connected to conductors 1807 and 1808 over contacts 1 and 2 of relay SP(21). This provides a time interval to insure that the observing position is ready to receive pulses before the first pulse is transmitted and avoids a very short first pulse in case the interrupter is near the end of its closed cycle when relay D1(21) operates.

At the beginning of the third pulse period relay SP(21) operates in a circuit from battery through its winding, contact 7 of relay W(21), contact 1 of relay W1(21), contact 5 of relay Z(21), contact 3 of relay Z1(21) to ground on conductor 2118. Relay SP(21) locks over its contact 4 directly to conductor 2118 and therefore remains operated throughout the pulse transmission. With relay SP(21) operated, battery through high resistance 2112 is connected over its contact 3 to conductor 1808.

With tens relays T1(18) and T2(18) operated, during the third pulse period, conductor 1807 is extended over contact 5 of relay Z1(21), contact 8 of relay W1(21), contact 1 of relay Z(21), conductor 2119, contact 2 of relay T1(18) to battery through high resistance 1809 and ground is connected over contact 3 of relay PG(21) to conductor 1808 in shunt with the battery through resistance 2112 resulting in a light positive pulse.

During the fourth pulse period ground is connected to conductor 1807 over contacts 1 of relays PG(21) and GR(21). The shunt is removed from battery through resistance 2112 and conductor 1808 is also extended over contact 1 of relay W(21), contact 4 of relay W1(21), conductor 2120, contact 2 of relay T2(18) to battery through low resistance 1810 resulting in a heavy negative pulse. During the fifth pulse period conductor 1807 is left disconnected and conductor 1808 is connected to ground at contact 3 of relay PG(21) resulting in a blank pulse. During the sixth pulse period conductor 1807 is connected to ground over contacts 1 of relays PG(21) and GR(21) and ground is disconnected from conductor 1808 leaving it connected to battery through high resistance 1212 resulting in a light negative pulse. This sixth pulse period ends transmission of the tens digit.

During the seventh and eighth pulse periods a blank pulse and a light negative pulse are transmitted as above described. During the ninth pulse period conductor 1807 is connected over contact 5 of relay Z1(21), contact 9 of relay W1(21), conductor 2121, contact 2 of relay U4(18) to battery through high resistance 1809, while conductor 1808 is connected to ground at contact 3 of relay PG(21) resulting in the transmission of a light positive pulse. During the tenth pulse period conductor 1807 is connected to ground at contacts 1 of relays PG(21) and GR(21) and conductor 1808 is connected to battery through high resistance 2112 and is also extended over contact 2 of relay W(21), contact 6 of relay Z1(21), conductor 2122, contact 2 of relay U5(18) to battery through low resistance 1810 resulting in a heavy negative pulse.

During the tenth pulse period a circuit is also closed from battery through the winding of relay RL(21), contact 5 of relay SP(21), contact 6 of relay W(21), contact 1 of relay W1(21), contact 5 of relay Z(21), contact 3 of relay Z1(21) to ground on conductor 2118. Relay RL(21) operates in this circuit and, when relay W(21) releases at the beginning of the eleventh pulse period, a circuit is closed from ground over contact 5 of relay W(21), contact of relay RL(21), contact 1 of relay D1(21) to battery through the winding of relay PCO(21). Relay PCO(21) operates in this circuit locking over its contact 4 and conductor 2015 to ground at contact 7 of relay TC(20). The operation of relay PCO(21) marks the end of the pulsing and disconnects the signaling circuit from the pulsing relays.

To recapitulate, as the result of the foregoing operations, the following series of pulses are sent out, light positive pulse, heavy negative pulse, blank pulse, light negative pulse, blank pulse, light negative pulse, light positive pulse and heavy negative pulse. At the receiving circuit of Fig. 38 the following relays are operated in the corresponding eight pulse periods as a result of these pulses:

| Pulse Period | Relay Operated |
| --- | --- |
| 1 | SN+(38). |
| 2 | SN−(38), MG(38). |
| 3 | None. |
| 4 | SN−(38). |
| 5 | None. |
| 6 | SN−(38). |
| 7 | SN+(38). |
| 8 | SN−(38), MG(38). |

The operation of relay SN+(38) in the first pulse period closes a circuit from ground at contact 6 of relay SH2(38), conductor 3807, contact of relay SN+(38), contact 1 of relay W(38), contact 3 of relay T(38), conductor 3808 to battery through the right winding of relay T1(39). Relay T1(39) operates and locks through its left winding and over its contact 1 to ground on conductor 3807.

The operation of relay MG(38) in the second pulse period closes a circuit from ground on conductor 3807, contact of relay MG(38), contact 1 of relay Z(38), contact 1 of relay TT(38), conductor 3809 to battery through the right winding of relay T2(39). Relay T2(39) operates and locks to ground on conductor 3807.

The operation of relay SN−(38) in this same pulse period closes a circuit from ground on conductor 3807 over the contact of relay SN−(38), contact 3 and the winding of relay W(38) to battery through resistance 3810. Relay W(38) operates and locks over its contact 4 to conductor 3807, at the same time closing a circuit from battery through resistance 3811 through the winding of relay Z(38), contact 4 of relay W(38) to ground on conductor 3807. Relay Z(38) does not operate at this time, since ground is connected over the contact of relay SN−(38) and contact 5 of relay Z(38) to battery through resistance 3811 in shunt of the winding of relay Z(38). At the end of the pulse period, when relay SN(38) releases, relay Z(38) operates. With relay Z(38) operated, a circuit is closed from ground on conductor 3807, contact 3 of relay Z(38), contact 3 of relay TT(38) to battery through the winding of relay T(38). Relay T(38) operates and locks in a circuit from battery through the winding of relay T(38), winding of relay TT(38) contact 5 of relay T(38) to ground on conductor 3807. Relay TT(38) cannot operate at this time being shunted by the operating circuit for relay T(38).

When relay SN−(38) is again operated in the fourth pulse period, ground on conductor 3807 is connected over the contact of relay SN−(38) and contact 4 of relay Z(38) to battery through resistance 3810 in shunt of the winding of the relay W(38) causing relay W(38) to release. With relay W(38) released, relay Z(38) is held operated over contact 3 of relay W(38) and the contact of relay SN−(38). At the end of the pulse period relay SN−(38) is released, in turn releasing relay Z(38). When relay Z(38) releases the operating circuit for relay T(38) is opened and relay TT(38) operates in the locking circuit of relay T(38).

When relay SN−(38) is again operated in the sixth pulse period relay W(38) is again operated and at the end of that period relay Z(38) also operates. The operation of relay Z(38) at this time closes a circuit from ground on conductor 3807, contact 3 of relay Z(38), contact 4 of relay TT(38) to battery through the winding of relay U(38). Relay U(38) operates and closes a locking circuit for itself from battery through the winding of relay U(38), contact 3 of relay SH2(38), winding of relay PF1(38), contact 1 of relay SH2(38), contact 1 of relay P(38) to ground at contact 2 of relay SH2(38). Relay PF1(38) cannot operate at this time being shunted by the operating circuit for relay P(38).

When relay SN+(38) operates in the seventh pulse period a circuit is closed from ground on conductor 3807, contact of relay SN+(38), contact 2 of relay W(38), contact 6 of relay TT(38), conductor 3812 through the right winding of relay U4(39) to battery. Relay U4(39) operates and locks to ground on conductor 3807.

When relay MG(38) is operated in the eighth pulse period it closes a circuit from ground on conductor 3807, contact of relay MG(38), contact 2 of relay Z(38), contact 8 of relay TT(38), conductor 3813 to battery through the right winding of relay U5(39). Relay U5(39) operates and locks to conductor 3807.

The operation of relay SN—(38) in the eighth pulse period causes the release of relay W(38) as before, followed at the end of the period by the release of relay Z(38). With relay Z(38) released the operating circuit for relay U(38) is opened and relay PF1(38) operates.

Relay PF1(38) closes a circuit from ground over its contact 5, contact 8 of relay SH1(38) to battery through the winding of relay LP(38). Relay LP(38) connects ground to conductor 3814 completing a circuit over contact 2 of relay T2(39), contact 7 of relay T1(39), contact 4 of relay T5(39), conductor 3903 to battery through lamp 3913 which lights. A circuit is closed from ground on conductor 3814 over contact 3 of relay U2(39), contact 3 of relay U5(39), contact 2 of relay U4(39), conductor 3929 to battery through lamp 3939 which lights. The lighting of lamps 3913 and 3939 indicates to the service observing operator that she has been connected with the service observing circuit No. 39.

With relay PF1(38) operated, the signaling circuit conductors 2207 and 2208 are connected over contacts 5 and 3 of relay SH1(38) and contacts 4 and 2 of relay PF1(38) to conductors 3800 and 3801 so that relays HB(27) and KA(27) are again included in the signaling circuit.

Relay LP(38) opens the operating circuits for relays SH(32) and SD(32). Relay SD(32) immediately releases to restore the connection of battery and ground to the first observing circuit to its original condition and stops the timing operation. Other service observing positions may now proceed with identification if necessary.

When relay PCO(21) operates, as above described, at the end of the identification, the locking circuit of relay D1(21) is opened and when the polarity of the first observing circuit is restored relay D(21) releases opening the circuit of relay D1(21). Relay D1(21) thereupon releases, in turn releasing relays DC(18) and DC1(18). With relay DC(18) released, the signaling circuit is reconnected with the windings of relays PB(21) and ST(21).

The reclosure of the signaling circuit causes relay HB(27) to reoperate, in turn reoperating relay INT(35) and relay INT(35) opens the locking circuit of relay SH(32) permitting that relay to release. With relay SH(32) released, the operator may operate her release key RLS(35) operating relays R(35) and R1(35) as previously described. Relay R1(35) performs the functions described for release following cord circuit observation and, in addition, opens the locking circuit for relay SH1(38) which in turn releases relays SH2(38) and LP(38) thereby releasing the identification circuit. Relay R1(35) also opens the operating circuit for relay SH(32) so that this relay cannot operate after the release key has been operated. As previously described, relay R1(35) causes relay LOB(24) to release opening the observing circuits and permitting relays FC(28), FPU(28), FM(28) and FM1(32) to release. Relay HG(26) does not release since it is locked under the control of relay MIT(32). Relay FPU(28) extinguishes lamp RPU(27). With relay HG(26) held operated, a circuit is closed from ground over contact 3 of relay FPU(28), conductor 2818, contact 8 of relay HG(26), conductor 2641, contact 12 of relay MIT(22), conductor 3227 to battery through the winding of relay CA1(28) which operates. Relay CA1(28) recloses the shunt around the windings of relays RM(28) and RC(28) and around the windings of relays FM(28) and FC(28). At its contact 4 relay CA1(28) also opens the circuit of relay SP(37) which releases and disconnects the operator's telephone from the observing circuits.

When relay R1(35) reverses the connection of battery and ground to the signaling circuit, relay PB(21) operates releasing relay ST1(20). Relay ST2(20) is held operated in a circuit from ground over the contact of relay ST(21), contact 2 of relay PB(21), conductor 2000 to battery through the winding of relay ST2(20). Relay ST1(20) opens the locking circuit of relay CA(20) and that relay releases, opening the locking circuit of relay TM2(20) and relay TM2(20) releases slowly. Relay ST1(20) also opens the locking circuit for relay A0(19) and that relay releases followed by relays CO(17), TC(20) and TC1(20). With relay CO(17) released, relays E(17) and E1(20) release and relay M(20) is permitted to reoperate. The locking circuit of relay TC0(17) is also opened and that relay releases.

With relay TC(20) released, the shunt is opened around the lower winding of relay ST(21) and the resistance in the signaling circuit is increased so that relay HB(27) releases, in turn releasing relay TD2(35). Relay TD2(35) opens the locking circuit of relay LO1B(24) disconnecting the signaling circuit from the windings of relays HB(27) and KA(27) and again connecting them to battery and ground at back contacts of relay GB(24). With relay LO1B(24) released, trunk lamp 2413 is extinguished and relay MIT(32) releases, in turn releasing relays MK(32), HG(26), MF(27), PB(35), CA(28) and CA1(28). Relay MK(32) releases relay MK1(25) which restores the transmission circuits over the first and second observing circuits to normal. With relay PB(35) released, relays R(35) and R1(35) also release and relay PN(35) reoperates to request a new call.

In the intertoll service observing trunk circuit the restoration of the signaling circuit to its original condition releases relay PB(21) and relay ST1(20) reoperates. When relay TC1(20) is released, relay CT(19) and relays CC0(19), CC(19), etc. reoperate to select another intertoll trunk for observation.

For a normal intertoll call the sequence of lighting the lamps at the service observing position is as follows:

Trunk lamp 2413 lighted
Lamp RPU(27) lighted
Lamp FSV(27) lighted
Lamp SDR(25) lighted
Line designation lamps lighted
Lamp SDR(25) extinguished
Trunk identification lamps (may light at any time during observation)

*Call not accepted*

It will be remembered that when the intertoll service observing trunk is idle and there are operators available to observe on intertoll trunk calls, relays ST(21), ST1(20), ST2(20), TM1(20) and TM2(20) are operated. When relay A0(19) operated, relay TC(20) operated opening the circuit of relay TM1(20) which releases slowly. When relay TM1(20) releases, the operating circuit for relay TM2(20) is opened and that relay starts to release. Relay TM1(20) also opens the shunt around the lower winding of relay ST(21) to release relay L(24) and thereby cancel the seizure signal. If several calls reach the service observing desk at the same time there may be sufficient delay in connecting the trunk shown with an idle service observing position and returning the call-accepted signal to permit relay TM2(20) to release. If relay TM2(20) releases, the locking circuit for relay A0(19) is opened and that relay releases, in turn releasing relay TC(20) followed after an interval by a slow-to-release relay TC1(20). Relay B0(19) will remain operated under the control of the intertoll trunk so that relay A0(19) cannot reoperate. When relay TC1(20) releases, relay CT(19) and the CC relays of Fig. 19 reoperate so that a call on another intertoll trunk may seize the intertoll service observing trunk.

*Ringing forward*

If the originating operator rings forward while the service observing position is connected with the intertoll trunk of Fig. 16, ground will be removed from conductor 1600 for an interval of 50 to 100 milliseconds, resulting in a ring-forward signal as previously described. The removal of ground from conductor 1600 and thereby from conductor 1625 causes relay E(17) to release for a like interval. When relay E(17) operated, a circuit was closed from ground over contact 1 of relay TC(20), conductor 2012, contact 3 of relay E(17), conductor 1725, contact 2 of relay BB(20), winding of relay RG2(20) to battery through resistance 2018. Therefore, when relay E(17) releases, a circuit is closed from ground on conductor 2012, contact 2 of relay E(17), conductor 1723, contact 1 of relay E1(20), conductor 2019, contact 5 of relay TC0(17), conductor 1724, contact 3 of relay RG2(20) to battery through the winding of relay RG(20). At the end of the ringing signal, relay E(17) reoperates, opening the circuit of relay RG(20) but relay RG(20) is slow to release and during the release time of that relay a circuit is closed from ground on conductor 2012, contact 3 of relay E(17), condutor 1725, contact 3 of relay TC0(17), conductor 1726, contact 3 of relay BB(20), contact 2 of relay RG(20) to battery through the winding of relay RG1(20). Relay RG1(20) operates and connects +130 volt battery through resistance lamp 2020, contact of relay RG1(20), contact 12 of relay E1(20) to conductor 2103 and over contact 1 of relay FL(20) and through the upper winding of relay FCA(20) to conductor 2009.

At the service observing position the closure of this circuit causes the operation of differential relay FR(28). Relay FR(28) closes a circuit from battery through the winding of relay FR1(32), contact 4 of relay MIT(32), conductor 2815, contact of relay FR(28), contact 6 of relay CA1(28) to ground at contact 6 of relay CA(28). Relay FR1(32) operates and closes a circuit from ground over contacts 2 and 3 of relay FM1(32), contact of relay FR1(32), conductor 3225, lamp RSV(27) to battery at contact 2 of relay TD1(27). Lamp RSV(27) lights at this time. Relay FR1(32) is slow to release and continues to hold lamp RSV(27) lighted for a time after relay FR(28) releases.

*Disconnection of intertoll trunk*

When the originating operator disconnects the intertoll trunk, ground will be removed from conductor 1600 causing the release of relay E(17). During the release timing operation previously described, relay IN(16) continues to ground conductor 1626 holding relay B0(19) and E1(20) operated. The release of relay E(17) operates relay RG(20) and opens the circuit of relay RG2(20). If the disconnection occurs before a sender has been attached to the trunk, relay CO(16) will not have operated and when relay IN(16) releases, ground will be disconnected from conductor 1626 releasing relays B0(19) and E1(20). With relay E1(20) released, the circuit of relay E2(20) is opened and that relay starts to release. Relay E1(20) at its contact 11 opens the first observing circuit causing relays FM(28) and FC(28) to release. Relay FM(28), in turn, releases relay FM1(32) which opens the circuit of lamp RSV(27) extinguishing that lamp. Relay FC(28) opens the circuit for lamp RPU(27) and the circuit of relay FPU(28). Relay FPU(28) is somewhat slow to release and during its release time closes a circuit from battery through the winding of relay CA1(28), conductor 3227, contact 12 of relay MIT(32), conductor 2641, contact 8 of relay HG(26), conductor 2818, contact 4 of relay FPU(28) to ground at contact 1 of relay FC(28) operating relay CA1(28). As soon as relay FPU(28) releases it connects ground to conductor 2818 to hold relay CA1(28) operated. With relay CA1(28) operated, the windings of relays FM(28) and FC(28) are shunted as previously described and reclosure of the first observing circuit by the release of relay E2(20) is ineffective at the service observing operator's position. The darkening of lamps RPU(27) and RSV(27) indicates to the service observing operator that the call has been abandoned and that she may proceed to release her position in the manner previously described.

*Stuck sender*

If a sender has been attached, but cannot release so that the originating toll operator disconnects in response to a stuck sender signal, relay CO(16) will be held operated by the sender and ground will not be removed from conductor 1626. Relay E(17) releases as previously described operating relay RG(20) and opening the circuit of relay RG2(20). When relay RG2(20) releases, the circuit of relay RG(20) is opened but that relay releases slowly and during its release time, a circuit is closed from battery through the winding of relay BB(20), contact 3 of relay RG(20), contact 2 of relay RG2(20), contact 4 of relay E1(20), conductor 2013, contact 1 of relay CO(17), conductor 1720 to ground at the contact of relay B0(19). Relay BB(20) operates and locks over its contact 1, contact 2 of relay RG2(20) and thence as traced over its operating circuit to ground at the contact of relay B0(19). With relay BB(20) operated, a circuit is closed from ground over the contact of interrupter 2124, conductor 2123, contact 1 of relay RG(20), contact 1 of relay RG2(20), contact 4 of relay BB(20) to battery through the winding of relay FL(20). Relay FL(20) operates intermittently under the control of interrupter 2124. Each time that relay FL(20) operates it opens the shunt around the lower winding of relay FCA(20) introducing that high resistance winding into the first observing circuit.

At the service observing position relay FC(28) remains operated but marginal relay FM(28) is intermittently released, in turn intermittently releasing relay FM1(32) and the lamp RSV(27) is flashed as a stuck sender signal in a circuit from ground at contact 2 of relay FC(28), conductor 2819, contact 8 of relay MK(32), contact 1 of relay FM1(32), conductor 3225 to battery through lamp RSV(27).

*Disconnect before designation is complete*

The intertoll operator may make an error in keying a number and disconnect before she completes the designation. Under this condition relays M(20) and M1(20) will have been operated, closing the shunt around the high resistance 1711 in the second observing circuit so that relays RM(28) and RC(28) will be operated at the observing position. Relay RC(28) operates relay RPU(28) and relay RM(28) operates relay KC(25) to prepare for receiving the designation as previously described. Release of the intertoll trunk causes the release of relays FC(28) and FM(28), in turn releasing relay FPU(28) which extinguishes lamp RPU(27), releases relay PC(25) and operates relay CA1(28).

The operation of relay CA1(28) releases relays RM(28) and RC(28), in turn releasing relay RPU(28). The release of relay RM(28) permits relay KD(27) to operate and extinguishes lamp FSV(27). The operation of relay CA1(28) releases relay SP(37) disconnecting the operator's telephone from the service observing desk. Relay KD(27) in operating extinguishes lamp SDR(25).

Relay PC(25) in releasing restores the register control circuits to normal, reconnects resistance 2514 across the second observing circuit and disconnects that circuit from the multifrequency receiving circuit 2809.

*Disconnection after designation has been completed*

If the designation has been completed the operation of relay ST(26) causes relay KD(27) to operate and relay PC(25) to release. Relay KD(27) extinguishes lamp SDR(25) and relay PC(25) restores the register control circuits to normal. The disconnect signal releases relays FC(28) and FM(28), in turn releasing relay FPU(28) and the further release is the same as above described.

*Trunk identification failure*

When relay SD(32) operated, as above described, to transmit the send identification signal, it started the operation of a timing circuit.

This timing circuit includes relays TMR(32), TM1(32) and tube TM(32). When relay SD(32) operates, it closes a circuit from ground over its contact 5, contact 3 of relay TM1(32) to battery through the winding of relay TMR(32) which operates. Relay TMR(32) connects +130 volt battery through resistance lamp 3222, contact 5 of relay TMR(32) to the main anode of tube TM(32) and through resistance 3223 to condenser C1(32). Condenser C1(32) is connected through resistance 3224 to the control anode of tube TM(32). Relay TMR(32) also connects ground over its contact 3 and through the lower winding of relay TM1(32) to the cathode of tube TM(32).

Condenser C1(32) charges and, if the trunk identification is not completed releasing relay SD(32) as above described before the charge on the condenser reaches the breakdown potential of tube TM(32), that tube will break down, operating relay TM1(32) across its main gap. Relay TM1(32) locks in a circuit from battery through its upper winding and over its contact 4 to ground at contact 5 of relay SD(32). At its contact 3 relay TM1(32) opens the operating circuit of relay TMR(32) causing that relay to release, removing the +130 volt battery from tube TM(32) and quenching the tube. Relay TMR(32), when released, connects ground over its contact 4 through resistance 3226 to condenser C1(32) to discharge the condenser. At its contact 1 relay TM1(32) lights the indication failure lamp IFL(32) and at its contact 2 closes a circuit over contact 3 of relay SH(32) to battery through the winding of relay IF(32). Relay IF(32) operates and locks over its contact 4, conductor 3218, contact 6 of relay R1(35) to ground at contact 2 of relay PB(35). With relay IF(32) operated, the operating and locking circuits of relay SH(32) are opened and that relay releases. Relay IF(32) at its contact 2 closes a substitute circuit to ground for lamp IFL(32). At its contact 6 relay IF(32) opens the circuit over which relay SI(31) was operated. With relay SH(32) released, relay SD(32) is also released, restoring the position circuit to a condition to permit observations to continue and permitting other positions to proceed with identification.

*Dial class intertoll trunk*

Dial class intertoll trunks may also be observed by means of the intertoll service observing trunk of Figs. 17 and 20. As previously mentioned, no ground is connected to contact 8 of jack 1627 for such trunks and relay TC0(17) is not operated. With relay TC0(17) normal, the output conductors from tube V2(17) are connected over contacts 1 and 10 of relay TC0(17) through resistances 1732 and 1733 in parallel with the output conductors of tube V3(17) to the first observing circuit. The second observing circuit is connected through repeating coil 1709, amplifier 1731 and over conductors 1734 and 1735 to the dial pulse multifrequency converter circuit 1810.

Dial class pulsing causes ground to be disconnected briefly from conductor 1600 for each dial pulse, causing relay E(17) to release for each pulse. Each release of relay E(17) closes a circuit from ground at contact 1 of relay TC(20), conductor 2012, contact 1 of relay E(17), contact 2 of relay E1(17), conductor 2024, contact 8 of relay TC0(17) to conductor 1736 leading to the converter 1810. The converter 1810 is arranged to generate a KP signal and, if necessary, an ST signal and translates each digit as received into the corresponding multifrequency signal which is transmitted over conductors 1734 and 1735 to the second observing circuit and the observing operator's position. After the dialed digits and ST signal have been transmitted, the converter 1810 causes relay TC0(17) to operate and lock which disconnects the converter 1810 to arrange the observing trunk circuit for further observation similar to that for multifrequency pulsing. Otherwise, the observation takes place as described for the multifrequency trunk of Fig. 16.

*Loop reduction*

The number of intertoll service observing circuits having access to the intertoll service observing trunk may be reduced in a manner similar to that previously described. When the intertoll service observing trunk circuit is idle, key OSK(24) will be operated operating relay OS(24). With relay OS(24) operated the signaling circuit is opened causing relay ST(20) to release, in turn releasing relays ST1(20) and ST2(20). At the service observing desk, conductor 2403 of the first observing circuit is extended over contacts 2 and 3 of relay OS(24) to the outer right contact of key SW(24) and through resistance 2413 through the outer left contact of key SW(24). Conductor 2404 of the first observing circuit is extended over contacts 7 and 6 of relay OS(24) to the inner contacts of key SW(24). In the intertoll service observing trunk circuit conductor 2403 is extended through the upper left winding of repeating coil 1707, conductor 1708, contact 1 of relay ST1(20), lower winding of relay D(21), conductor 2103, contact 1 of relay FL(20), upper winding of relay FCA(20), upper winding of relay D(21), conductor 2104 to ground at contact 8 of relay ST1 (20). Conductor 2404 is extended through the upper right winding of repeating coil 1707, conductor 2010, contact 1 of relay ST2(20) to battery through resistances 2021 and 2018.

If now the left contact of key SW(24) is closed, conductors 2403 and 2404 will be connected together through resistance 2413 and relay D(21) will operate alone closing a circuit from ground, contact 6 of relay ST1(20), conductor 2016, contact 2 of relay D(21), conductor 2106, contact 8 of relay ST1(20), contact 9 of relay ST2(20), conductor 2022, contact 3 of relay AG(19) to battery through the lower winding of relay BG(19). Relay BG(19) operates and locks in the circuit from battery through its upper winding and over its contact 1, conductor 2000 to ground at contact 2 of relay ST1(20), when key OSK(24) is opened and relays ST(21) and ST1(20) reoperate. Relay BG(19) is sufficiently slow to release to cover the operating times of these relays.

If the right contact of key SW(24) is closed, conductors 2403 and 2404 are connected directly to one another and relays FCA(20) and D(21) both operate. With relay FCA(20) operated, a circuit is closed from ground over contact 4 of relay ST2(20), contact of relay FCA(20), contact 6 of relay ST1(20), conductor 2023 to battery through the lower winding of relay AG(19). The previously traced circuit for relay BG(19) is closed by the operation of relay D(21) but relay AG(19), in operating, opens the circuit of relay BG(19) and therefore that relay cannot operate. Relay AG(19) is also slow to release and locks through its upper winding and over its contact 2 to conductor 2000 when relay ST1(20) reoperates.

In the arrangement shown in Fig. 19, contacts 1, 2, 9 and 10 of relay CT(19) are connected directly to ground so that the CC relays connected to these contacts always operate following the operation of relay CT(19). Contacts 3 and 4 of relay CT(19) are connected to ground over contact 2 of relay BG(19) and contact 1 of relay AG(19) so that the associated CC relays are not operated if either relay AG(19) or relay BG(19) is operated. Contacts 5 and 6 of relay CT(19) are grounded over contact 4 of relay AG(19) and the associated CC relays cannot operate if relay AG(19) is operated. Contacts 7 and 8 of relay CT(19) are grounded over contact 3 of relay BG(19) and the associated CC relays cannot operate if relay BG(19) is operated. It will be understood that the connection of ground to the various contacts of relay CT(19) may be varied as desired.

What is claimed is:

1. In a telephone system, a first office, circuits at said office used in telephone connections, a second office, operator positions at said second office, a service observing trunk extending between said first office and said second office, means responsive to taking one of said circuits for use for preparing a connection between said one circuit and said service observing trunk, means responsive to said connection preparing means for transmitting a seizing signal over said trunk, connecting means at said second office operated in response to said seizing signal to connect said trunk with one of said operator positions, means in said one operator position operated in response to the operation of said connecting means to transmit a call-accepted signal over said trunk to said first office, and means at said first office operated in response to said call-accepted signal to render said prepared connection between said one circuit and said service observing trunk effective.

2. In a telephone system, a first office, circuits at said office used in telephone connections, a second office, operator positions at said second office, a service observing trunk extending between said first office and said second office comprising a plurality of pairs of conductors, means responsive to taking one of said circuits for use for preparing a connection between said one circuit and said service observing trunk, means responsive to said connection preparing means for transmitting a seizing signal over one of said pairs of conductors, connecting means at said second office operated in response to said seizing signal to connect said trunk with one of said operator positions, means in said one operator position operated in response to the operation of said connecting means to transmit a call-accepted signal over another of said pairs of conductors to said first office, and means at said first office operated in response to said call-accepted signal to render said prepared connection between said one circuit and said service observing trunk effective.

3. In a telephone system, a first office, circuits at said office used in telephone connections, a second office, operator positions at said second office, a service observing trunk extending between said first office and said second office comprising a plurality of pairs of conductors, means responsive to the use of one of said circuits for preparing a connection between said one circuit and said service observing trunk, means responsive to said connection preparing means for transmitting a seizing signal over one of said pairs of conductors, timing means, means also responsive to said connection preparing means to initiate the operation of said timing means, connecting means operated in response to said seizing signal to connect said trunk with one of said operator positions, means in said one operator position operated in response to the operation of said connecting means to transmit a call-accepted signal over another of said pairs of conductors to said first office, means operated in response to said call-accepted signal to maintain said prepared connection between said one circuit and said service observing trunk and to disable said timing means, and means under the control of said timing means to terminate said seizing signal and disable said prepared connection.

4. In a telephone system, a first office, circuits at said office used in telephone connections, a second office, operator positions at said second office, a service observing trunk extending between said first office and said second office comprising a normally closed signalling circuit and a normally open observing circuit, means responsive to taking one of said telephone circuits for use for preparing a connection between said one telephone circuit and said service observing trunk, means responsive to said connection preparing means for transmitting a seizing signal over said signaling circuit, connecting means at said second office operated in response to said seizing signal to connect said trunk with one of said operator positions, means in said one operator position operated in response to the operation of said connecting means to complete said normally open observing circuit as a call-accepted signal to said first office, and means at said first office operated in response to the completion of said observing circuit to render said prepared connection between said one telephone circuit and said service observing trunk effective.

5. In a telephone system, a first office, circuits at said office used in telephone connections, a second office, operator positions at said second office, a service observing trunk extending between said first office and said second office comprising a normally closed signaling circuit and a normally open observing circuit, means responsive to the use of one of said telephone circuits for preparing a connection between said one telephone circuit and said service observing trunk, means responsive to said connection preparing means for transmitting a seizing signal over said signaling circuit, timing means, means also responsive to said connection preparing means to initiate the operation of said timing means, connecting means operated in response to said seizing signal to connect said trunk with one of said operator positions, means in said one operator position operated in response to the operation of said connecting means to complete said normally open observing circuit as a call-accepted signal to said first office, means operated in response to the completion of said observing circuit to maintain said prepared connection between said one telephone circuit and said service observing trunk and to disable said timing means, and means under the control of said timing means to terminate said seizing signal and disable said prepared connection.

6. In a telephone system, toll offices, a plurality of classes of communication circuits at said offices, the various classes of communication circuits generating different signals, a service observing trunk circuit for each class of communication circuit at each office, means to connect any one of said communication circuits with the corresponding class of service observing trunk circuit, a common service observing office, said service observing trunk circuits connecting said toll offices with said service observing office, operator positions at said service observing office, connecting means at said service observing office responsive to the connection of a communication circuit with one of said service observing trunk circuits to connect said one service observing trunk circuit with one of said operator positions, indicating means at each of said positions, and means under the control of said connecting means to render the indicating means of said one operator position responsive to signals generated by the class of communication circuit connected therewith.

7. In a telephone system, toll offices, a plurality of classes of communication circuits at said offices, the various classes of communication circuits generating different signals, a service observing trunk circuit for each class of communication circuit at each office, means to connect any one of said communication circuits with the corresponding class of service observing trunk circuit, a common service observing office, said service observing trunk circuits connecting said toll offices with said service observing office, operator positions at said service observing office, connecting means at said service observing office responsive to the connection of a communication circuit with one of said service observing trunk circuits to connect said one service observing trunk circuit with one of said operator positions, indicating means at each of said positions, means under the control of said connecting means to render the indicating means of said one operator position responsive to signals generated by the class of communication circuit connected therewith, and means for rendering said operator positions connectable only with a particular class of service observing trunk.

8. In a telephone system, toll offices, a plurality of classes of communication circuits at said offices, the various classes of communication circuits generating different signals, a service observing trunk circuit for each class of communication circuit at each office, means to connect any one of said communication circuits with the corresponding class of service observing trunk circuit, a common service observing office, said service observing trunk circuits connecting said toll offices with said service observing office, operator positions at said service observing office, connecting means at said service observing office responsive to the connection of a communication circuit with one of said service observing trunk circuits to connect said one service observing trunk circuit with one of said operator positions, indicating means at each of said positions, means under the control of said connecting means to render the indicating means at said one operator position responsive to signals generated by the class of communication circuit connected therewith, and allotting means for rendering only one operator position at a time connectable with a service observing trunk.

9. In a telephone system, toll offices, a plurality of classes of communication circuits at said offices, the various classes of communication circuits generating different signals, a service observing trunk circuit for each class of communication circuit at each office, means to connect any one of said communication circuits with the corresponding class of service observing trunk circuit, a common service observing office, said service observing trunk circuits connecting said toll offices with said service observing office, operator positions at said service observing office, connecting means at said service observing office responsive to the connection of a communication circuit with one of said service observing trunk circuits to connect said one service observing trunk circuit with one of said operator positions, indicating means at each of said positions, means under the control of said connecting means to render the indicating means at said one operator position responsive to signals generated by the class of communication circuit connected therewith, and allotting means for rendering only one operator position at a time connectable with a service observing trunk of a particular class.

10. In a telephone system, toll offices, a plurality of classes of communication circuits at said offices, the various classes of communication circuits generating different signals, a service observing trunk circuit for each class of communication circuit at each office, means to connect any one of said communication circuits with the corresponding class of service observing trunk circuit, a common service observing office, said service observing trunk circuits connecting said toll offices with said service observing office, operator positions at said service observing office, connecting means at said service observing office responsive to the connection of a communication circuit with one of said service observing trunk circuits to connect said one service observing trunk circuit with one of said operator positions, indicating means at each of said positions, means under the control of said connecting means to render the indicating means of said one operator position responsive to signals generated by the class of communication circuit connected therewith, and means at each position for rendering that position connectable only with a particular class of service observing trunk.

11. In a telephone system, toll offices, a plurality of classes of communication circuits at said offices, the various classes of communication circuits generating different signals, a service observing trunk circuit for each class of communication circuit at each office, means to connect any one of said communication circuits with the corresponding class of service observing trunk circuit, a common service observing office, said service observing trunk circuits connecting said toll offices with said service observing office, operator positions at said service observing office, connecting means at said service observing office responsive to the connection of a communication circuit with one of said service observing trunk circuits to connect said one service observing trunk circuit with one of said operator positions, indicating means at each of said positions, means under the control of said connecting means to render the indicating means at said one operator position responsive to signals generated by the class of communication circuit connected therewith, and allotting means individual to each class of service observing trunk for rendering only one operator position at a time connectable with a service observing trunk of that class.

12. In a telephone system, a toll office, a plurality of communication circuits at said office, a plurality of service observing circuits at said office, manually operated means for attaching said communication circuits to said service observing circuits, a service observing trunk circuit common to said service observing circuits, a centralized service observing office, a plurality of pairs of conductors connecting said service observing trunk circuit with said centralized service observing office, means in each service observing circuit responsive to the seizure of the attached communication circuit for connecting said attached communication circuit to said service observing trunk circuit and with said centralized service observing office over said pairs of conductors, and means in said service observing trunk circuit selectively operable over said pairs of conductors for disabling the responsive means in a plurality of said service observing circuits.

13. In a telephone circuit, a toll office, a plurality of communication circuits at said office, a plurality of service observing circuits at said office divided into subgroups, manually operated means for attaching said communication circuits to said service observing circuits, a service observing trunk circuit common to said service observing circuits, a centralized service observing office, a plurality of pairs of conductors connecting said service observing trunk circuit with said centralized service observing office, means in each service observing circuit responsive to the seizure of the attached communication circuit for connecting said attached communication circuit to said service observing trunk circuit and with said centralized service observing office over said pairs of conductors, and means in said service observing trunk circuit selectively operable over said pairs of conductors for disabling the responsive means in the service observing circuits of one or more of said subgroups.

14. In a telephone circuit, a toll office, a plurality of communication circuits at said office, a plurality of service observing circuits at said office, manually operated means for attaching said communication circuits to said service observing circuits, a service observing trunk circuit common to said service observing circuits, a centralized service observing office, a signaling circuit and an observing circuit connecting said service observing trunk circuit with said centralized service observing office, means in each service observing circuit responsive to the seizure of the attached communication circuit for connecting said attached communication circuit to said service observing trunk circuit and with said centralized service observing office over said observing circuit, and means in said service observing trunk circuit selectively operable over said observing circuit for disabling the responsive means in a plurality of said service observing circuits.

15. In a telephone circuit, a toll office, a plurality of communication circuits at said office, a plurality of service observing circuits at said office, manually operated means for attaching said communication circuits to said service observing circuits, a service observing trunk circuit common to said service observing circuits, a centralized service observing office, a normally closed signaling circuit and an observing circuit connecting said service observing trunk circuit with said centralized service observing office, means in each service observing circuit responsive to the seizure of the attached communication circuit for connecting said attached communication circuit to said service observing trunk circuit and with said centralized service observing office over said observing circuit, means in said service observing trunk circuit selectively operable over said observing circuit for disabling the responsive means in a plurality of said service observing circuits, means to open said signaling circuit, and means responsive to the opening of said signaling circuit to render said selectively operable means effective.

16. In a telephone circuit, a toll office, a plurality of communication circuits at said office, a plurality of service observing circuits at said office divided into subgroups, manually operated means for attaching said communication circuits to said service observing circuits, a service observing trunk circuit common to said service observing circuits, a centralized service observing office, a normally closed signaling circuit and an observing circuit connecting said service observing trunk circuit with said centralized service observing office, means in each service observing circuit responsive to the seizure of the attached communication circuit for connecting said attached communication circuit to said service observing trunk circuit and with said centralized service observing office over said observing circuit, means in said service observing trunk circuit selectively operable over said observing circuit for disabling the responsive means in the service observing circuits of one or more of said subgroups, means to open said signaling circuit, and means responsive to the opening of said signaling circuit to render said selectively operable means effective.

References Cited in the file of this patent
UNITED STATES PATENTS

| | | |
|---|---|---|
| 1,641,453 | Ostline | Sept. 6, 1927 |
| 1,691,554 | Saville | Nov. 13, 1928 |